United States Patent [19]
Saito et al.

[11] Patent Number: 5,342,138
[45] Date of Patent: Aug. 30, 1994

[54] CONNECTORS FOR STRUCTURAL MEMBERS

[75] Inventors: Rikuro Saito, Hamakita; Kiyoyuki Yagi, Hamamatsu, both of Japan

[73] Assignee: Nitto Mokuzai Sangyo Kabushiki Kaisha, Hamakita, Japan

[21] Appl. No.: 959,265

[22] Filed: Oct. 9, 1992

[30] Foreign Application Priority Data

Dec. 27, 1991 [JP] Japan .................................. 3-347476
Jan. 13, 1992 [JP] Japan .................................. 4-003777
Jan. 17, 1992 [JP] Japan .................................. 4-006713

[51] Int. Cl.$^5$ .............................................. B25G 3/00
[52] U.S. Cl. ................................ 403/189; 403/187; 403/246
[58] Field of Search ............... 403/199, 189, 187, 190, 403/241, 230, 246, 262, 174, 177, 178, 354, 403, 294, 295; 52/250, 263, 252, 721, 283; 248/300

[56] References Cited

U.S. PATENT DOCUMENTS

| | | | |
|---|---|---|---|
| 3,304,683 | 2/1967 | Ferreira | 52/721 |
| 4,299,509 | 11/1981 | Meickl | 403/174 |
| 4,551,957 | 11/1985 | Madray | 52/721 |
| 4,558,968 | 12/1985 | Meikl | 403/174 |
| 5,022,209 | 6/1991 | Kimura | 52/263 |
| 5,061,111 | 10/1991 | Hosokawa | 403/187 |

FOREIGN PATENT DOCUMENTS 2-74403 6/1990 Japan .
2-77204 6/1990 Japan .

*Primary Examiner*—P. Austin Bradley
*Assistant Examiner*—Eric R. Puknys
*Attorney, Agent, or Firm*—Oblon, Spivak, McClelland, Maier & Neustadt

[57] ABSTRACT

A connector for connecting a first structural member, for example, a beam and a second structural member, for example, a column, which connection includes a first plate, a second plate attached substantially perpendicularly to the first plate and a third plate for mounting the connector to the column. The second plate is loosely fitted into a predetermined cut provided in the beam. The third plate is attached to one end of at least one of the first and second plate. The connector includes rods which can be closely fit into predetermined holes provided in the beam so that the connector and the beam can be connected tightly. The rods are pin-shaped and tapered in one end. The beam has a cut portion in a connecting portion for connecting the beam to the connector. The cut portion has loosely fitted therein the second plate and is substantially parallel to a longitudinal axis of the beam. The cut portion is beveled at a lower end thereof so as to easily insert the second plate into the cut portion. The beam includes holes in the connecting portion, into which the rods are closely fitted. The bore size of the holes is substantially identical to or slightly smaller than the diameter of the rod so as to fit the rods into the holes with a close fit.

65 Claims, 55 Drawing Sheets

CONNECTORS FOR STRUCTURAL MEMBERS

BACKGROUND OF THE INVENTION

1. Field of the Invention

This invention relates to a connector for connecting structural members and more particularly to a connector for connecting structural members for a wooden building, which include a beam, a column etc.

2. Discussion of the Background

Reinforced concrete (RC) buildings are of an integral construction, but wooden buildings are constructed by connecting many structural members, including for example a column and a beam.

In wooden buildings, therefore, the strengh of the structural members is important, but the strengh of connenctors for the structural members is also very important.

There are many types of prior art connectors.

One connector comprises a bolt and nut assembly.

Another connector further comprises a metal plate, which is patched to two members and which transmits an axial force, a shear force or bending moment generated in one member to the other member.

However, long span wooden buildings are constructed using timbers having a large sectional area cosisting of bonded wood.

These timbers can bear higher loads than the standard timbers because of their large section.

Therefore, a connector for connecting these timbers requires higher corresponding connection strength.

Now, by patching the metal plate to these timbers and clamping the metal plate and the timbers with bolts or nails, a predetermined connecting strength can be acquired.

However, connecting structures using bolts or nails have the following problems.

First of all, in case of nails, to acquire a large connecting strength a large area for nailing is required in the connecting surface of the timbers because the corresponding number of nails must be nailed with a predetermined pitch so as to prevent fracturing of the timbers.

Therefore, connectors with nails cannot attain much connecting strength.

Secondly, in case of bolts, a large connection strength can be acquired, but a large deformation may be generated between timbers because there is a predetermined clearance between bolts and their corresponding holes.

Thirdly, applications of finishing materials are very difficult because the bolts which clamp the metal plates to the timbers, project beyond the surface of the metal plates.

Furthermore, metal plates require a predetermined size corresponding to the size of timbers so that architectural design may be impaired unless proper sizing exists.

The Japanese Utility Model Laid-Open No. 2-74403 discloses a connector for connecting a column and beam, comprising a base plate for supporting the beam, a plate member substantially perpendicular to the base plate, a mounting plate for mouting the connector to the column provided in one end of the plate member and a pair of rectangular protruded portions provided on two sides of the plate member, wherein the rectangular protruded portion defines a clearance between a surface of the rectangular protruded portion and an inner surface of a rectangular slot provided in the beam, said clearance being penetrated by a predetermined wedge.

Furthermore, the Japanese Utility Model Laid-Open No. 2-77204 discloses a connector for connecting two beams, comprising a base plate for supporting the beams, a plate member substantially perpendicular to the base plate and two pair of rectangular protruded portions provided on two sides of the plate member, wherein the rectangular protruded portion forms a clearance between a surface of said rectangular protruded portion and an inner surface of a rectangular slot provided in the beam, the clearance being penetrated by a predetermined wedge.

However, first of all, these connectors require the wedge essentially to connect a beam and column or two beams.

Secondly, the wedge must be fixed using a cover plate and bolts so as to prevent uplifting of the beam and thus the cover plate and bolts project beyond the top surface of the beam.

Therefore, the cover plate and bolts disturb the installation of flooring, especially when the flooring is aplied to the beam directly.

Thirdly, in the connection of the column and the beam, the connector is mounted to the column, the column is slightly inclined outwardly, the beam is lowered so that the rectangular protruded portion of the connector can be inserted into the rectangular slot of the beam and the wedge is driven into a clearance between an inner surface of the rectangular slot and an outer surface of the rectangular protruded portion so that the column is drawn into the beam.

Therefore, the column cannot be fixed before the connection of the beam and column is completed and thus the construction of a multi-layer building is very difficult.

Furthermore, the rectangular slot is more difficult to work than a round slot or hole.

Furthermore, the rectangular protruded portion and a corresponding portion of the beam are not integral so the rectangular slot causes a reduction of the sectional area of the beam, thus decreasing the connecting strength.

SUMMARY OF THE INVENTION

An object of this invention is to provide a connector for connecting structural members, which can connect two structural members with a high connecting strength without using a nail, a bolt or a wedge and so can connect the structural members easily and efficiently, which can apply a finishing material easily by not projecting a portion of the connector beyond a surface of the structural members, and which can decrease an exposed portion of the connector so that an architectural design may not be impaired.

Another object of this invention is to provide a structural member which can apply to above connector, which can be worked easily and which can prevent a reduction of a sectional area of the structural member.

A further object of this invention is to provide a connecting structure for connecting structural members by a connector, which can connect two structural members with high connecting strength without using a nail, a bolt or a wedge and so can connect the structural members easily and efficiently, which can apply a finishing material easily by not projecting a portion of the connector beyond a surface of the structural members, which can decrease an exposed portion of the connector so that an architectural design may be impaired, which can work the structural members easily and which can prevent a reduction of the sectional area of the structural member.

According to this invention, there is provided a connector for connecting a first structural member and a second structural member, comprising:

a first plate;

a second plate attached substantially perpendicularly to said first plate, which is fitted into a predetermined cut provided in said first structural member;

a third plate to be mounted to said second structural member, said third plate being attached to one end of said first plate at a predetermined angle; and a securing means for securing said first structural member to said connector, wherein said securing means comprises a protruded means which is fitted into a recessed means in close fit, said recessed means being provided in said first structural member.

In a preferred embodiment, the securing means comprises a screw for securing the first structural member and the second plate.

Thus, the first structural member and the second plate can be secured with higher connecting strength.

In another preferred embodiment, the securing means comprises an adhesive for securing the first structural member and the second plate.

Thus, the first structural member and the second plate can be secured with higher connecting strength.

In a further preferred embodiment, the connector further comprises a positioning means for positioning said connector in said second structural member.

Thus, the connector can be properly positioned with respect to the second structural member.

In a still further preferred embodiment, the connector further comprises a brace fitting means for fitting a brace.

Thus, the brace can be fitted to the connector so that structural strength against an earthquake can be increased.

In a still further preferred embodiment, said third plate is attached to said second plate at a predetermined angle so that the rafters can be connected to each other.

In yet still further preferred embodiment, said third plate is attached to said second plate substantially perpendicularly so that the beam or the column can be connected to another structural member.

In still another further preferred embodiment, said third plate is rotatably attached to said first plate so that the rafter can be connected to the beam or the column.

According to this invention, there is provided a structural member having a connecting portion for connecting said structural member to a connector, wherein said connecting portion comrises a cut into which a predetermined plate is fitted, provided in said coonnector, said cut being substantially parallel to a longitudinal axis of said structural member and a recessed means into which a predetermined protruded means is in close fit, provided in said connector.

In one preferred embodiment, said connecting portion comprises a slot for running a predetermined protrusion provided in said connector, said slot being provided in said end surface and substantially parallel to said hole.

Thus, the beam or the rafter can be lowered down without inclination of a column.

In another preferred embodiment, said connecting portion comprises a recess into which a predetermined plate is fitted, provided in said connector, said recess being substantially perpendicular to said cut and located on a surface of said structural member.

Thus, a portion of the connector can be prevented from projecting beyond a under surface portion of a structural member so that the architectural design is not impaired.

In a further preferred embodiment, said structural member is used as a rafter.

In a still further preferred embodiment, said end surface is substatially perpendicular to a longitudinal axis of said structural member so that the structural member can be used as a beam or a column.

According to this invention, there is provided a connector for connecting a first structural member and a second structural member, comprising:

a first plate means having two plates having ends attached to each other at a predetermined angle in symmetry for a predetermined axis;

a second plate attached substantially perpendicularly to said plates, which is fitted into a predetermined cut provided in said first and second structural members; and securing means for securing said first and second structural members to said connector, wherein said securing means comprises a protruded means which is fitted into a recessed portion in close fit, said recessed means being provided in said first and second structural member.

In a preferred embodiment, said first and second structural members are rafters at a predetermined angle.

In another preferred embodiment, said two plates of said first plate means are aligned in a plane so that the connector can connect two beams, two columns or two rafters.

In further preferred embodiment, said two plates of said first plate means are rotatably attached to each other so that the connector can connect two rafters at a arbitrary angle.

According to this invention, there is provided a connecting structure for connecting a first structural member and a second structural member by a connector, said connector comprising:

a first plate;

a second plate attached substantially perpendicularly to said first plate;

a third plate to be mounted to said second structural member, said third plate being attached to one end of said first plate at a predetermined angle; and a securing means for securing said first structural member to said connector, said securing means comprising a protruded means, said first structural member comprising:

a connecting portion for connecting said first structural member to said connector, wherein said connecting portion comprises a cut into which said second plate is fitted, said cut being substantially parallel to a longitudinal axis of said first structural member and an recessed portion into which said protruded portion is in close fit.

According to this invention, there is provided a connecting structure for connecting a first structural member and a second structural member by a connector, said connector comprising:

a first plate means having two plates having ends attached to each other at a predetermined angle in symmetry for a predetermined axis;

a second plate attached substantially perpendicularly to said plates; and a securing means for securing said first and second structural members to said connector, said securing means comprising a protruded means, said first and second structural members comprising:

a connecting portion for connecting said first and second structural member to said connector, wherein said connecting portion comprises a cut into which said second plate is fitted, said cut being substantially parallel to a longitudinal axis of said structural member and an recessed means into which said protruded means is in close fit.

BRIEF DESCRIPTION OF THE DRAWINGS

For a more complete understanding of this invention reference may be made to the following detailed explanations in conjunction with the accompanying drawing in which.

DESCRIPTION OF THE PREFERRED EMBODIMENTS

Figure 1:
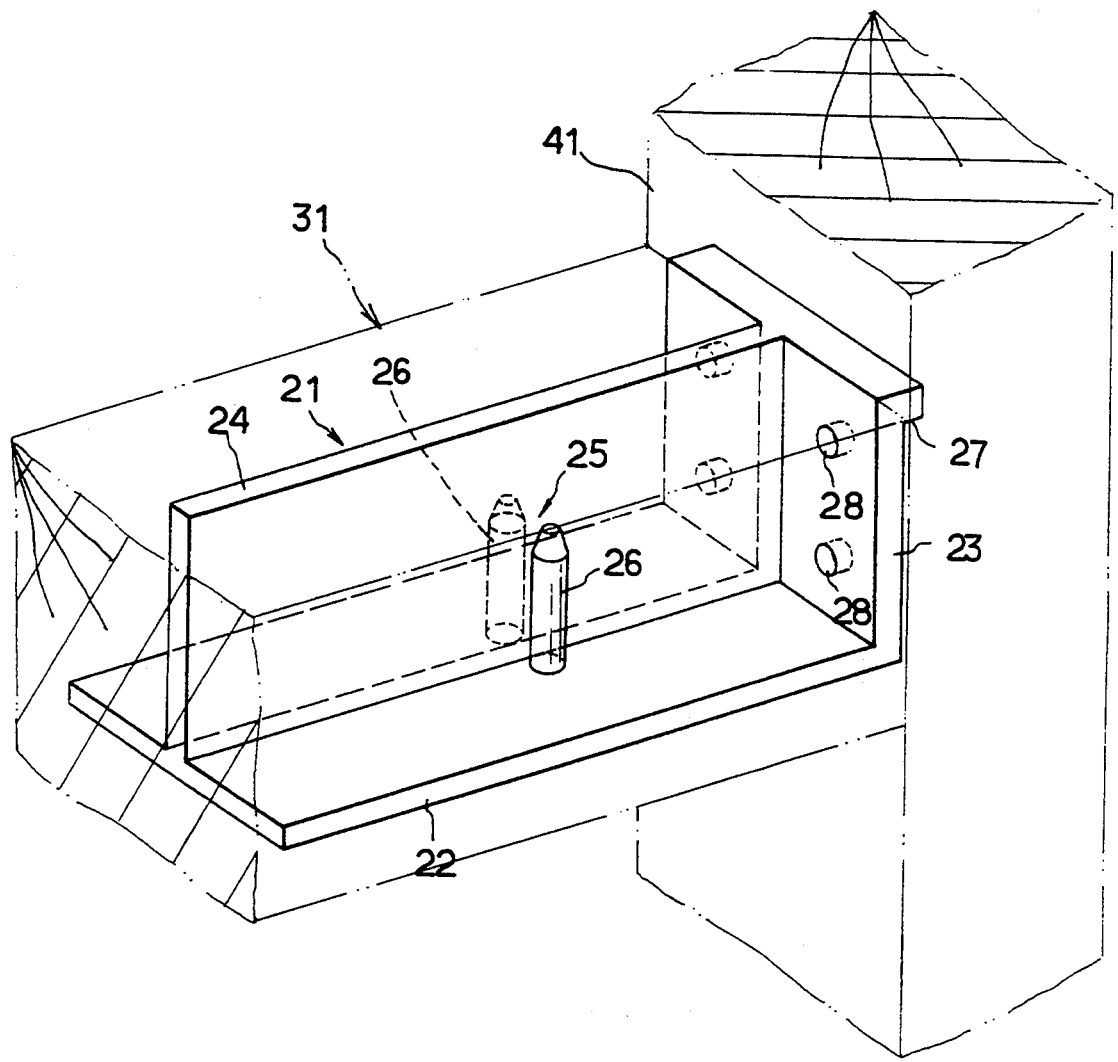
FIG. 1 is an isometric view showing a connector of a first embodiment of the invention, for connecting a beam to a column.
Figure 2A:
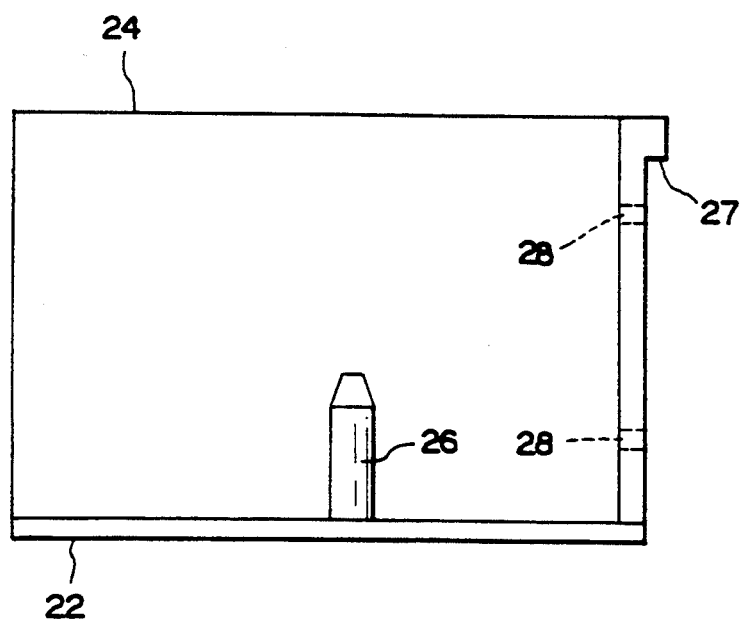
FIG. 2A is an elevation of this connector shown in FIG. 1
Figure 2B:
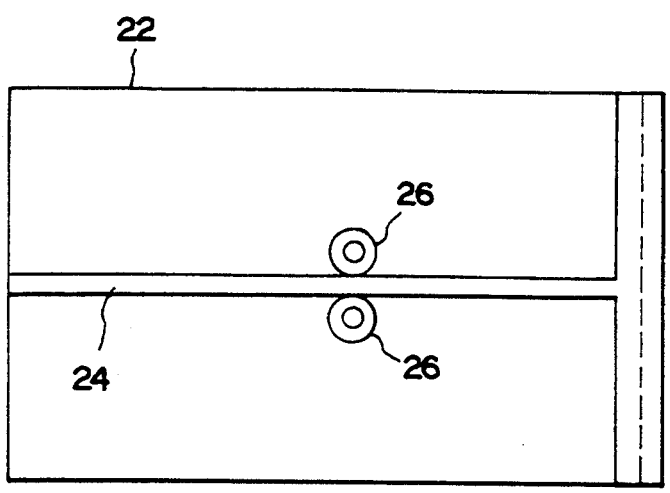
FIG. 2B is a plan view of the connector.

Referring now to the accompanying drawing, a connector 21 shown in FIGS. 1, 2A and 2B, for connecting a first structural member 31 and a second structural member 41, comprises a first plate 22 and a second plate 24 attached substantially perpendicularly to the first plate 22.

Hereinafter, we assume that the first structural member 31 is a beam and the second structural member 41 is a column for facility an explanation but the first and second structural members may be switched.

The second plate 24 fits into a predetermined cut provided in the beam 31 with a loose fit.

The connector 21 comprises a third plate 23 for mounting the connector 21 to the column 41, which is attached to one end of the first plate 22 and the second plate 24 and which is substantially perpendicular to the plate 22 and 24.

The third plate 23 is provided with holes 28 for penetrating bolts for mounting the third plate 23 to the column 41.

The connector 21 comprises a protruded portion 25 as a securing means for securing the beam 31 to the connector 21.

The protruded portion 25 comprises two rods 26.

The rods 26 are fitted into a recessed portion with a close fit, which is provided in the beam 31.

The rods 26 are pin-shaped and tapered in one end.

The rods 26 are located in substantially parallel to the third plate 23.

The rods 26, furthermore, are provided on both sides of the second plate 24 and are fixed to the first plate 22 and the second plate 24, for example, by welding.

The plate 22, 23 and 24 may be integrally molded or assembled by welding.

The length of the rods 26 can be set so as to correspond to the connecting strength of the beam 31 and the column 41.

The connector 21 comprises a raised portion 27 as a positioning means for positioning the connector 21 in the column 41.

The raised portion 27 is provided in the third plate 23 and is fitted into a depressed portion provided in the column 41.

Figure 3:
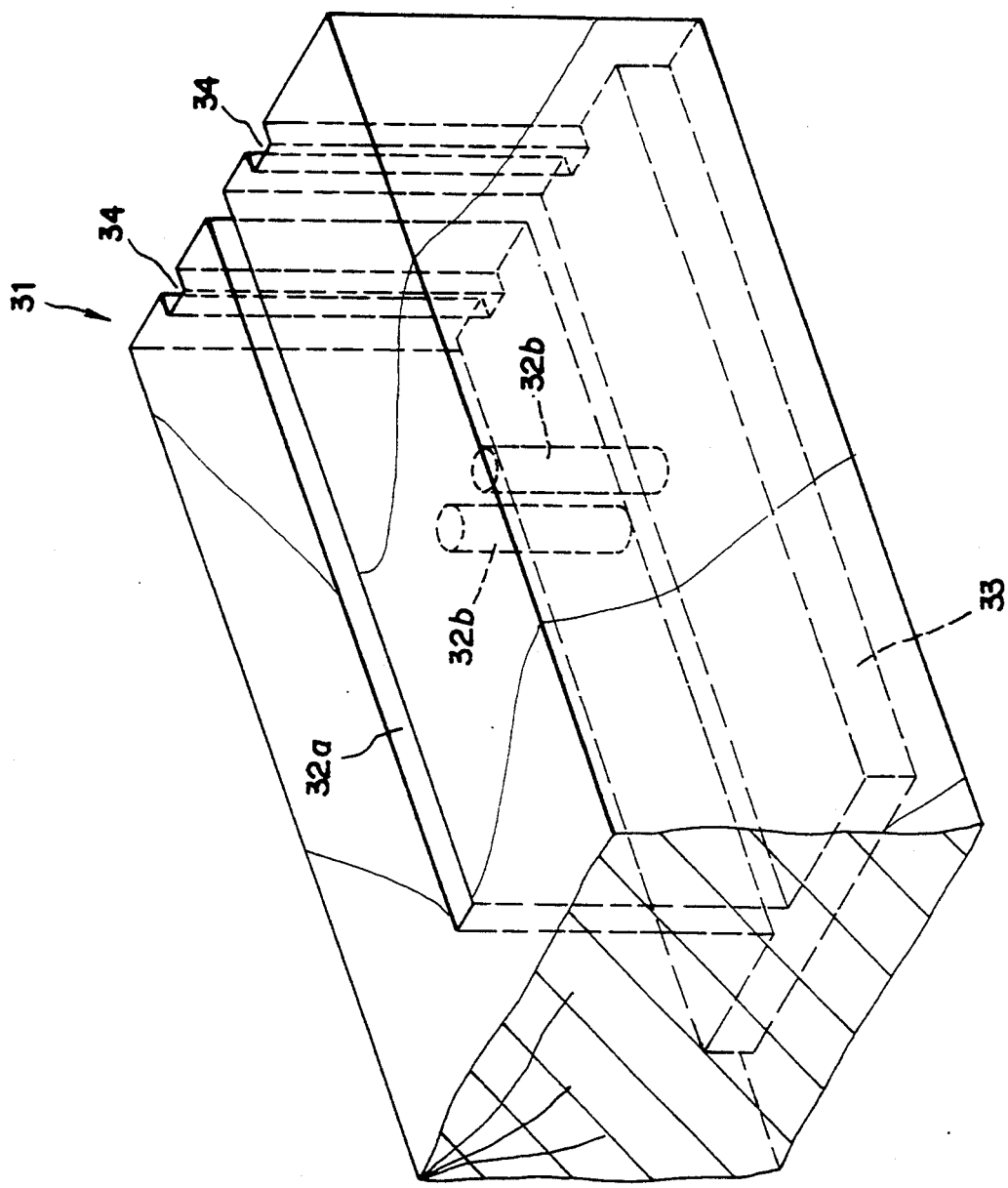
FIG. 3 is an isometric view showing a connecting portion of the beam.
Figure 4A:
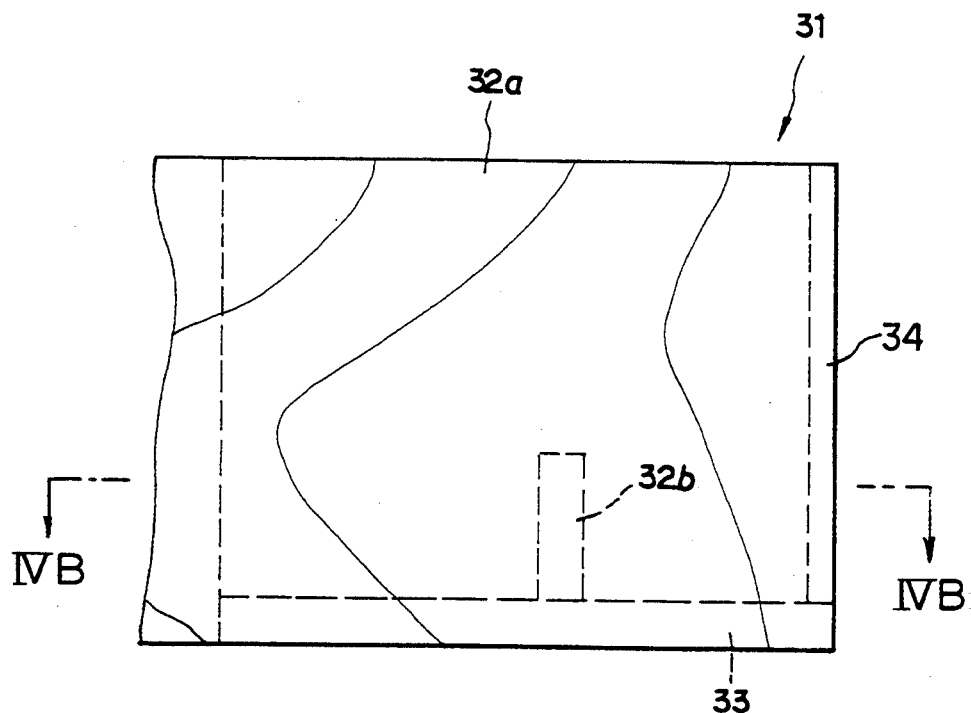
FIG. 4A is an elevation of the connecting portion shown in FIG. 3
Figure 4B:
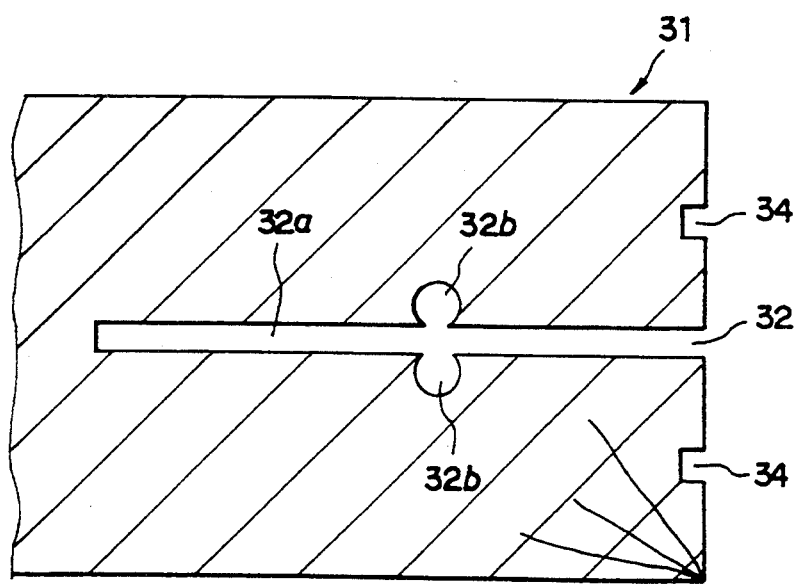
FIG. 4B is a section taken along a IVB—IVB line.

The beam 31, as shown in FIGS. 3, 4A and 4B, has a cut portion 32a in a connecting portion for connecting the beam 31 to the connector 21.

The cut 32a has loosely positioned therein the second plate 24 and is substantially parallel to a longitudinal axis of the beam 31.

The cut portion 32a is beveled in lower end so as to insert the second plate 24 into the cut portion 32a easily.

The beam 31 comprises holes 32b as recessed portions in the connecting portion, into which the rods 26 as a protruded portion are fitted with a close fit.

The holes 32b are located so as to be substatially parallel to an end surface of the beam 31 and to the cut 32a.

The holes 32b are provided on both sides of the cut 32a integrally, as shown in FIG. 4B.

The bore size of the holes 32b has a diameter which is substantially identical to or slightly smaller than a diameter of the rod 26 so as to fit the rods 26 into the holes 32b with a close fit.

The holes 32b can be worked precisely because of shop fabrication.

The beam 31 comprises two slots 34 for running a head or a nut of bolt penetrated through the hole 28 of the connector 21.

The slots 34 are provided in the end surface of the beam 31 and are substantially parallel to the holes 32b.

The beam 31 further comprises a recess 33 into which the first plate 22 is fitted.

The recess 33 is substantially perpendicular to the cut 32a and located on a under surface of the beam 31.

The recess 33 can prevent a projection of the first plate 22 beyond the under surface of the beam 31.

Figure 5:
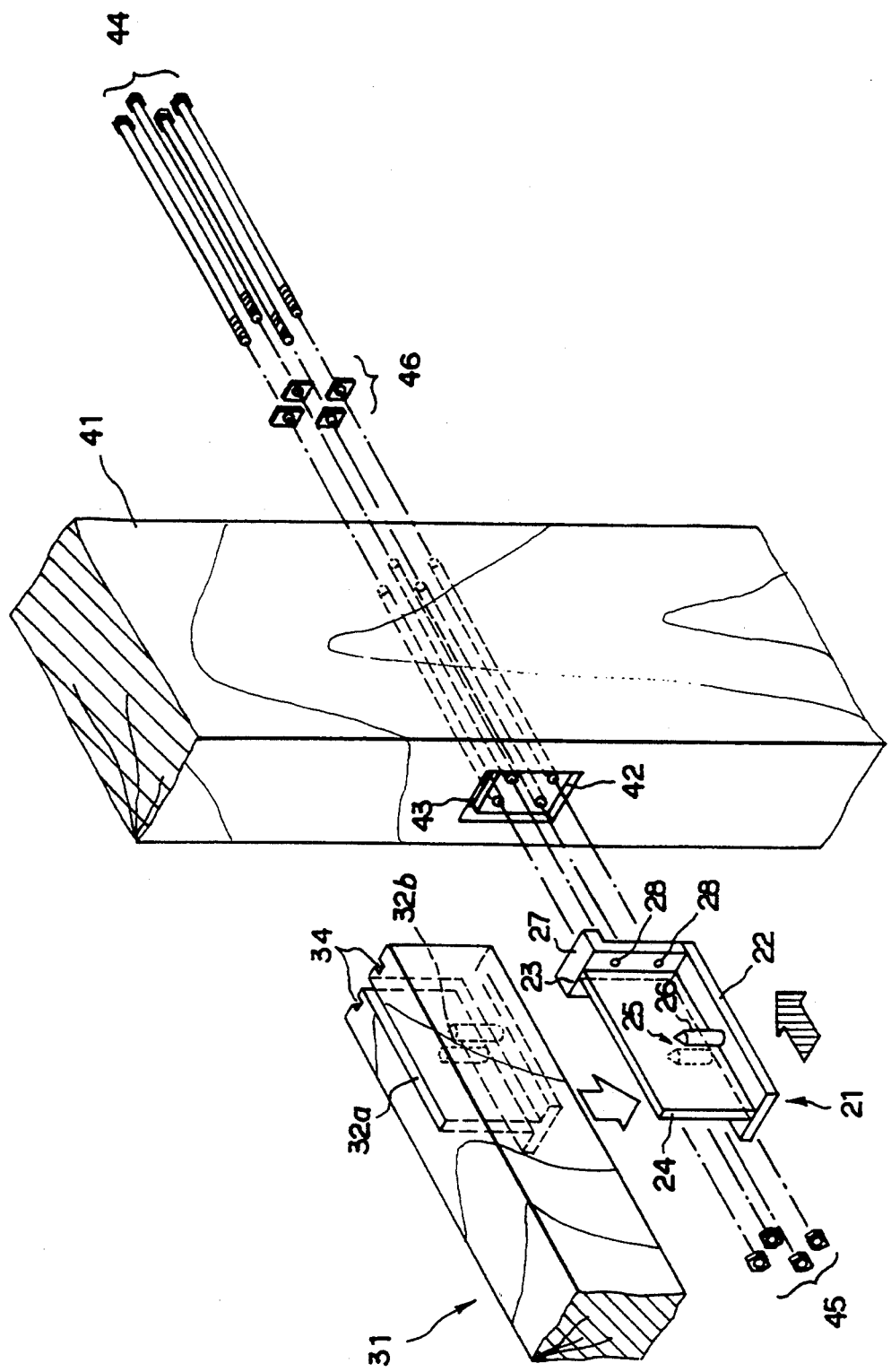
FIG. 5 is an isometric view showing a connecting operation of the beam and the column.

In connecting operation of the beam 31 and column 41 by the connector 21, first of all, as shown in FIG. 5, the connector 21 is advanced along a direction shown by an arrow hatched and the third plate 23 is fited into a recess 42 provided in the column 41.

The recess 42 has a further depressed portion 43 and so the raised portion 27 of the third plate 23 is fitted into the depressed portion 43 so that the connector 21 can be positioned on the column 41.

Bolts 44 are penetrated through the column 41 together with washers 46 and further the bolts 44 are penetrated through the holes 28 of the third plate 23.

The connector 21, then, is fixed to the column 41 by bolts 44 and nuts 45.

Figure 6:
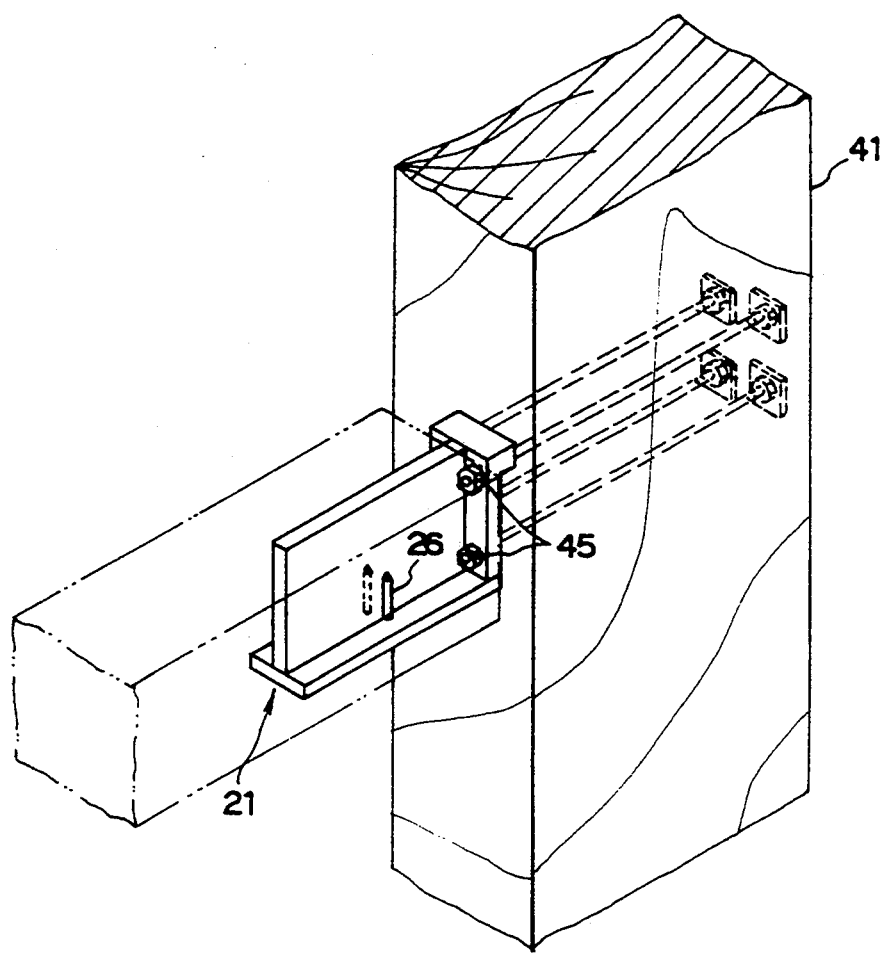
FIG. 6 is an isometric view showing the connector mounted to the column.

FIG. 6 is a isometric view of the connector 21 mounted to the column 41.

Now again referring to FIG. 5, the beam 31 is lowered down as the second plate 24 is fitted into the cut 32a and the nut 45 is run along the slot 34 so that a conflict of the beam 31 and the nut 45 can be prevented.

When the tapered heads of the rods 26 are fitted into an entrance portion of the holes 32b, the beam 31 is positioned in a predetermined position.

The bore of the hole 32b has a diameter substantially identical to or slightly smaller than the diameter of the rod body, so that the rods 26 are fitted into the hole 32b, for example, by hammer until the beam 31 is lowered down to the limit and the first plate 22 of the connector 21 is fitted into the recess 33 of the beam 31.

Figure 7:
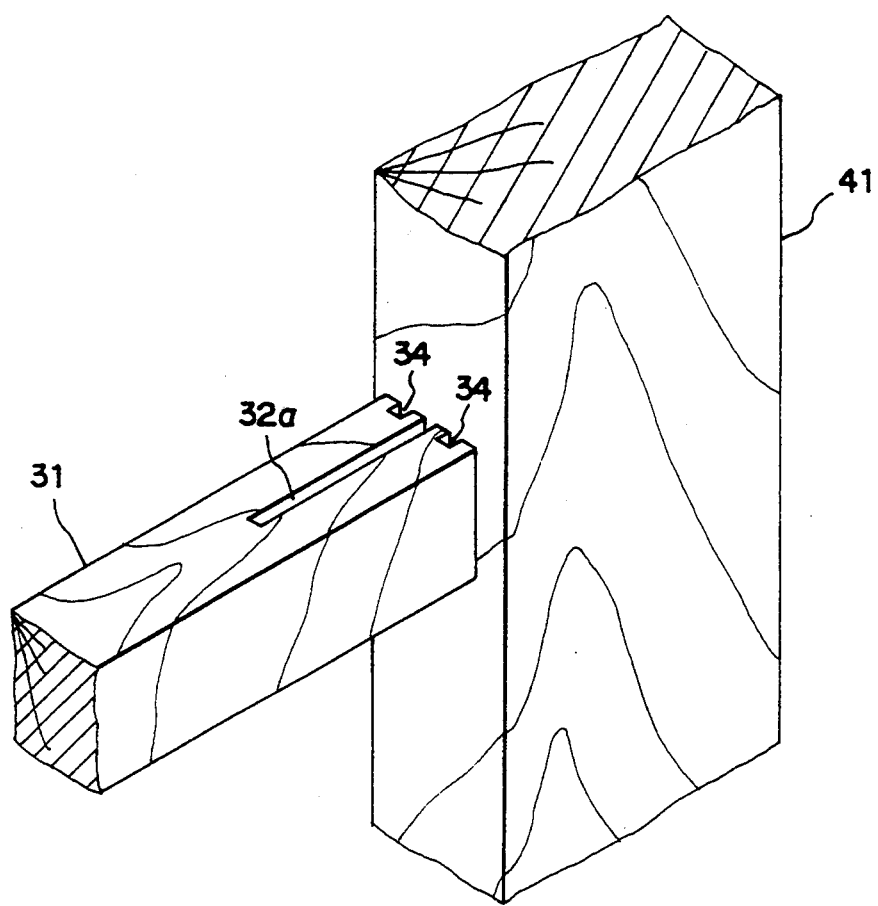
FIG. 7 is an isometric view showing a connecting structure of the beam and the column.

FIG. 7 is a isometric view showing the beam 31 and the column 41 which are connected each other.

Now, the connection of the beam 31 and the column 41 is completed and a predetermined connecting strength can be acquired by the close fit of the hole 32b and the rod 26.

However, there is a clearance between the beam 31 and the second plate 24 for convenience of application.

Therefore, in some cases, the above strength may be not be as much as a predetermined design strength.

Furthermore, in some cases, the beam may uplift from the connector.

In these cases, an adhesive can fill the clearance.

Figure 8:
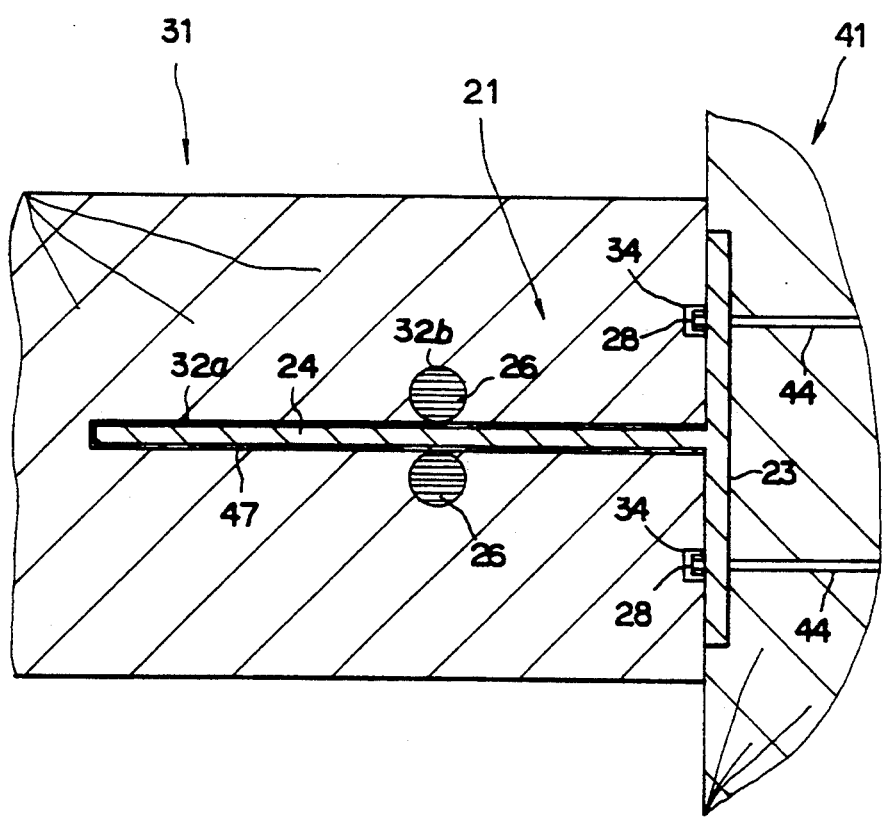
FIG. 8 is a horizontal section of a connecting structure using an adhesive.

FIG. 8 is a section of a connecting structure of the beam 31 and the column 41 by the connector 21.

As shown in FIG. 8, the adhesive 47 fills the clearance between the second plate 24 and the beam 31.

The adhesive 47 preferably has a bond strength substantially identical to or larger than a strength of the beam 31 and has a superior bond performance of the beam 31 and the second plate 24, for example, by use of an epoxy resin.

Figure 9:
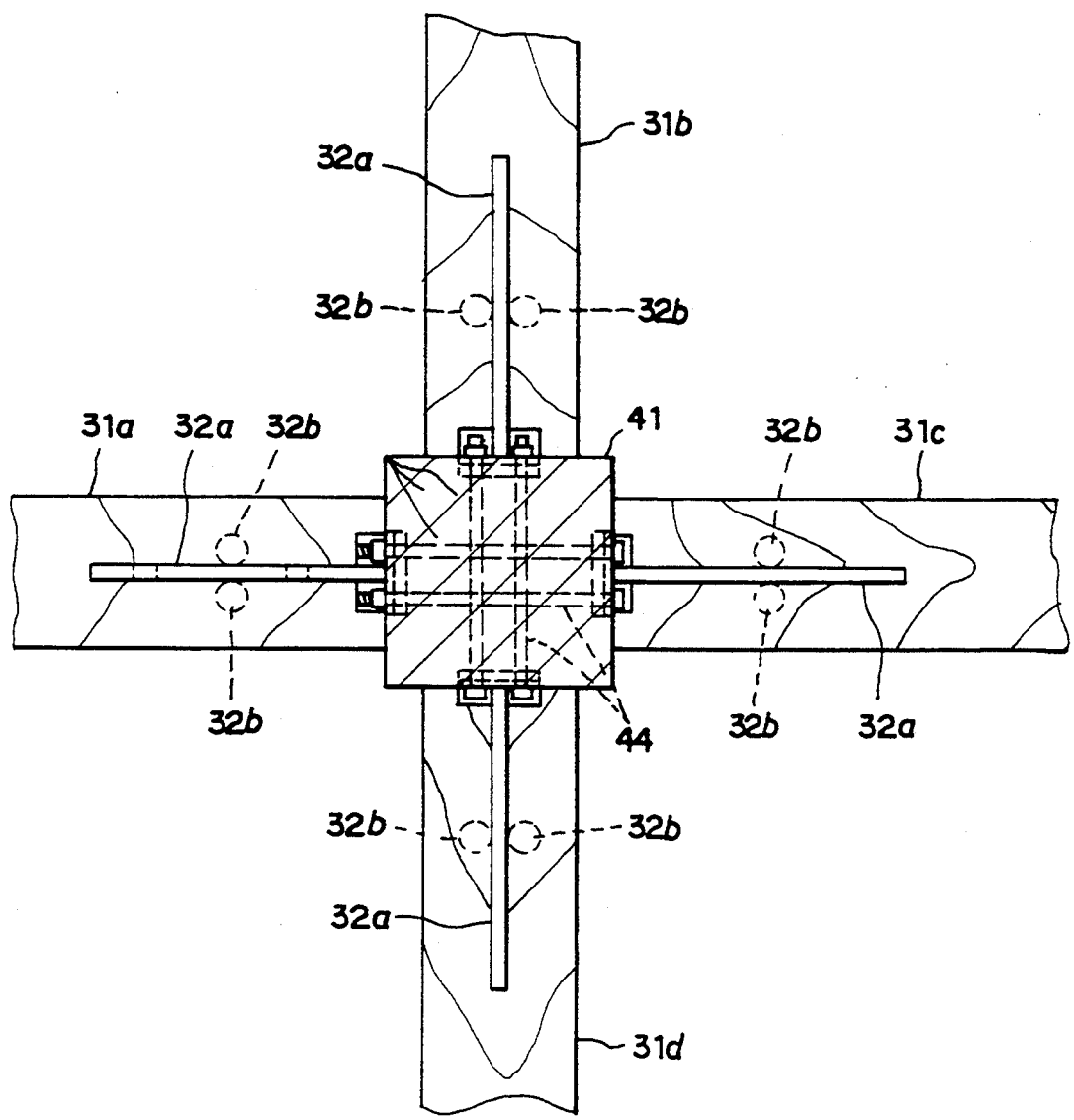
FIG. 9 is a plan view showing a modification of the first embodiment.

FIG. 9 is a plan view showing a connection structure in which four beams 31a, 31b, 31c and 31d are connected to the column 41 by four connectors.

Figure 10:
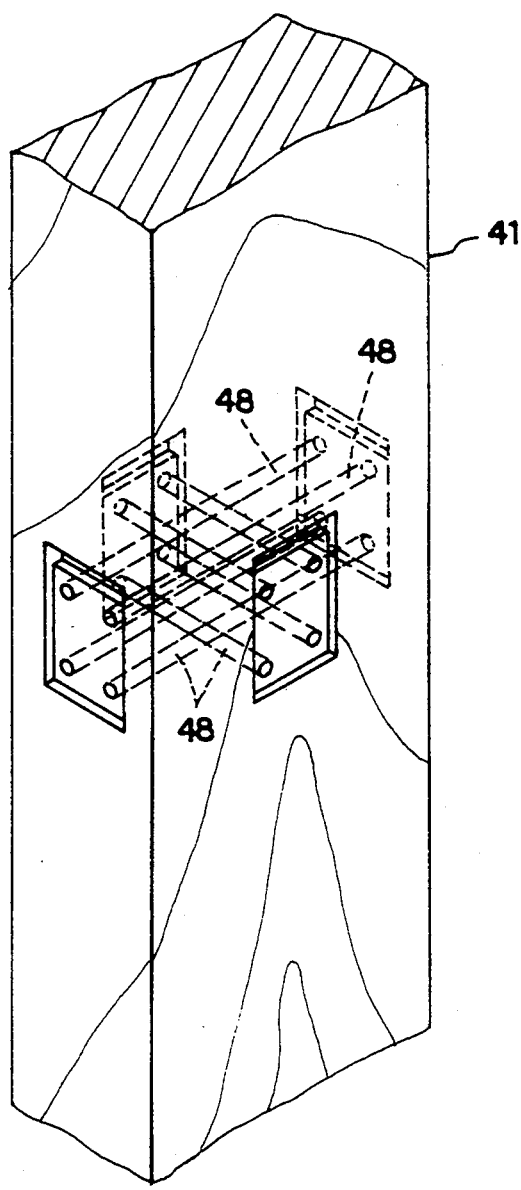
FIG. 10 is an isometric view showing bolt holes provided in the column shown in FIG. 10.

FIG. 10 is an isometric view showing a crossing structure with holes 48 provided in the column 41, for mounting each of the third plate of the connectors.

The above embodiment provides the following merits.

(1) The connection of the beam and the connector is carried out by the close fit of the rods into the holes without bolts, nails and wedge so that the beam can be positioned precisely in a short period of time.

Thus, the connecting operation can be carried out easily and effciently.

(2) A portion of the connector is not projected beyond a top surface of the beam as shown FIG. 7 so that a finishing material, for example, a flooring can be applied on the top surface directly.

Figure 11:
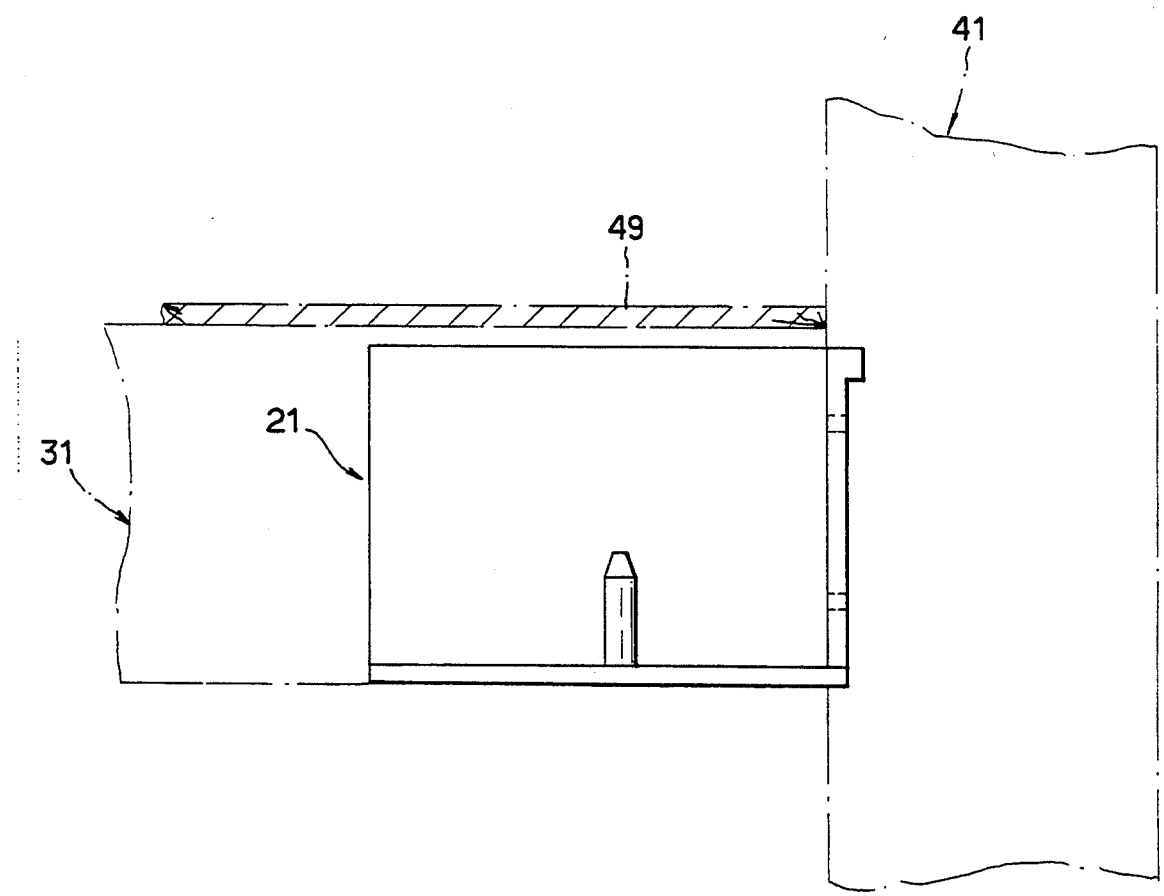
FIG. 11 is a vertical section of the connecting structure of the beam and the column.

FIG. 11 shows a flooring 49 applied directly on the top surface of the beam 31.

The thickness of the flooring 49 is preferably from 10 mm to 50 mm, further preferably from 25 mm to 30 mm.

The flooring is directly applied to the beam so that the flooring and the beam are integral such that a stiffness in a predetermined horizontal plane is increased and thus structural strength against an earthquake can be increased and in some cases a brace in the horizontal plane can be omitted.

(3) Because of no wedge being utilized, in the connection of the column and the beam, the beam can be lowered down without a slight inclination of the column.

Therefore, the column can be fixed before the connection and thus a multi-layer building can be constructed easily and efficiently.

(4) The hole of the beam can be worked easily because of a round shape.

(5) The rods are fitted into the hole with a close fit and the rods are fixed to the first and second plate by welding.

And the rods and the holes are integral because of the close fit and the clearance between the beam and the second plate is filled with an adhesive so that the sectional area of the beam is not reduced.

Therefore, the connecting strength can be increased and the layer deformation during earthquake can be decreased.

Furthermore, the rods and the beam are integral so that a stress concentration may be hard to occur.

(6) The connector is not exposed in the beam except for an under surface of the first plate provided in the connector.

Therefore, if a facing material, which area is substantially identical to that of the under surface and which has an appearance similar to the beam, is applied on the under surface, the connector can be perfectly covered.

In above embodiment, the rods are provided in the connector as a protruded portion, but the protruded portion need not necessarily be a rod and, for example, a plate can be used as a protruded portion.

For example, the cut and the second plate can be made so that the second plate can be fitted into the cut with a close fit, that is, the second plate can be provided as a protruded portion.

In the above embodiment, the second plate of the connector and the connecting portion of the beam are secured not only by the close fit between the rods and the holes but also by the adhesive.

However, alternatively to the adhesive, the second plate and the connecting portion can be secured by a screw.

Figure 12:
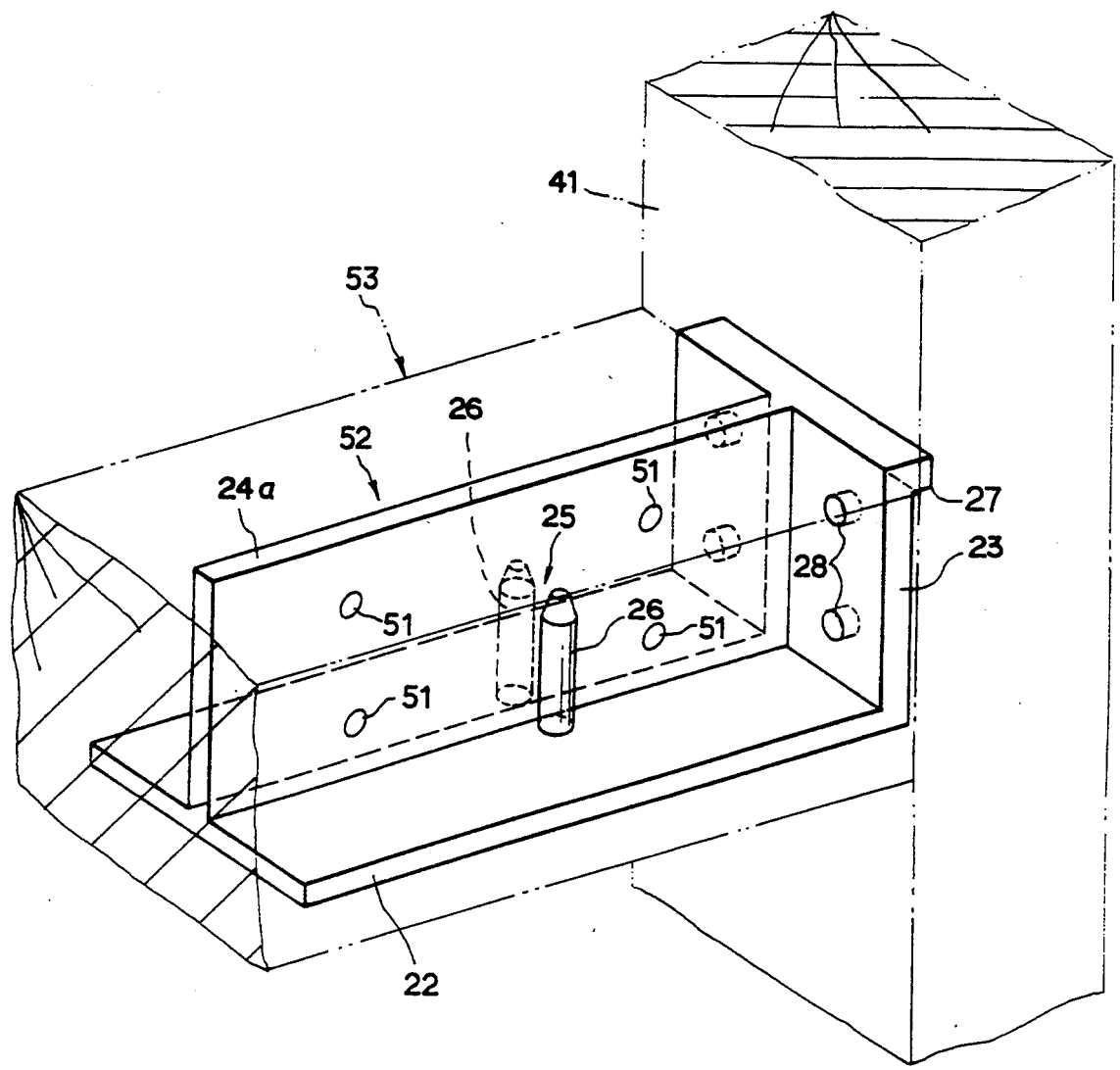
FIG. 12 is an isometric view showing a modified connector for connecting a beam to a column.
Figure 13A:
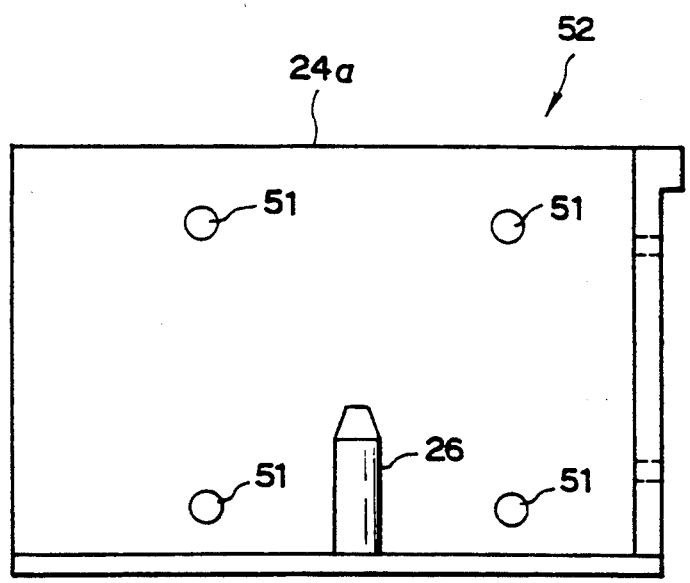
FIG. 13A is an elevation of the connector shown in FIG. 12
Figure 13B:
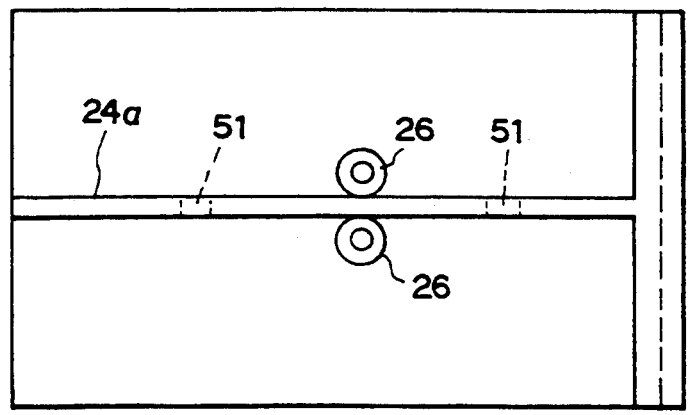
FIG. 13B is a plan view of the connector.

FIGS. 12, 13A and 13B show a connector 52 provided with a screw hole 51 in a second plate 24a of the connector 52, for penetrating screws which secure the second plate 24a to a connecting portion of a beam 53.

Figure 14:
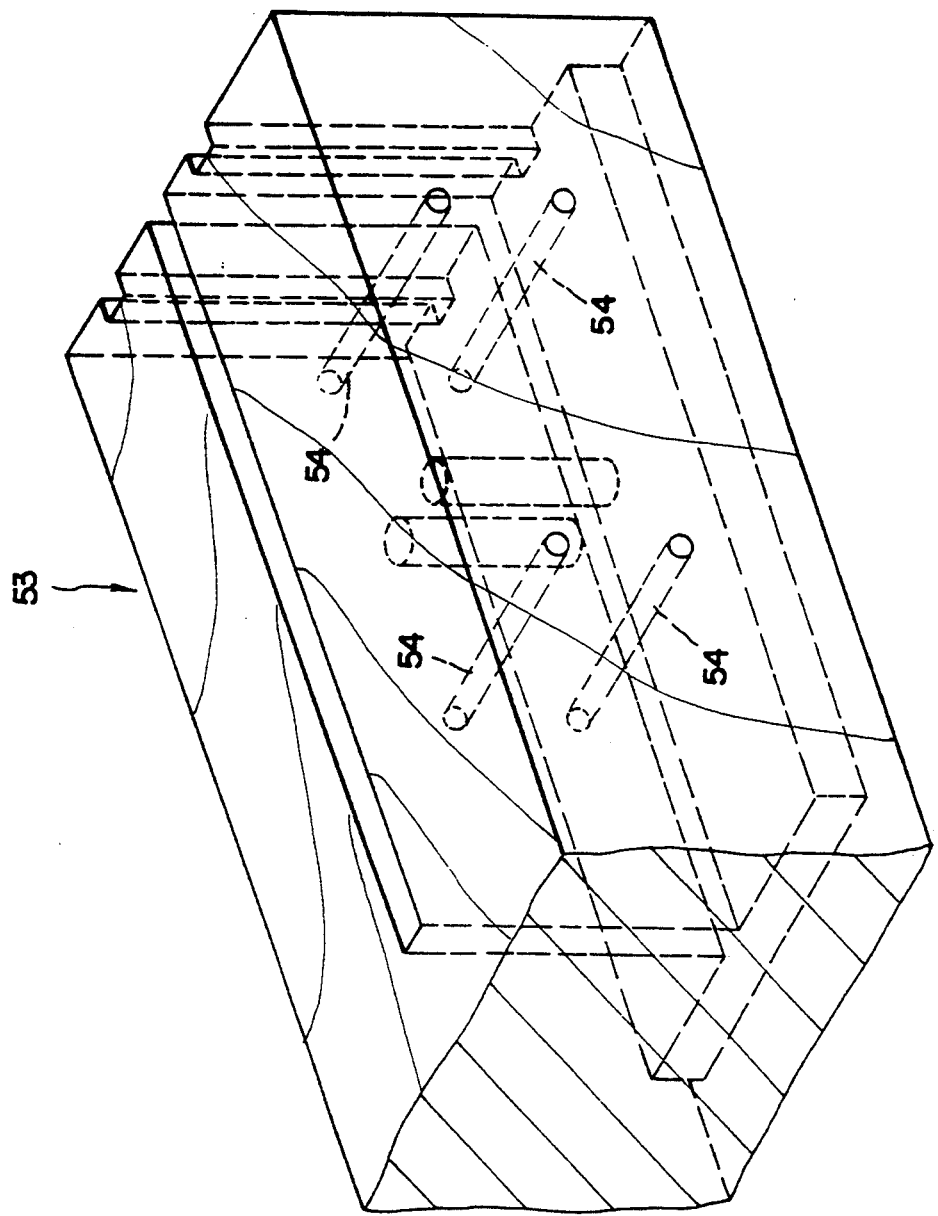
FIG. 14 is an isometric view showing a connecting portion of the beam.

FIG. 14 is an isometric view showing the connecting portion of the beam 53, provided with a screw hole 54 for penetrating the screws.

Figure 15:
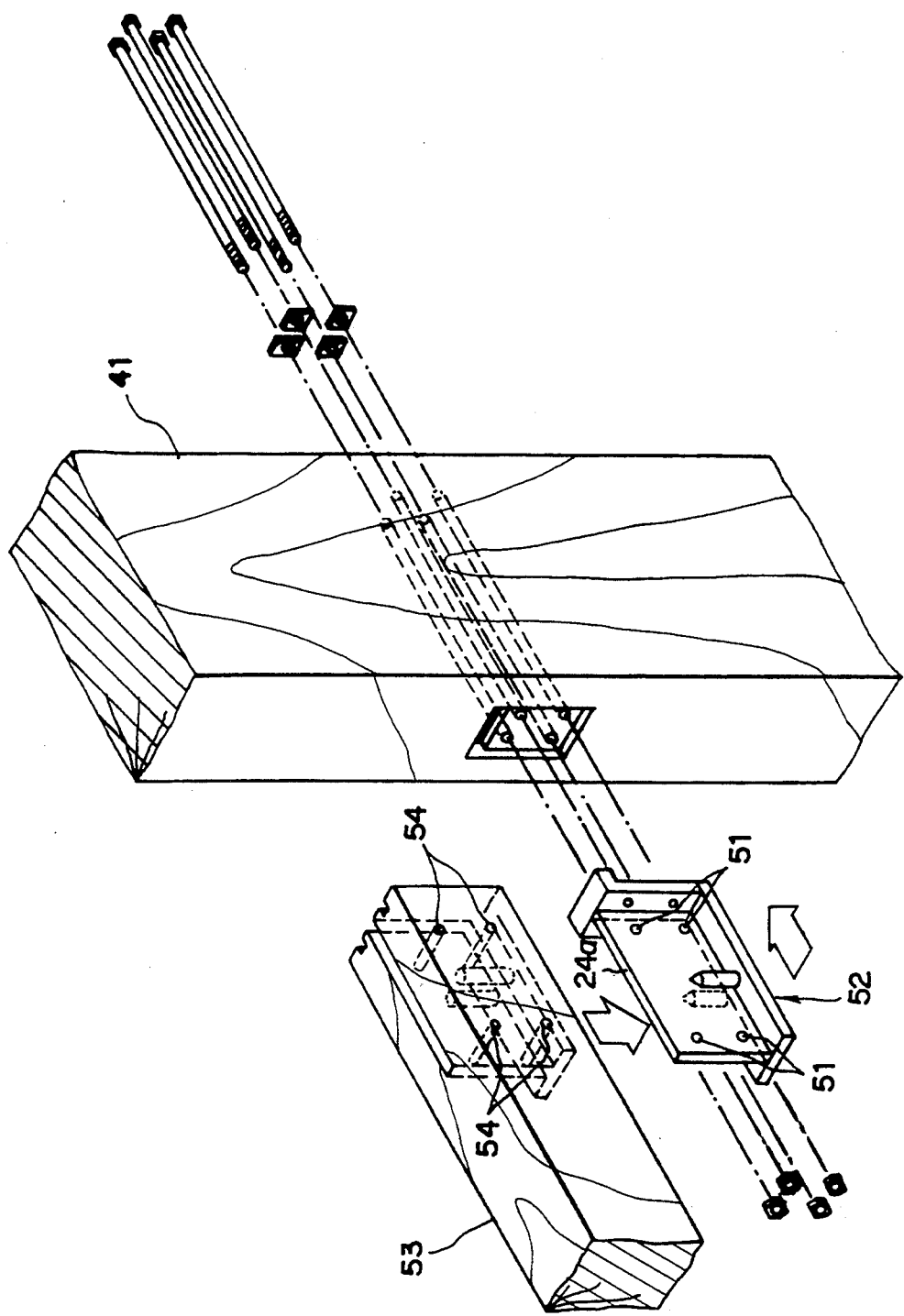
FIG. 15 is an isometric view showing a connecting operation of the beam and the column.

FIG. 15 shows a connecting operation for the beam 53 and the column 41.

As shown in FIG. 15, the connecting operation is similar to FIG. 5, but in FIG. 15 after the beam 53 is lowered down until a recess provided in an under surface of the beam is fitted into a first plate of the connector 52, and screws are inserted in the screw holes 54 and screwed into the screw holes 51 and the connecting portion of the beam 53 across the second plate 24a.

Figures 16A, 16B:
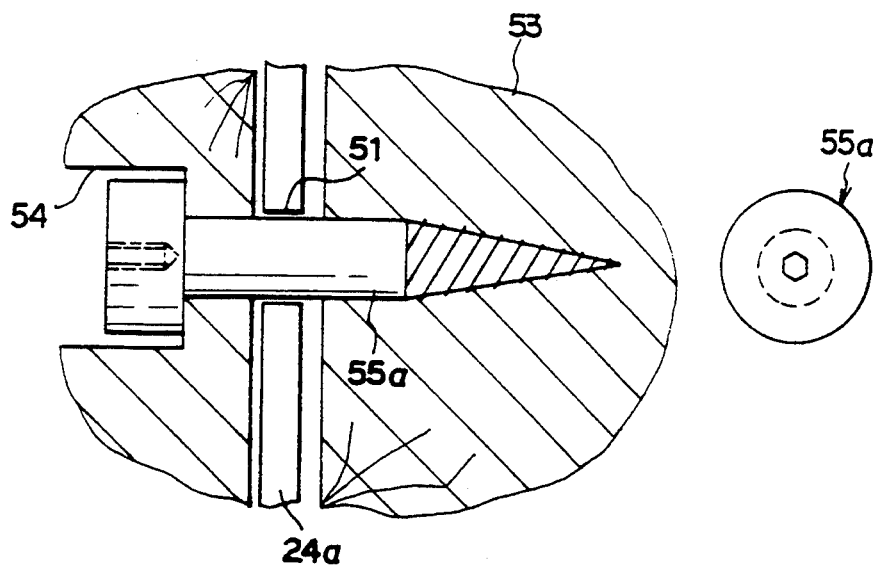
FIG. 16A is an elevation showing a screw which is screwed into the connecting portion and FIG. 16B is another elevation of the screw.

FIG. 16A is a section showing a screw 55a screwed into the second plate 24a and the connecting portion of the beam 53 and the FIG. 16B shows a head of the screw 55a.

The screw 55a can be screwed with a hexagonal wrench.

Figures 17A, 17B:
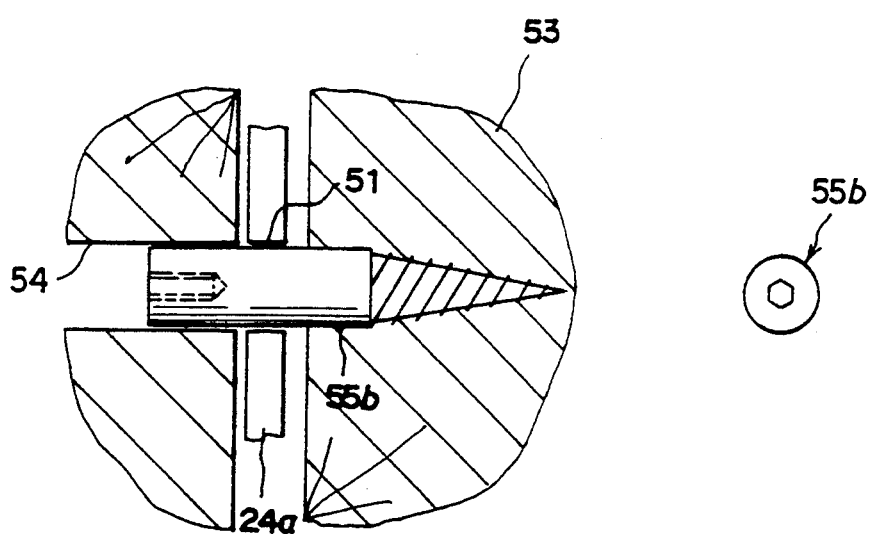
FIG. 17A is an elevation showing a screw which is screwed into the connecting portion and FIG. 17B is an another elevation of the screw.

FIG. 17A is a section shown a screw 55b which the screw 55a is modified and FIG. 17B shows a head of the screw 55b.

For requirement of a larger connecting strength, a screw hole having a bore substantially identical to or smaller than a diameter of the screw 55a or 55b, is provided in the second plate and then the screw 55a or 55b is screwed into the screw hole in close fit so that the connecting strength between the second plate and the connecting portion of the beam, can be increased.

Alternatively to the adhesive or the screw, the second plate and the connecting portion can be secured by a rod member.

Figure 18A:
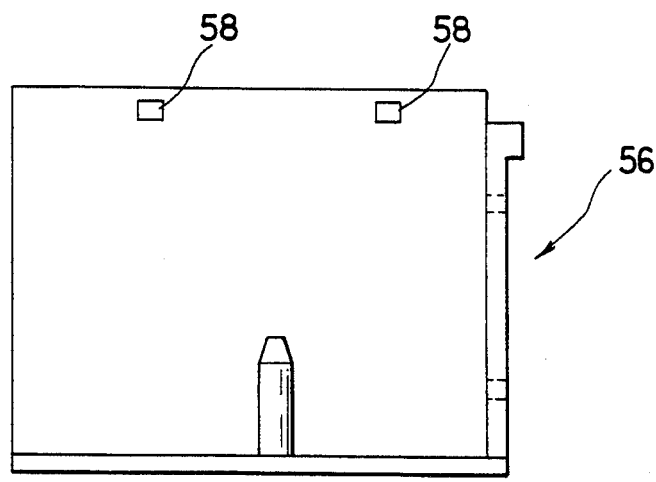
FIG. 18A is an elevation showing a modificated connector.
Figure 18B:
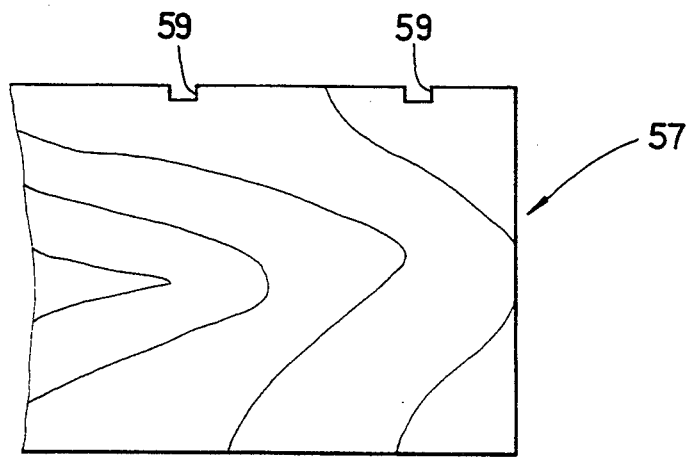
FIG. 18B is an elevation showing a beam corresponding to the connector and FIG. 18C is a connecting structure of the connector and the beam.

FIG. 18A is a connector 56 provided with holes 58 for penetrating the rod members and FIG. 18B is a beam 57 provided with slots 59 for running of the rod members.

Figure 18C:
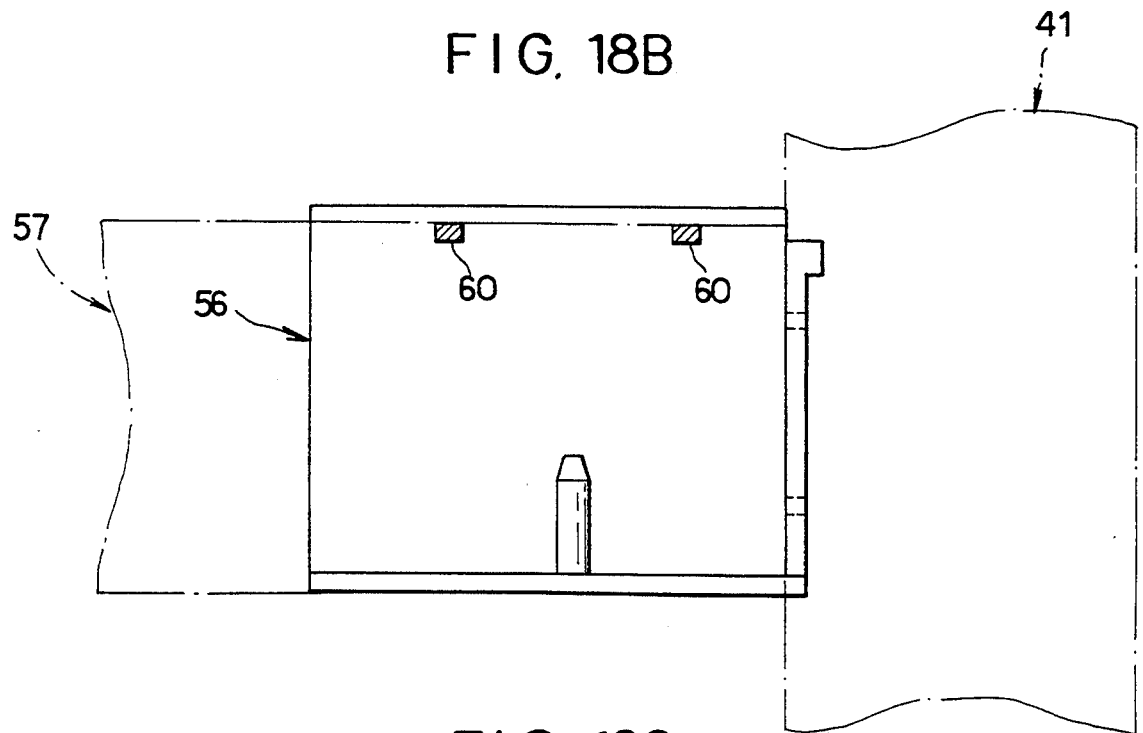

In connecting operation, as shown in FIG. 18C, the connector 56 is mounted to the column 41 and then the beam 57 is connected to the connector 56, according to above mentioned procedure.

Then, the rod members 60 are inserted from a lateral surface of the beam 57 along the slots 59 and are fitted into the holes 58 in close fit.

Thus, the beam 57 can be fixed to the connector 56 so that uplifting from the connector 56 can be prevented.

There is no hole in the beam so that cracking of the beam because of a stress concentration around a hole can be prevented.

The rod members 60 are rectangular-shaped but may be pin-shaped.

In an application of a finishing material to the beam 57, the second plate can be fitted into a slot or cut provided in the finishing material.

The adhesive, the screw and the rod member can be combined arbitrarily and the number of the screw or the rod member can be adjusted corresponding to the necessary connecting strength.

Figure 19:
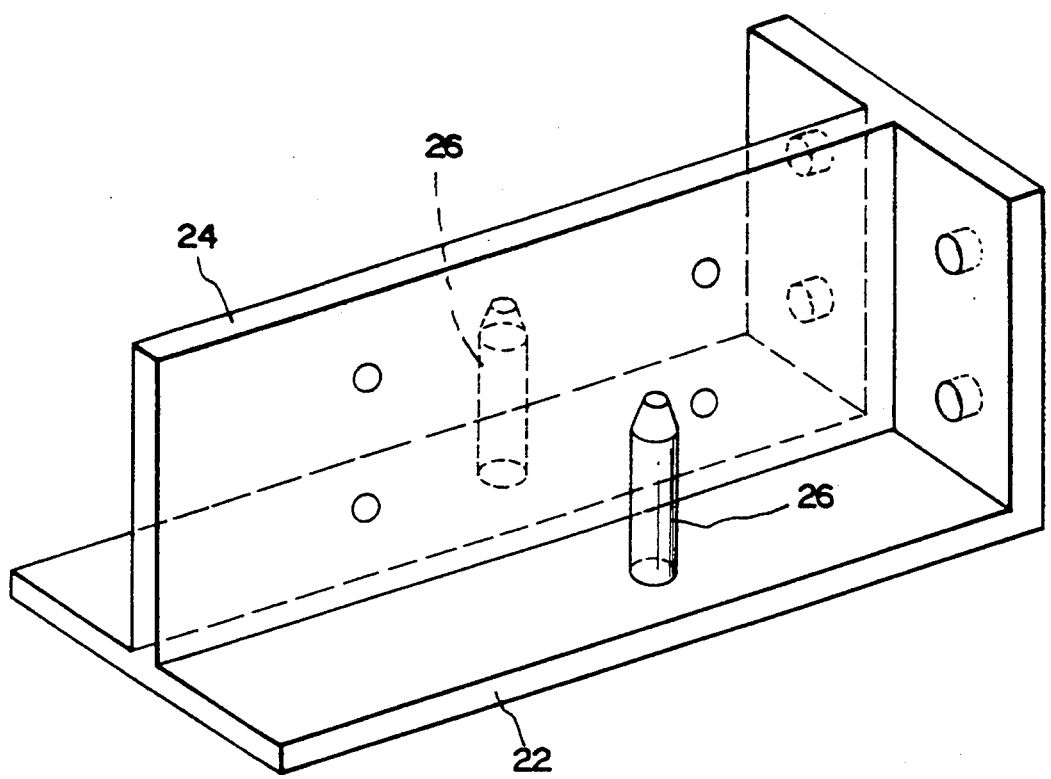
FIG. 19 is an isometric view showing a modified connector.

For a requirement of smaller connecting strength, rods 26 can be fixed only to the first plate 22, as shown FIG. 19 and the adhesive, the screw and the rod member can be arbitrarily omitted.

Figure 20:
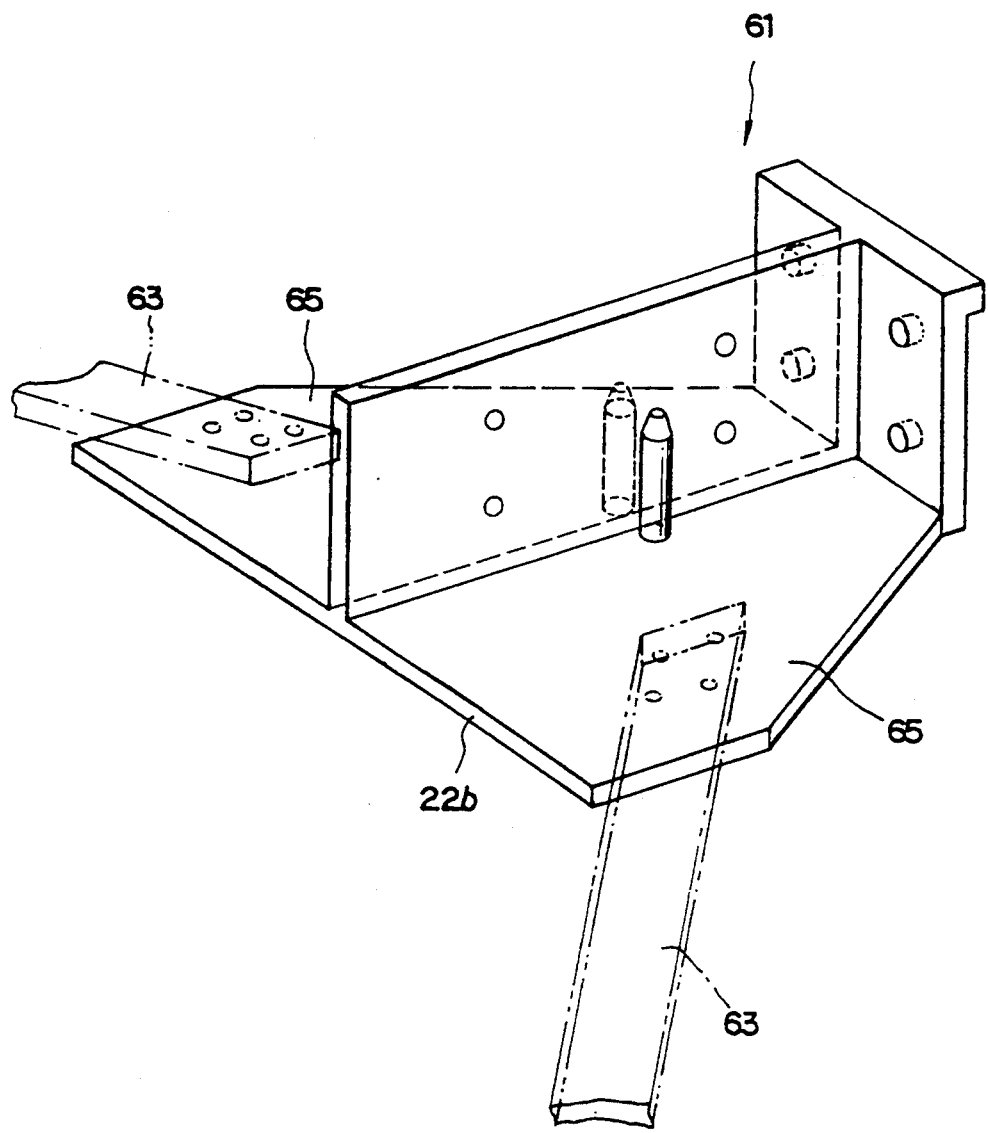
FIG. 20 is an isometric view showing a connector of a variation of the first embodiment.

FIG. 20 is a variation of above embodiment, which shows a connector 61 comprising a brace fitting means 65 provided in the first plate 22b, for fitting a brace 63 to the first plate 22b.

The brace fitting means 65 comprises a bolt hole in an extended portion of the first plate 22b.

The braces 63 are located in a horizontal plane.

Figure 21:
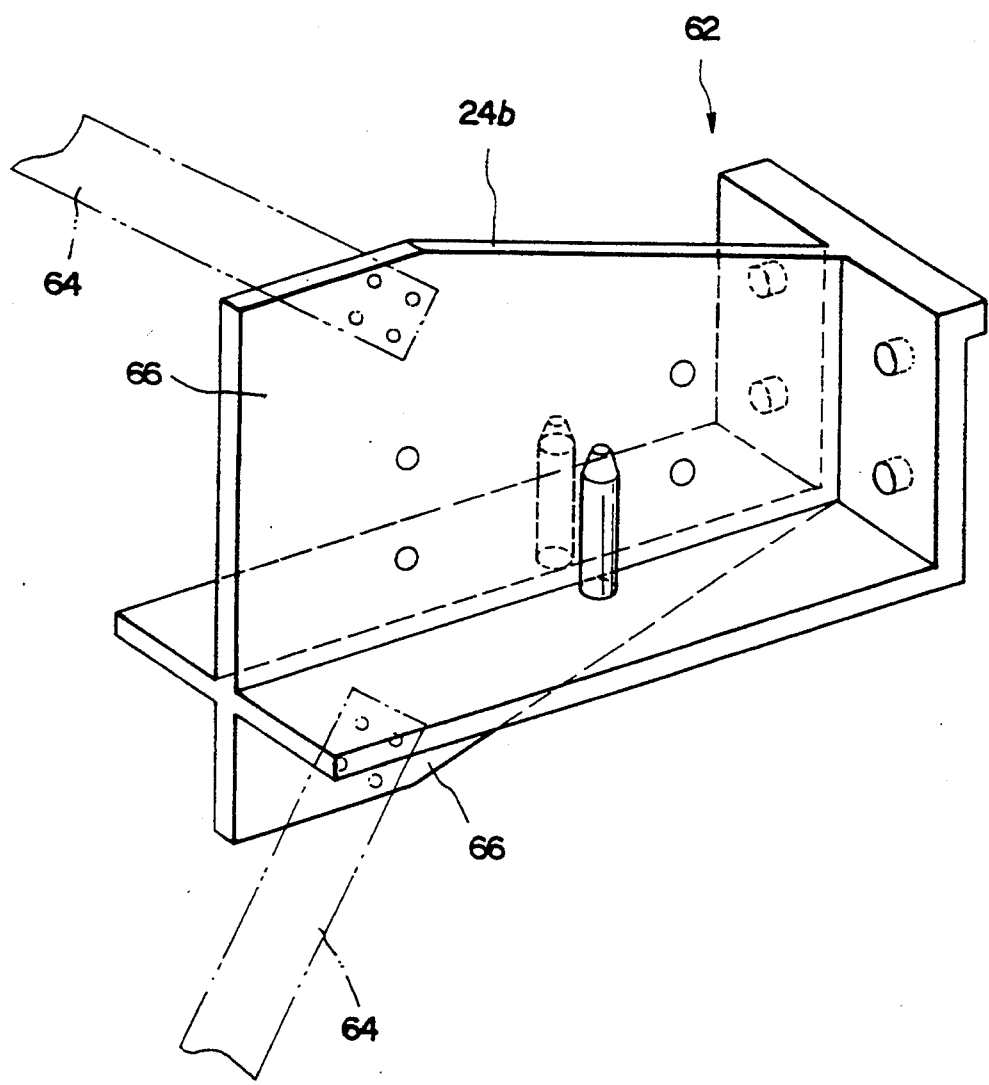
FIG. 21 is an isometric view showing a connector of another variation of the first embodiment.

FIG. 21 is an another variation of above embodiment, which shows a connector 62 comprising a brace fitting means 66 provided in the second plate 24b, for fitting a brace 64 to the second plate 24b.

The braces 64 are located in a vertical plane.

A brace strength is set typically by a connecting strength between the brace and the other member, not a strength of brace itself because the connection of the brace is not strong.

Therefore, the brace strength may not be increased, even though the brace which sectinal area is large, is used.

The brace fitting means 65 and 66 can increase the connecting strength of the brace to the beam or the column, so that the brace strength can be increased corresponding to the sectional area of the brace.

Figure 22:
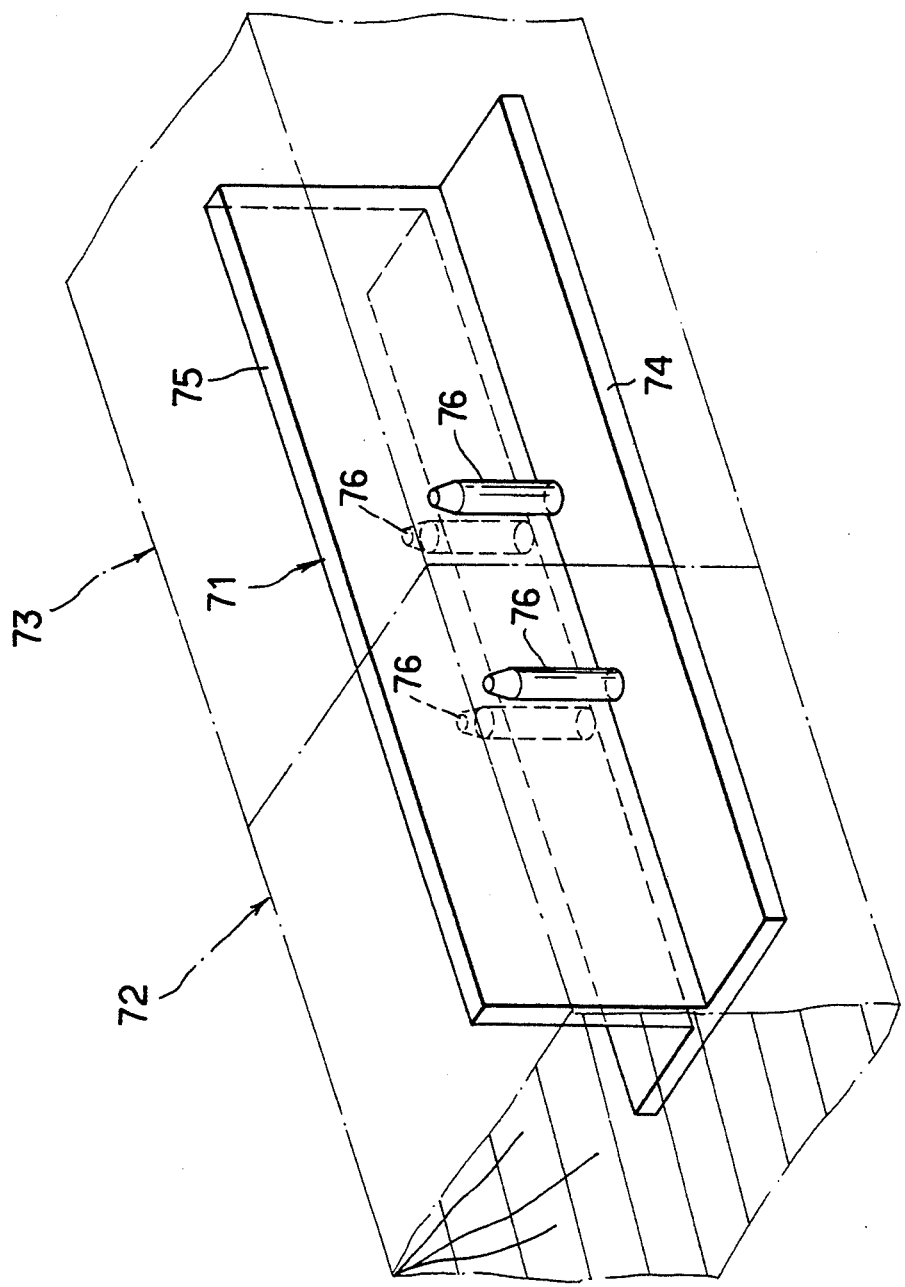
FIG. 22 is an isometric view showing a connector of further variation of the first embodiment.

FIG. 22 is an another variation of above embodiment, which shows a connector 71 for connecting a first beam 72 and a second beam 73.

The connector 71 comprises a first plate 74, a second plate 75 attached substantially perpendicularly to the first plate 74, which is fitted into predetermined cuts provided in the first and second beams 72 and 73 and a protruded portion, that is, rods 76 as a securing means for securing the first and second beams 72 and 73 to the connector 71.

The rods 76 are fitted into holes as a recessed portion with a close fit, provided in the first and second beams 72 and 73.

The cuts and holes are not shown in FIG. 22 but are substantially identical to the cuts 32a and the holes 32b shown in FIG. 3 respectively.

The rods 76 preferably are pin-shaped.

For larger connecting strength, the beams 72 and 73 and the second plate 75 can be screwed together by a screw and further or alternatively can be bonded with an adhesive.

The screws and the adhesive are not shown in FIG. 22 but are substantially identical to the screw 55a in FIG. 16A and the adhesive 47 in FIG. 8, respectively.

If braces are needed, the connector 71 preferably comprises a brace fitting means provided in the first plate 74.

The brace fitting means is not shown in FIG. 22 but is substantially identical to the brace fitting means 65 in FIG. 20 or the brace fitting means 66 in FIG. 21.

The merits of the connector 71 are not specifically mentioned but are substantially identical to the merits attained by the former embodiment.

Next, a second embodiment is explained.

Figure 23:
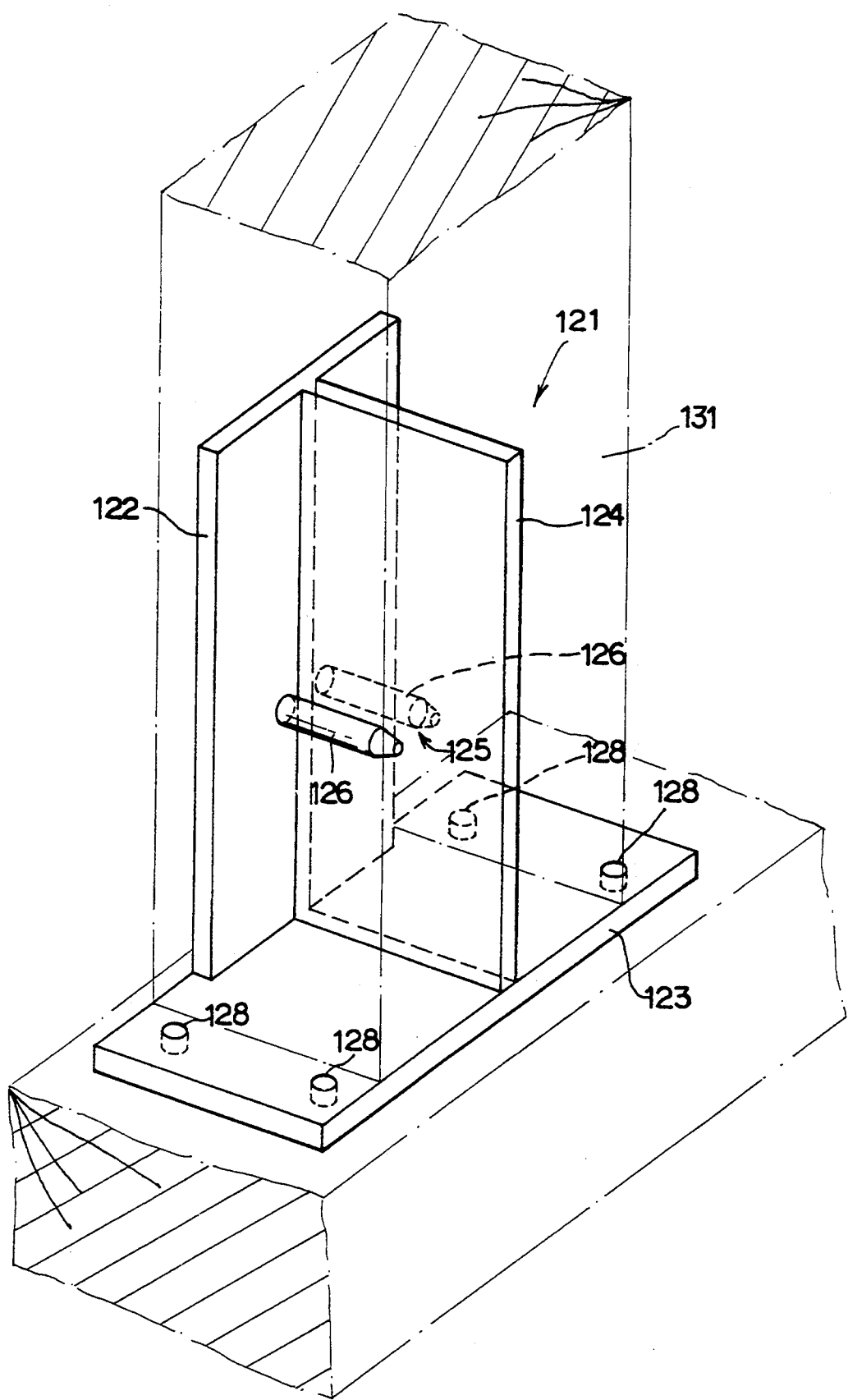
FIG. 23 is an isometric view showing a connector of a second embodiment, for connecting a column to a footing beam.
Figure 24A:
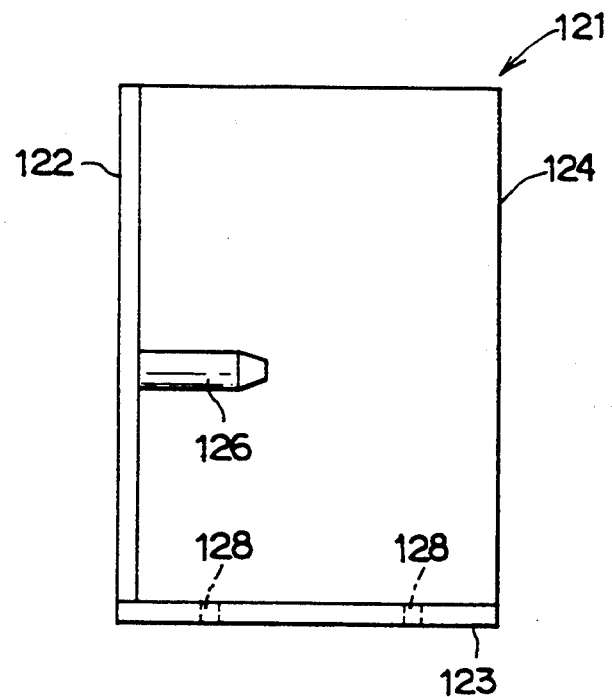
FIG. 24A is an elevation of the connector shown in FIG. 23
Figure 24B:
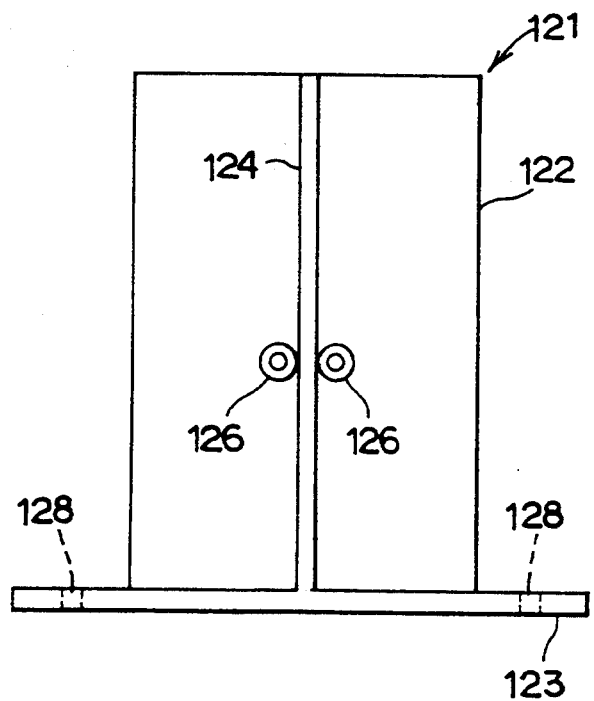
FIG. 24B is a plan view of the connector.

A connector 121 of the second embodiment, shown in FIGS. 23, 24A and 24B, for connecting a column 131 and a footing beam 141, comprises a first plate 122 and a second plate 124 attached substantially perpendicularly to the first plate 122.

The second plate 124 is fitted into a predetermined cut provided in the column 131 in loose fit.

The connector 121 comprises a third plate 123 for mounting the connector 121 to the footing beam 141, which is attached to one end of the first plate 122 and the second plate 124 and which is substantially perpendicular to the plates 122 and 124.

The third plate 123 is provided with holes 128 for penetrating bolts for mounting the third plate 123 to the footing beam 141.

The connector 121 comprises a protruded portion 125 as a securing means for securing the column 131 to the connector 121.

The protruded portion 125 consists of two rods 126.

The rods 126 are fitted into a recessed portion with a close fit, which is provided in the column 131.

The rods 126 are substantially identical to the rods 26 so that a detailed explanation of the rods 126 is omitted.

The plates 122, 123 and 124 may be integrally molded or assembled by welding.

Figure 25:
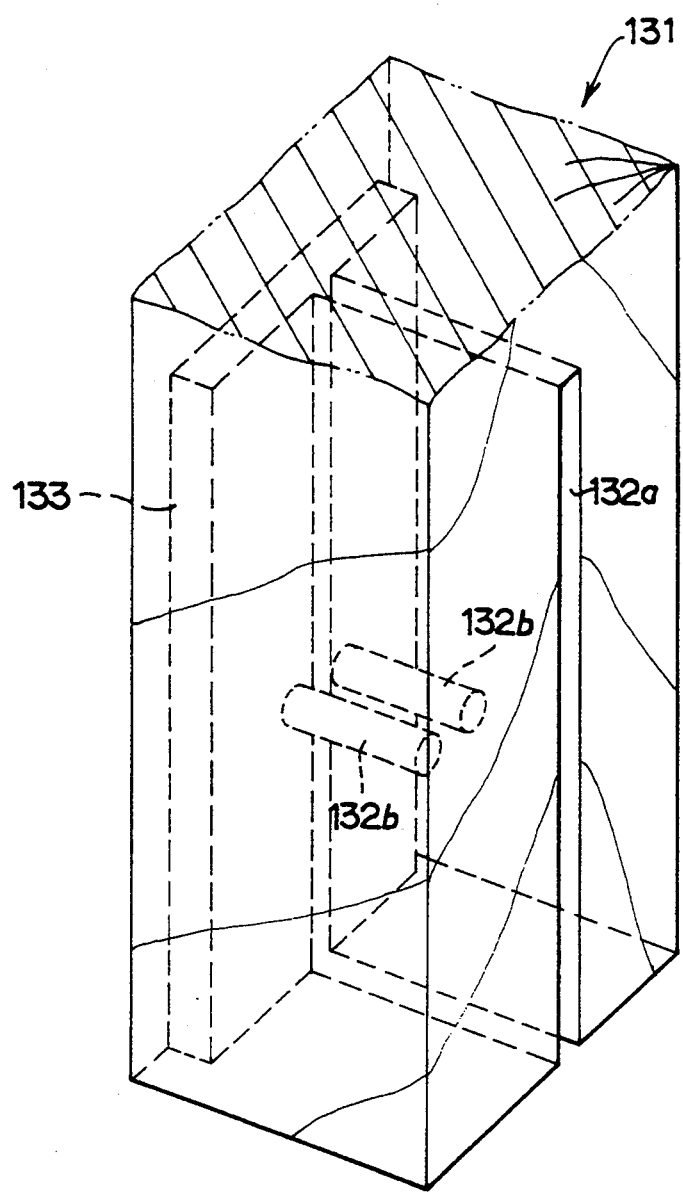
FIG. 25 is an isometric view showing a connecting portion of the column.
Figure 26A:
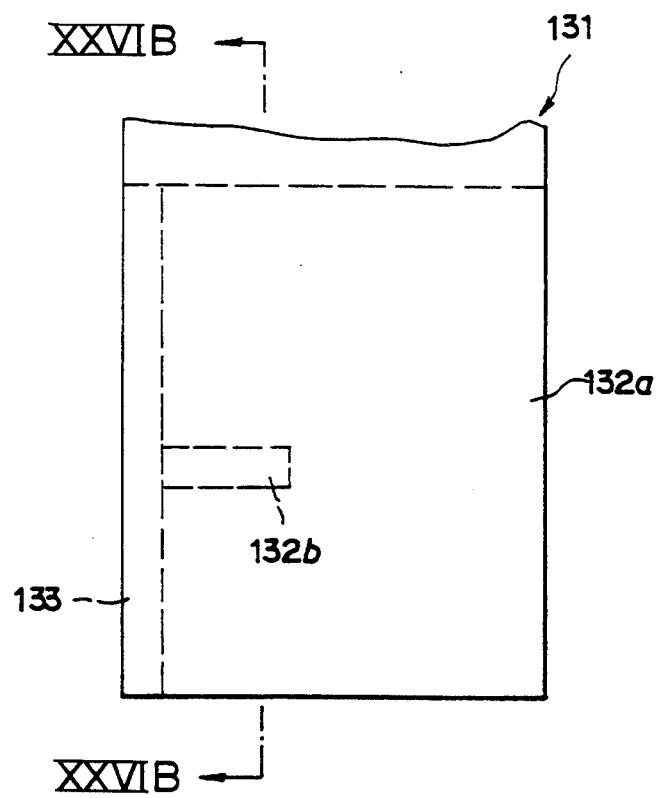
FIG. 26A is an elevation of the connecting portion shown in FIG. 25
Figure 26B:
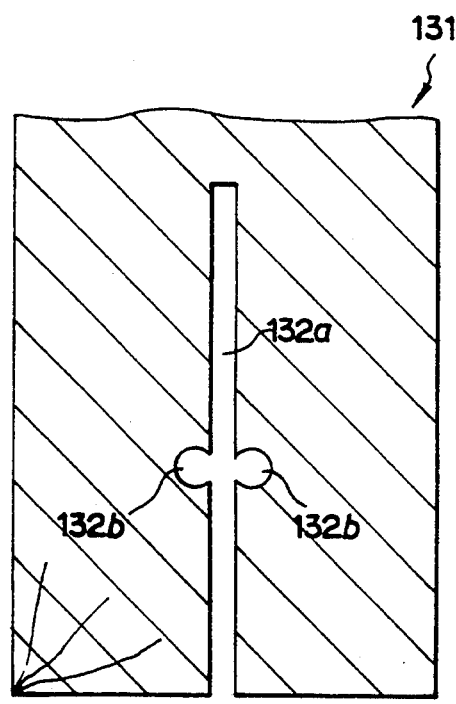
FIG. 26B is a section taken along a XXVIB—XXVIB line.

The column 131, as shown in FIGS. 25, 26A and 26B, has a cut 132a in a connecting portion for connecting the column 131 to the connector 121.

The cut 132a is substantially identical to the cut 32a so that a detailed explanation for the cut 132a is omitted.

The column 131 comprises holes 132b as an recessed portion in the connecting portion, into which the rods 126 as a protruded portion is fitted in a close fit.

The holes 132b are preferably positioned in a predetermined position so that an axial force of the column 131 does not act directly on the rods 126 of the connector 121 but acts on the third plate 123.

That is, the distance between the center of rods 126 and a surface of the third plate 123, is preferably slightly smaller than the height from an end surface of the column 131 to a center of a hole 132b.

Thus, in an ordinary condition, an axial force of the column 131 acting in vertical downward direction, can be transmitted to the footing beam 141 by the third plate 123 and during an earthquake, an axial force of the column 131 acting in vertical upward direction, can be transmitted to the footing beam 141 by the rods 126.

The holes 132b are substantially identical to the holes 132b so that a detailed explanation for the holes 132b is omitted.

The column 131 further comprises a recess 133 into which the first plate 122 is fitted.

The recess 133 is substantially identical to the recess 33 so that a detailed explanation for the recess 133 is also omitted.

Figure 27:
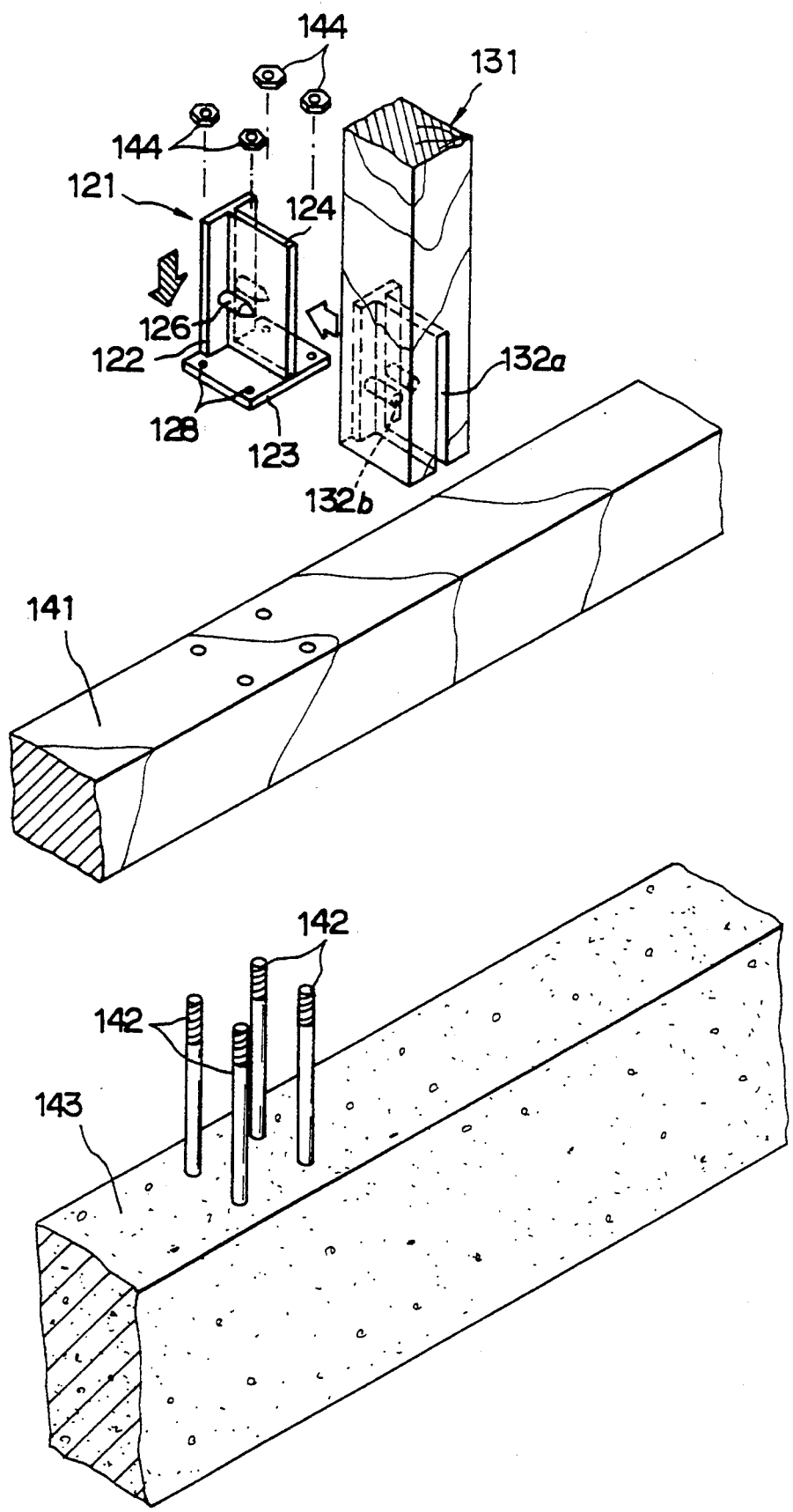
FIG. 27 is an isometric view showing a connecting operation of the column and the footing beam.

In connecting operation of the column 131 and footing beam 141 by the connector 121, first of all, as shown in FIG. 27, bolts 142 which are anchored in the RC-footing 143 penetrate through bolt holes of the footing beam 141.

Then, the connector 121 is advanced along a direction shown by an cross hatched arrow and the bolts 142 penetrate the holes 128 of the third plate 123.

The connector 121, then, is fixed to the footing beam 141 by bolts 142 and nuts 144.

Then, the column 131 is moved in a horizontal direction shown by another arrow.

When the tapered heads of the rods 126 are fitted into an entrance portion of the holes 132b, the column 131 is positioned in a predetermined position.

The bore of the hole 132b has a diameter substantially identical to or slightly smaller than the diameter of the rod body, so that the rods 126 are fitted into the hole 132b, for example, by means of a hammer, for example, until the column 131 is moved to the limit and the first plate 122 of the connector 121 is fitted into the recess 133 of the column 131.

Figure 28:
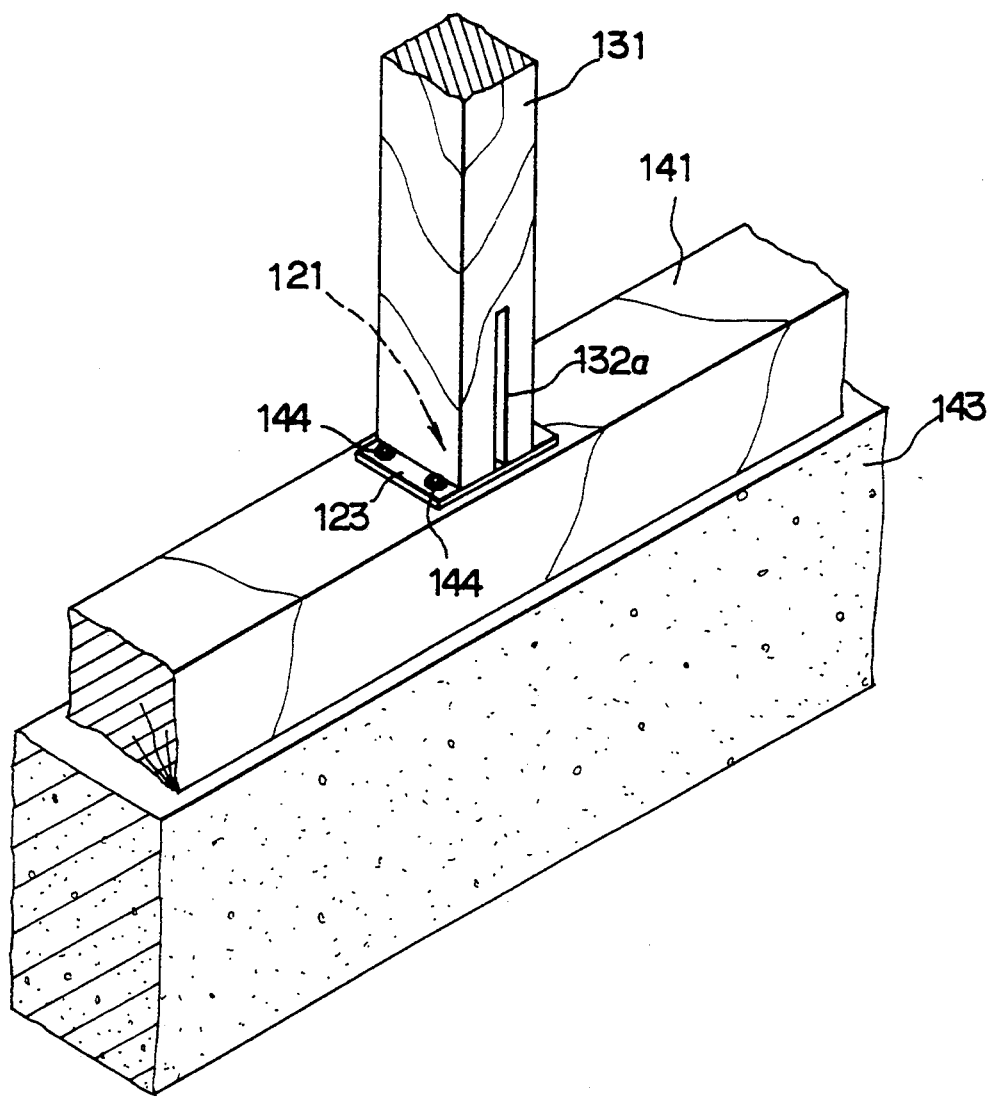
FIG. 28 is an isometric view showing a connecting structure of the column and the footing beam.

FIG. 28 is a isometric view showing the column 131 and the footing beam 141 which are connected with each other.

Now, the connection of the column 131 and the footing beam 141 is completed and a predetermined connecting strength can be acquired by the close fit of the hole 132b and the rod 126.

However, there is a clearance between the column 131 and the second plate 124 for application convenience.

Therefore, in some cases, the above-noted strength may be not enough for predetermined design strength.

In this case, an adhesive can fill the clearance.

Figure 29:
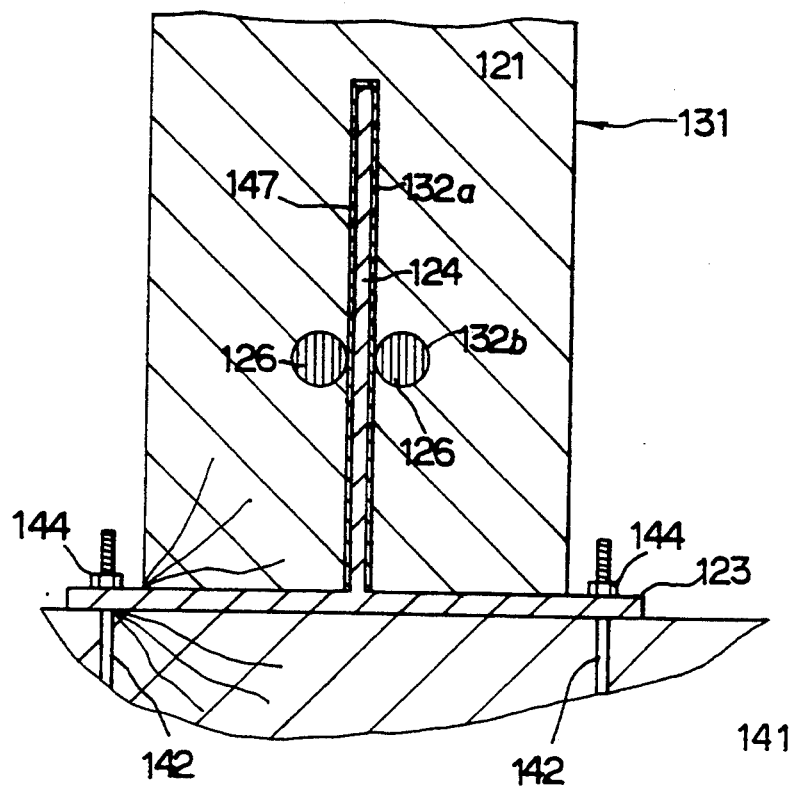
FIG. 29 is a vertical section of a connecting structure using an adhesive.

FIG. 29 is a section of a connecting structure of the column 131 and the footing beam 141 by the connector 121.

The adhesive 147 is substantially identical to the adhesive 47, so that a detailed explanation thereof is omitted.

Merits of the second embodiments are similar to those of the first embodiment, so that only the additional merits of the second embodiment are mainly explained and the common merits are explained concisely or are omitted hereunder.

(1) The axial force of the column in a downward vertical direction, is transmitted to the footing beam by the third plate so that a compressed area of the footing beam can be estimated as being the area of the third plate.

Therefore, axial strength is not limited by the transverse compressive strength of the footing beam.

(2) The axial force of the column in up vertical direction which arises during an earthquake, is transmitted to the footing beam by the rods so that extraction of the column from the footing or the footing beam can be prevented.

(3) The connecting operation can be carried out easily and efficiently.

(4) The finishing material, for example, an outer or inner wall are directly applied to the column 131 so that the wall and the column are integral, thus increasing stiffness in a predetermined vertical plane, and structural strength against an earthquake can be hence increased and in some cases a brace in the vertical plane may be omitted.

(5) The sectional area of the column is not reduced so that the connecting strength can be set with an increased value.

In the second embodiment, the rods are provided in the connector as a protruded portion, but the protruded portion need not necessarily be a rod, for example, a plate can be used as a protruded portion.

For example, the cut and the second plate can be made so that the second plate can be fitted into the cut with a close fit, that is, the second plate can be provided as a protruded portion.

Figure 30:
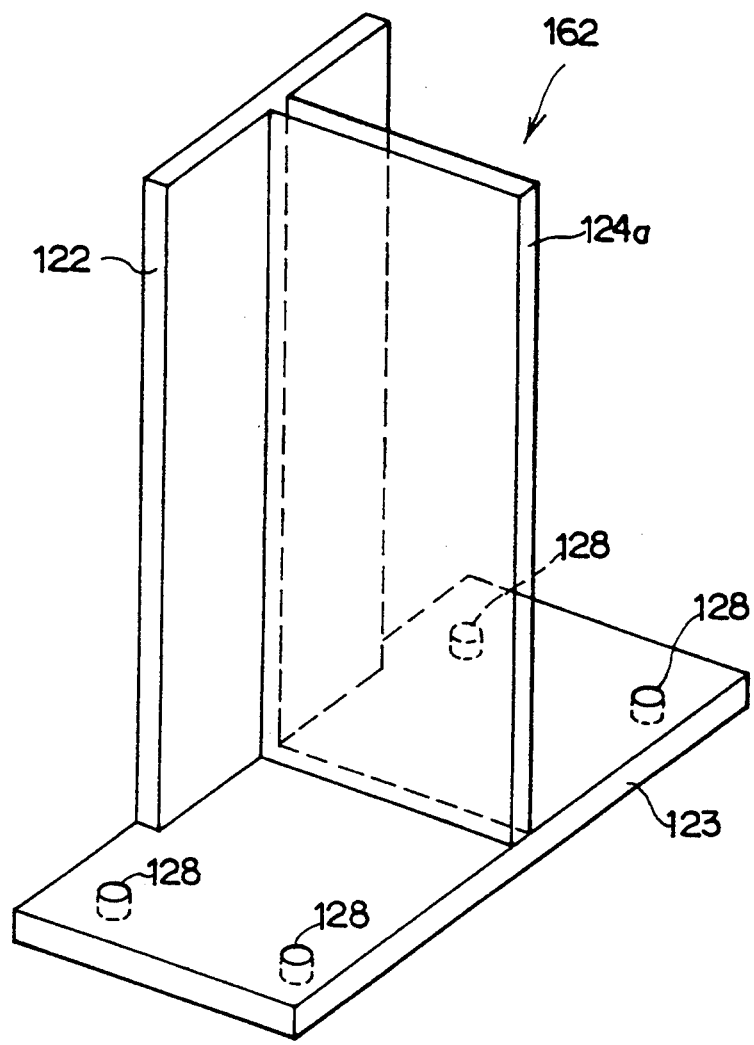
FIG. 30 is an isometric view showning a modification of the second embodiment.

In this case, the rods can be omitted, as shown in FIG. 30.

Figure 31:
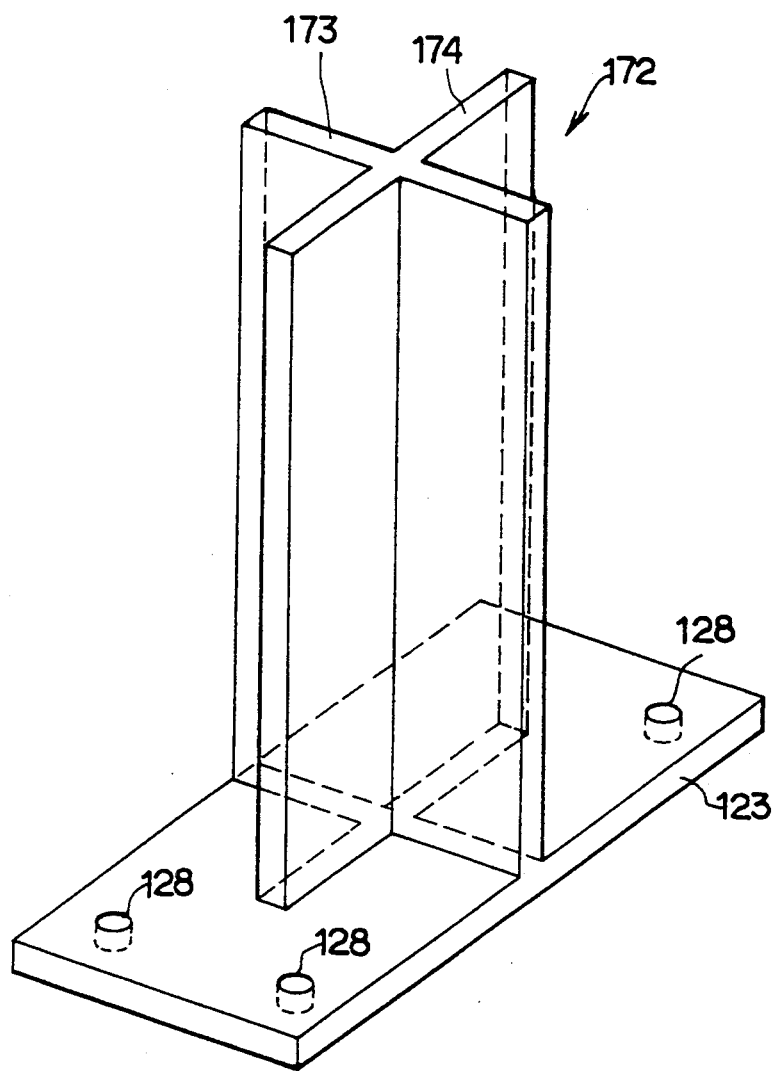
FIG. 31 is an isometric view showing an another modification of the second embodiment.

Furthermore, as shown FIG. 31, two plates 173 and 174 can be crossed and the cut and the two plates 173 and 174 can be made so that the plates can be fitted into the cut with a close fit, that is, the two plates 173 and 174 can be provided as a protruded portion.

In the above second embodiment, the second plate of the connector and the connecting portion of the beam are secured not only by the close fit between the rods and the holes but also by the adhesive.

However, alternatively of the adhesive, the second plate and the connecting portion can be secured by a screw.

Figure 32:
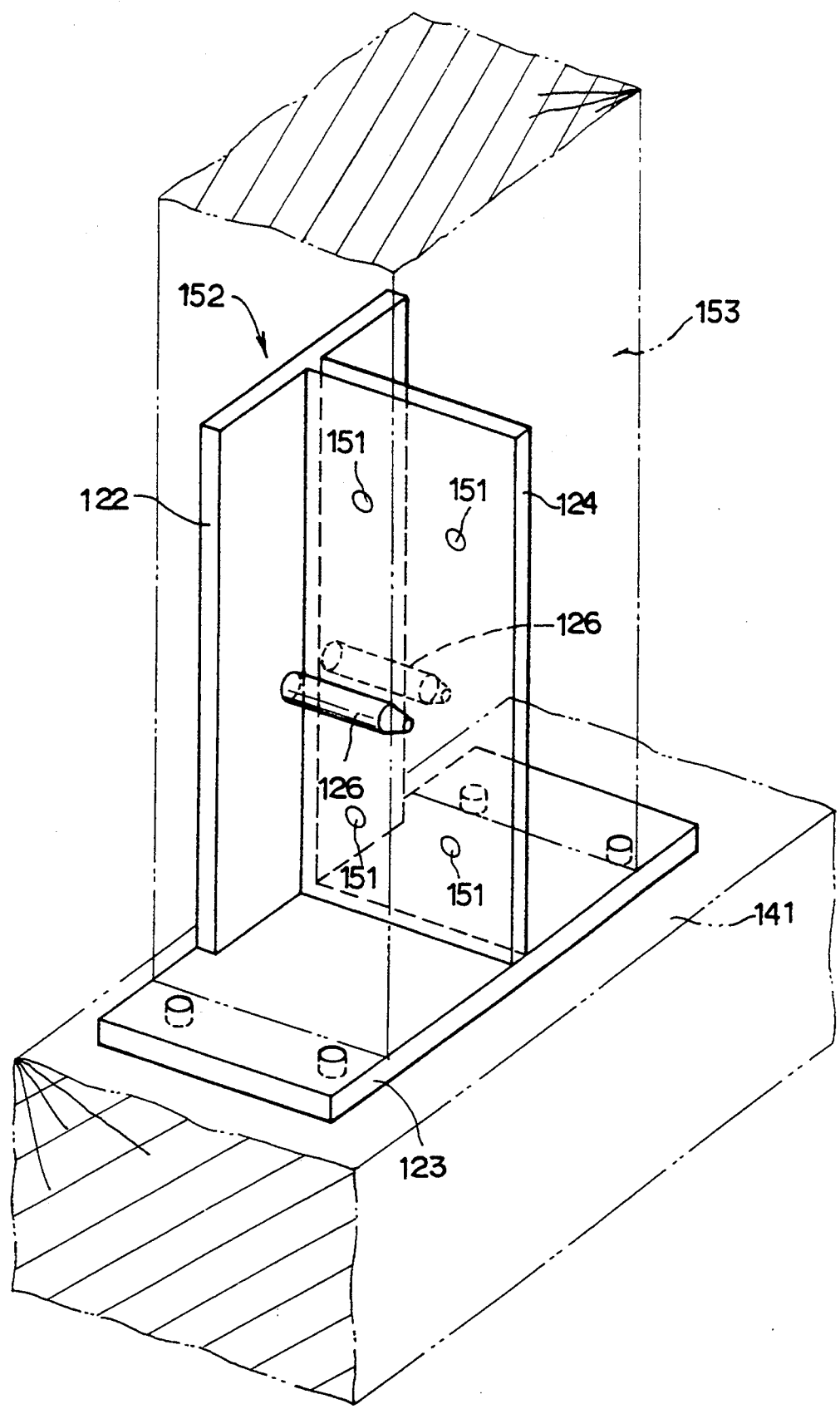
FIG. 32 is an isometric view showing a modified connector for connecting a column to a footing beam.
Figure 33A:
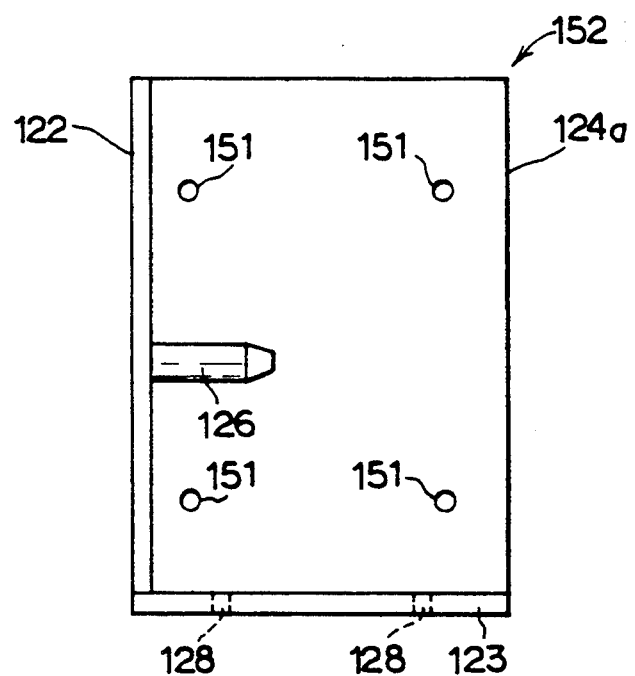
FIG. 33A is an elevation of the connector shown in FIG. 32
Figure 33B:
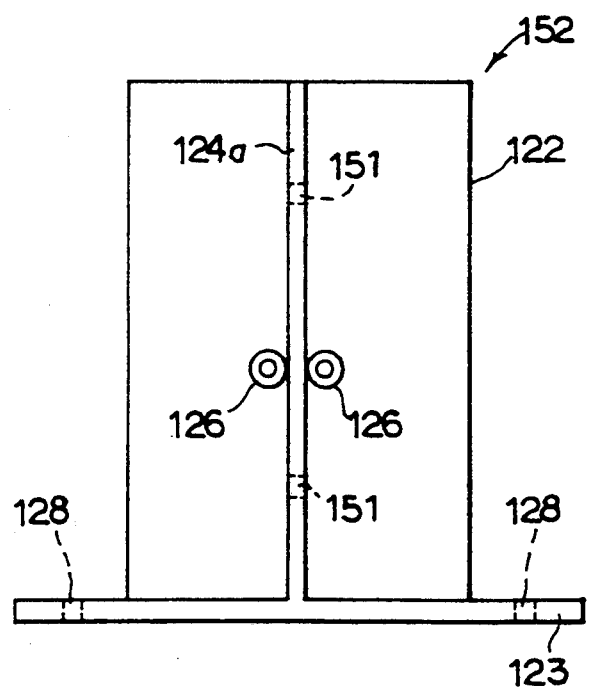
FIG. 33B is an another elevation of the connector.

FIGS. 32, 33A and 33B show a connector 152 provided with a screw hole 151 in a second plate 124a of the connector 152, for penetrating screws which secure the second plate 124a to a connecting portion of a column 153.

Figure 34:
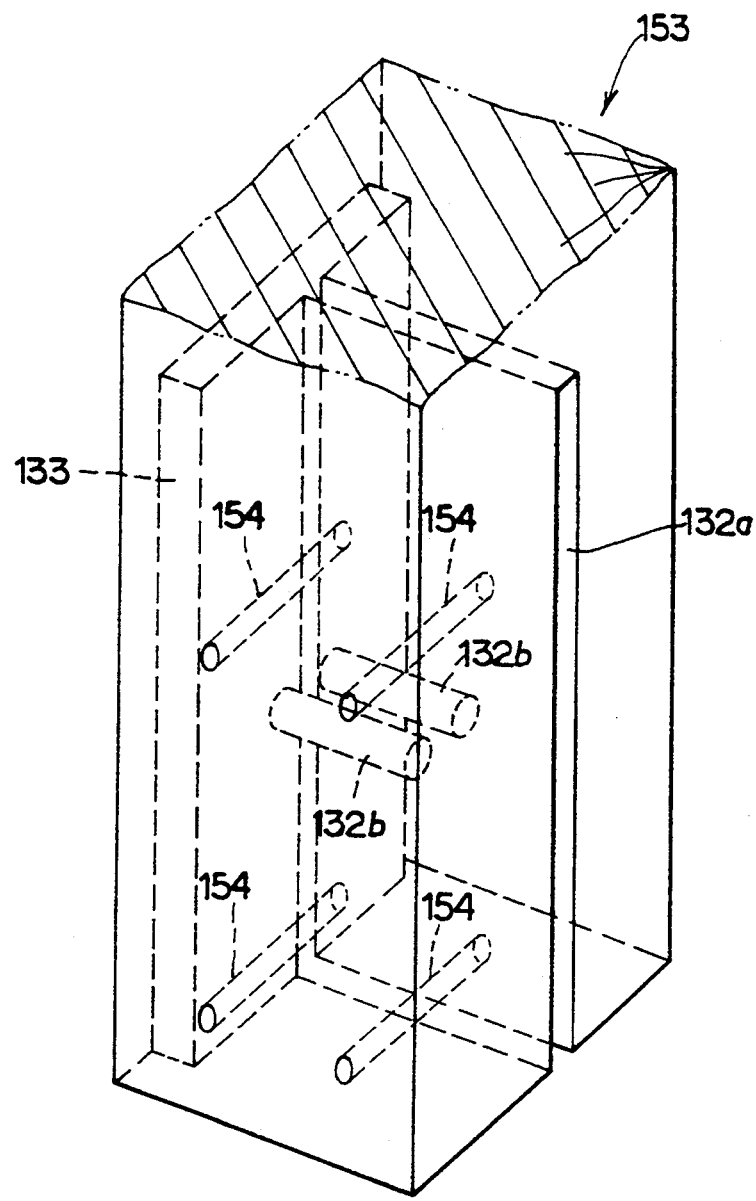
FIG. 34 is an isometric view showing a connecting portion of the column.

FIG. 34 is an isometric view showing the connecting portion of the column 153, provided with a screw hole 154 for penetrating the screws.

Securing of the column 153 and the second plate 124a by screws, is substantially identical to that of the beam 53 and the second plate 24a by the screws 55a, so that a detailed explanation thereof is omitted.

The adhesive and the screw can be combined arbitrarily and the number of the screws can be adjusted correspond to the necessary connecting strength.

For smaller connecting strength requirements, rods 126 can be fixed only to the first plate 122, similarly to FIG. 19.

Figure 35:
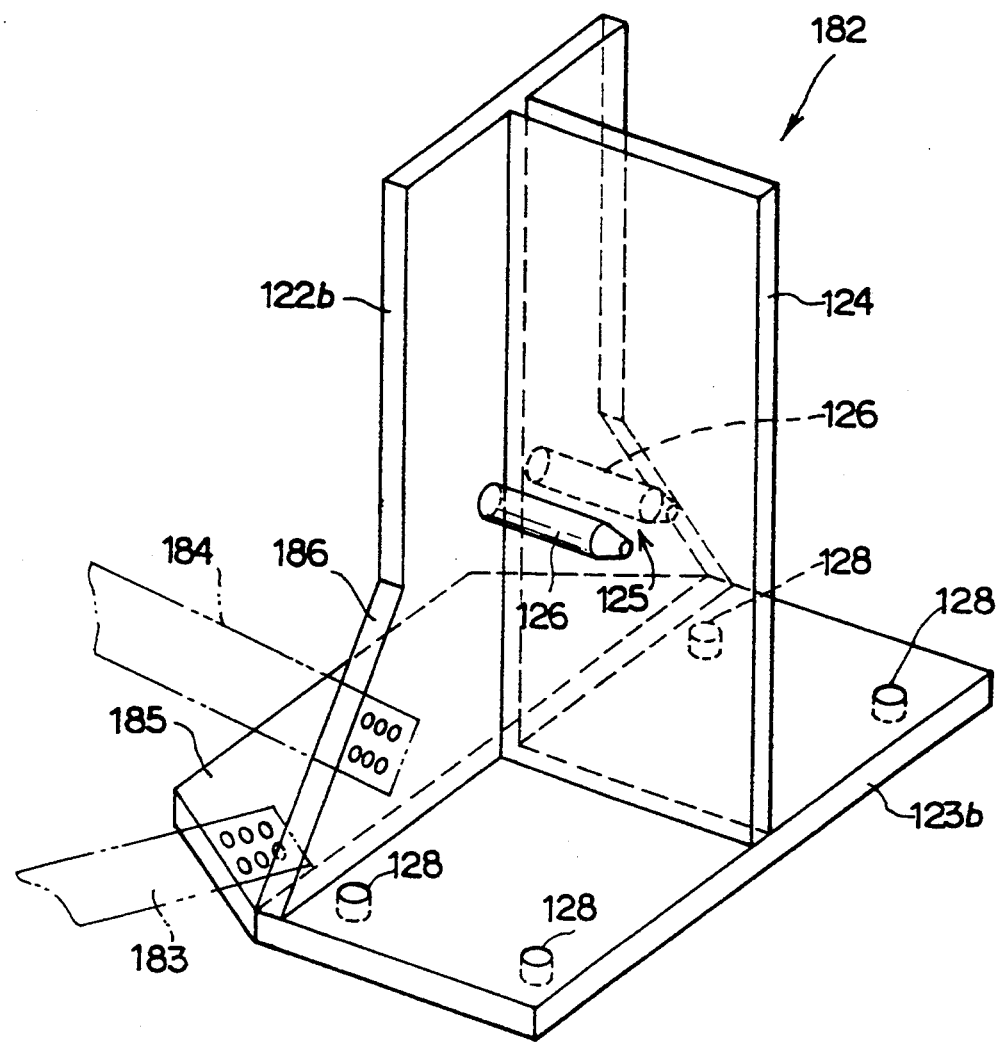
FIG. 35 is an isometric view showing a modificated connector.

FIG. 35 is a variation of above second embodiment, which shows a connector 182 comprising a brace fitting means 185 provided in the third plate 123b, for fitting a brace 183 to the third plate 123b and a brace fitting means 186 provided in the first plate 122b, for fitting a brace 184 to the first plate 122b.

The brace fitting means 185 and 186 comprises a bolt hole in an extended portion of the third and first plate 123b and 122b respectively.

The braces 183 and 184 are located in horizontal and vertical planes, respectively.

The brace fitting means 185 and 186 can increase the connecting strength of the brace to the footing beam or the column, so that the brace strength can be increased corresponding to the sectional area of the brace.

In the above second emobodiment, it is assumed that the column and the footing beam are connected, but two columns may be connected, similarly to FIG. 22.

Furthermore, the column and the RC-footing can be directly connected.

Next, a third embodiment is explained.

Figure 36:
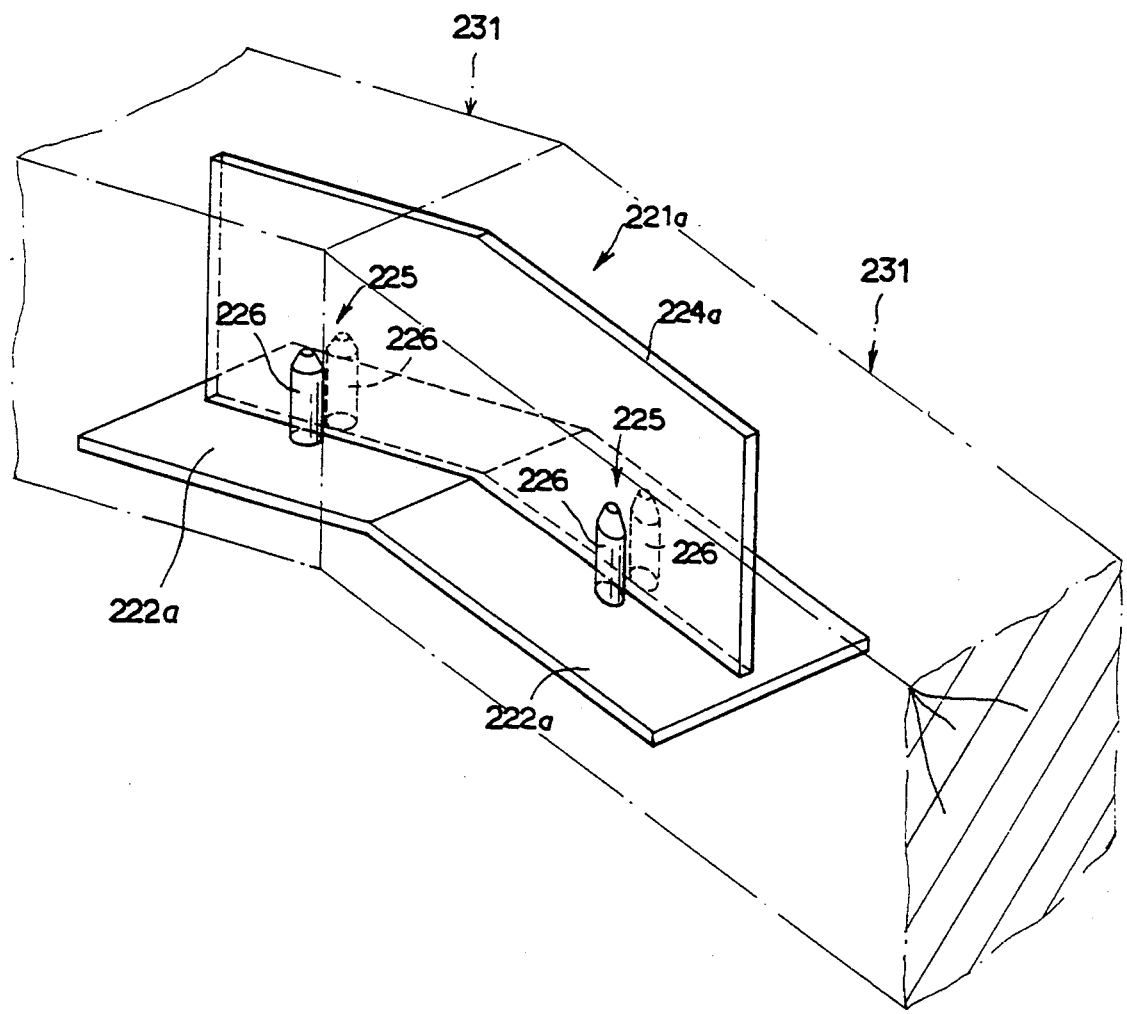
FIG. 36 is an isometric view showing a connector of a third embodiment of the invention, for connecting two rafters.
Figure 37A:
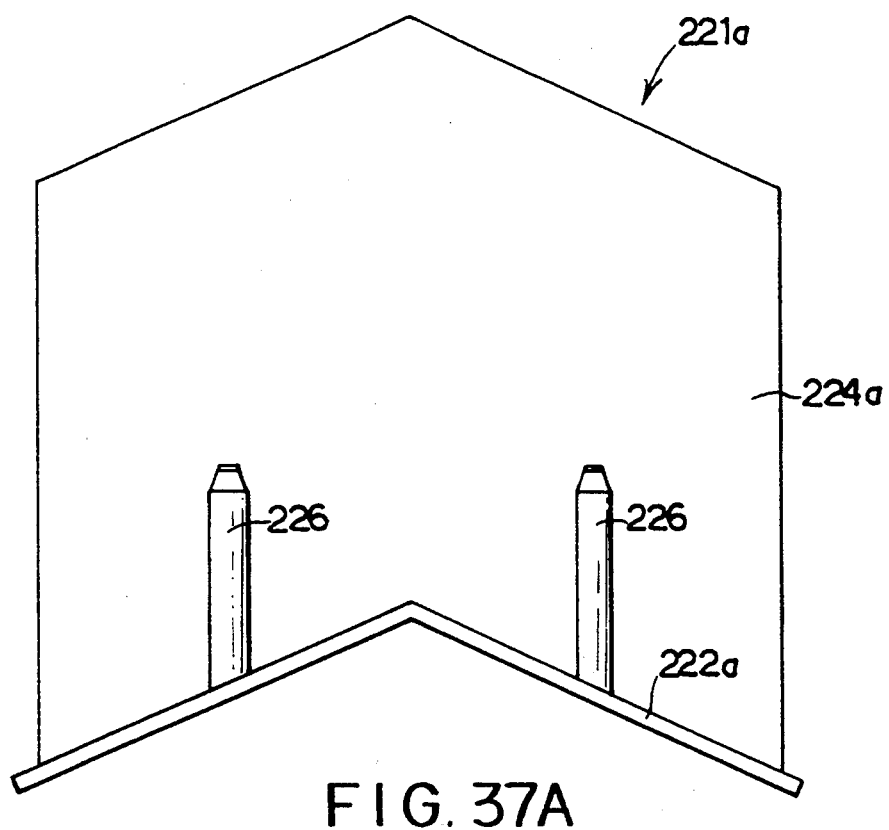
FIG. 37A is an elevation of the connector shown in FIG. 36
Figure 37B:
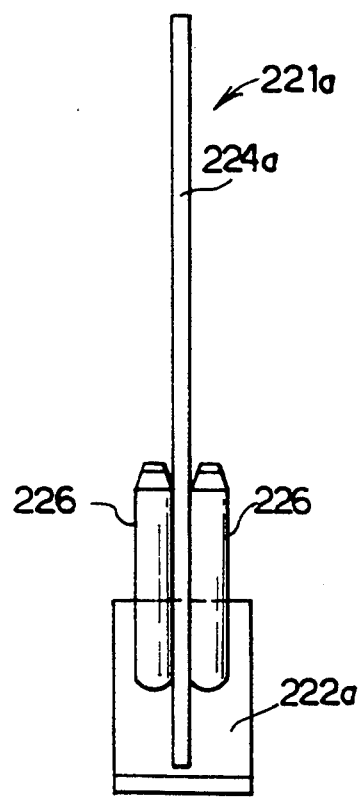
FIG. 37B is an another elevation of the connector.

A connector 221a of the third embodiment, shown in FIGS. 36, 37A and 37B, for connecting two rafters 231, comprises two first plates 222a and a second plate 224a attached substantially perpendicularly to the first plates 222a.

The second plate 224a is fitted into a predetermined cut provided in the rafters 231 with a loose fit.

The connector 221a comprises a protruded portion 225 as securing means for securing the rafters 231 to the connector 221a.

The protruded portion 225 comprises four rods 226.

The rods 226 are fitted into a recessed portion with a close fit, which is provided in the rafters 231.

The rods 226 are substantially identical to the rods 26, so that a detailed explanation for the rods 226 is omitted here.

The plate 222a and 224a may be integrally molded or assembled by welding.

Figure 38:
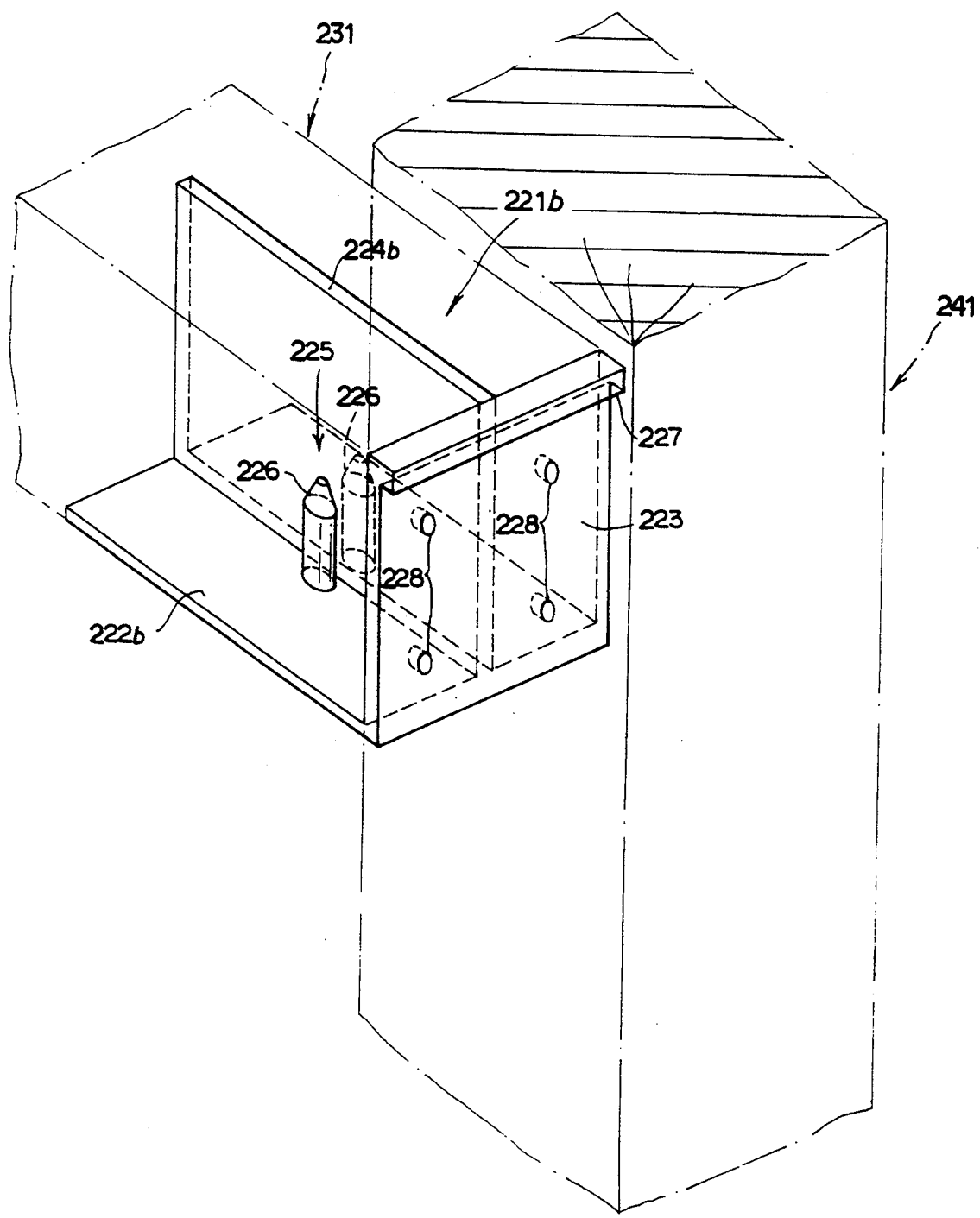
FIG. 38 is an isometric view showing an another connector of a third embodiment of the invention, for connecting a rafter to a column.
Figure 39A:
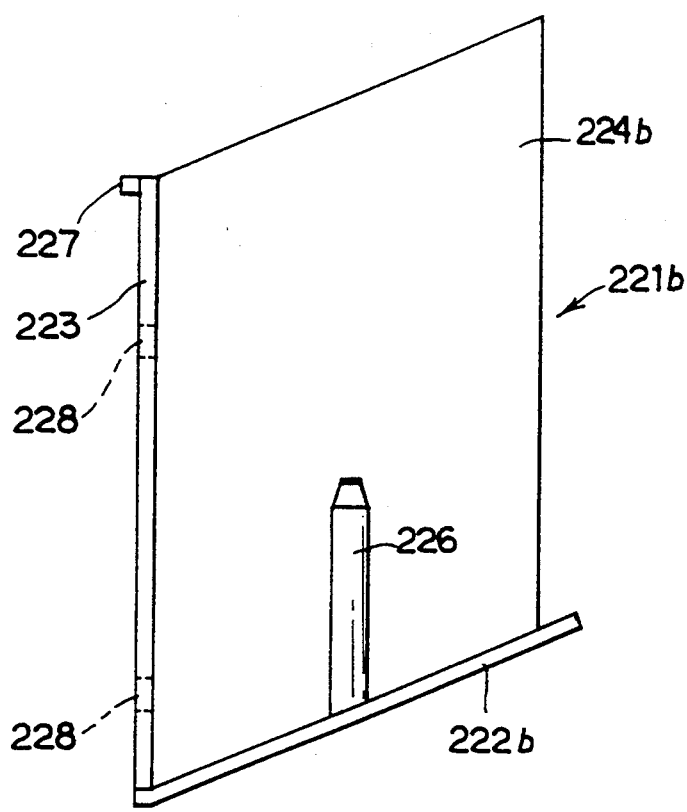
FIG. 39A is an elevation of the connector shown in FIG. 38
Figure 39B:
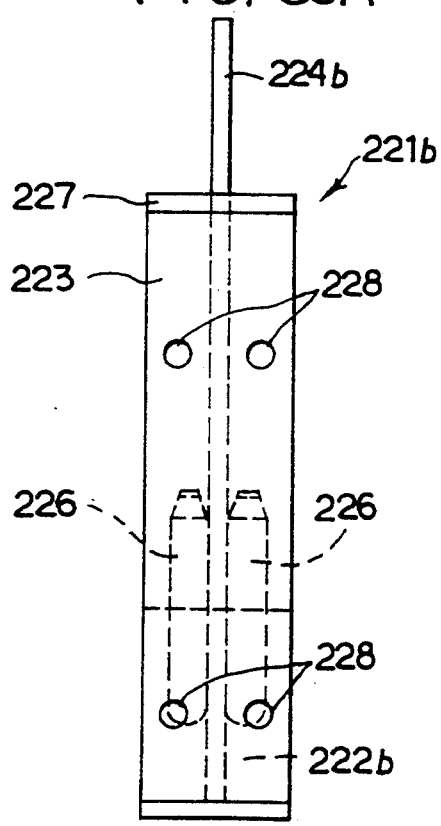
FIG. 39B is an another elevation of the connector.

Another connector 221b of the third embodiment, shown in FIGS. 38, 39A and 39B, for connecting the rafter 231 and a column 241, comprises a first plate 222b and a second plate 224b attached substantially perpendicularly to the first plate 222b.

The second plate 224b is fitted into a predetermined cut provided in the rafter 231 with a loose fit.

The connector 221b comprises a third plate 223 for mounting the connector 221b to the column 241, which is attached to one end of the first plate 222b and the second plate 224b and which is substantially perpendicular to the second plate 224b and is at a predetermined angle to the first plate 222b.

The third plate 223 is provided with holes 228 for penetrating bolts for mounting the third plate 223 to the column 241.

The connector 221b comprises a protruded portion 225 as a securing means for securing the rafter 231 to the connector 221b.

The protruded portion 225 comprises two rods 226.

The rods 226 are fitted into a recessed portion in a close fit, which is provided in the rafter 231.

The plate 222b, 223 and 224b may be integrally molded or assembled by welding.

The connector 221b comprises a raised portion 227 as a positioning means for positioning the connector 221b in the column 241.

The raised portion 227 is provided in the third plate 223 and is fitted into a depressed portion provided in the column 241.

Figure 40:
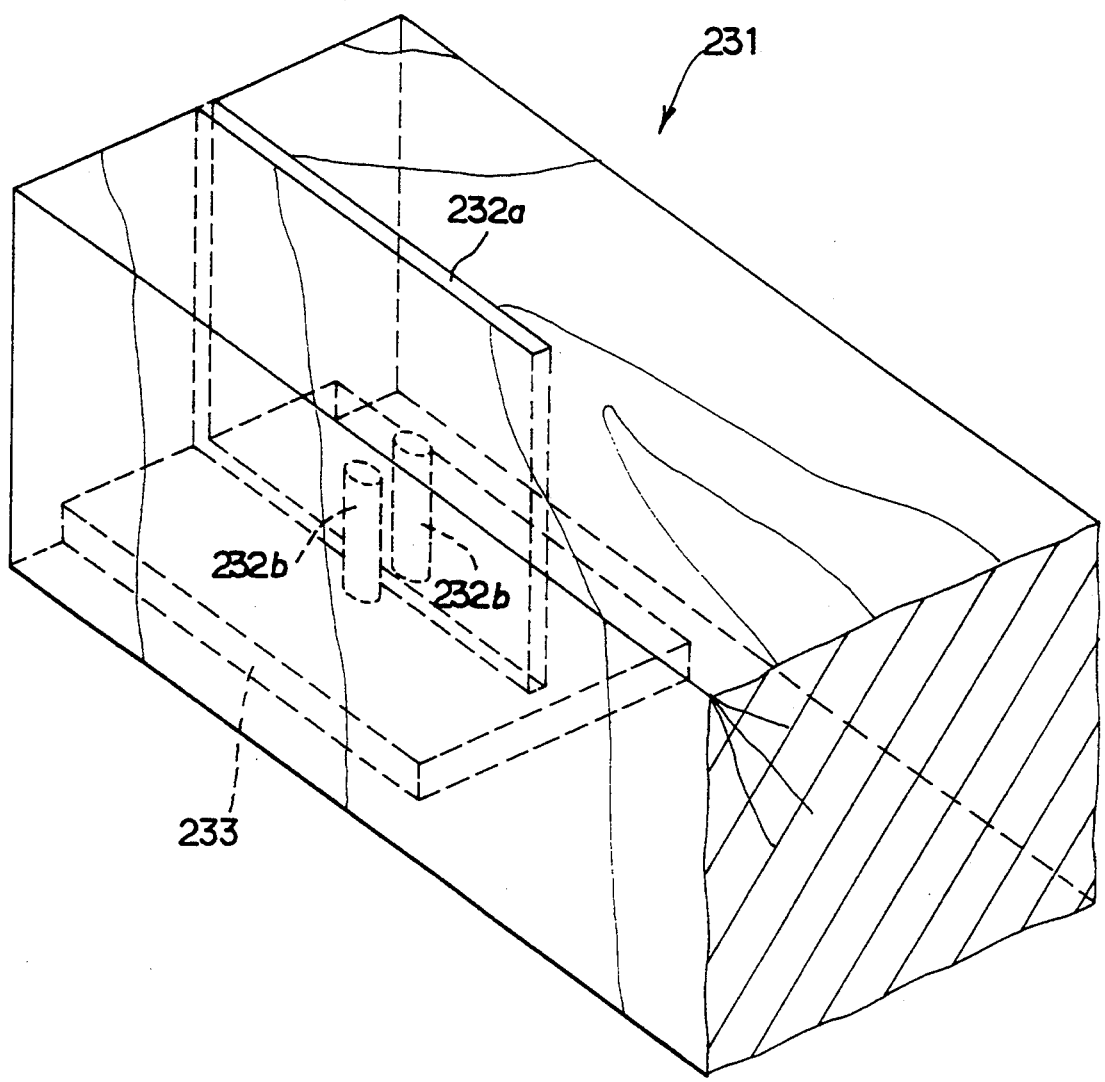
FIG. 40 is an isometric view showing a connecting portion of the rafter.
Figure 41A:
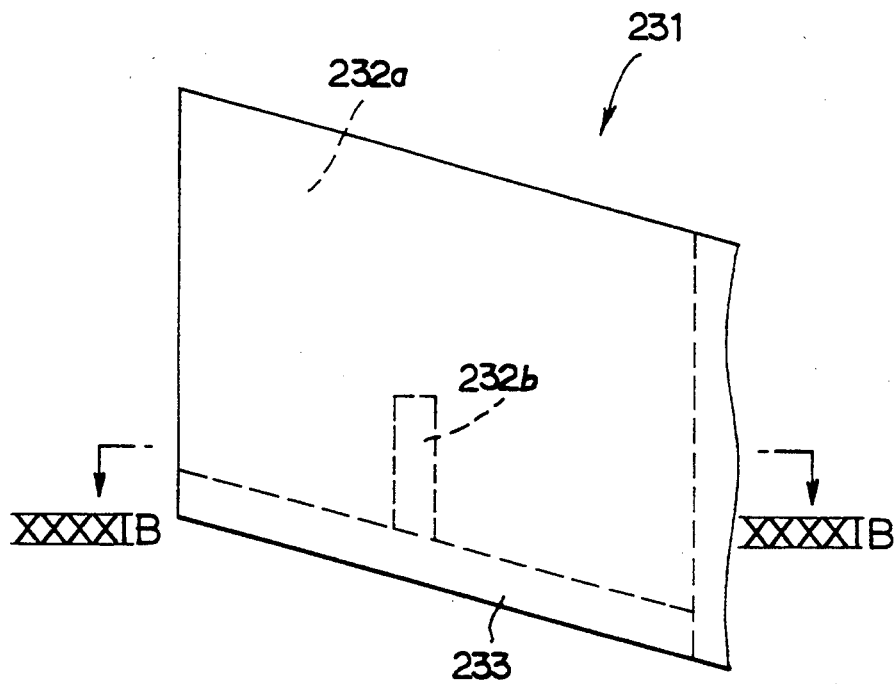
FIG. 41A is an elevation of the connecting portion shown in FIG. 40
Figure 41B:
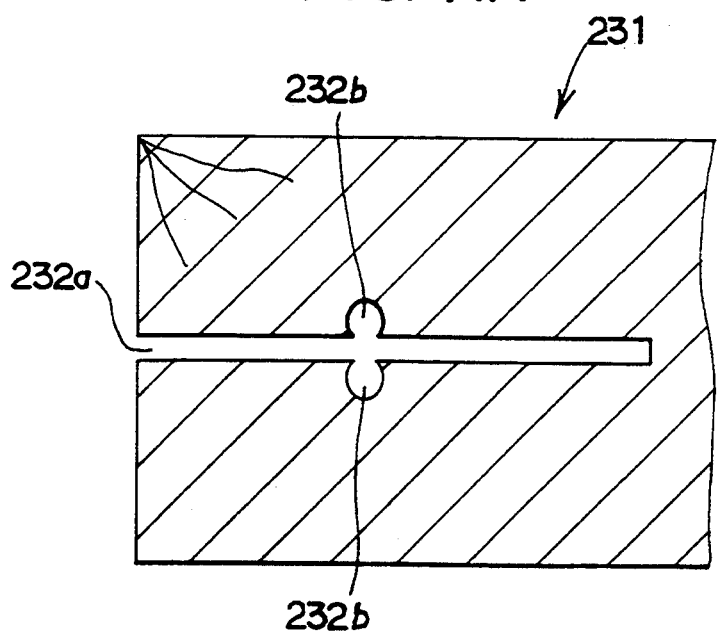
FIG. 41B is a section taken along a XXXXIB—XXXXIB line.

The rafter 231, as shown in FIGS. 40, 41A and 41B, has a cut portion 232a in a first connecting portion for connecting the beam 231 to the connector 221b.

The cut portion 232a is fitted into by the second plate 224a with a loose fit and is substantially parallel to a longitudinal axis of the rafter 231.

The cut portion 232a is beveled in its lower end so as to insert the second plate 224b into the cut portion 232a easily.

The rafter 231 is provided with holes 232b as a recessed portion in the first connecting portion, into which the rods 226 as a protruded portion fits with a close fit.

The holes 232b are substantially identical to the holes 32b and so a detailed explanation thereof omitted.

The rafter 231 is further provided with a recess 233 into which the first plate 222a is fitted.

The recess 233 is substantially identical to the recess 33 and so a detailed explanation is omitted.

Figure 42:
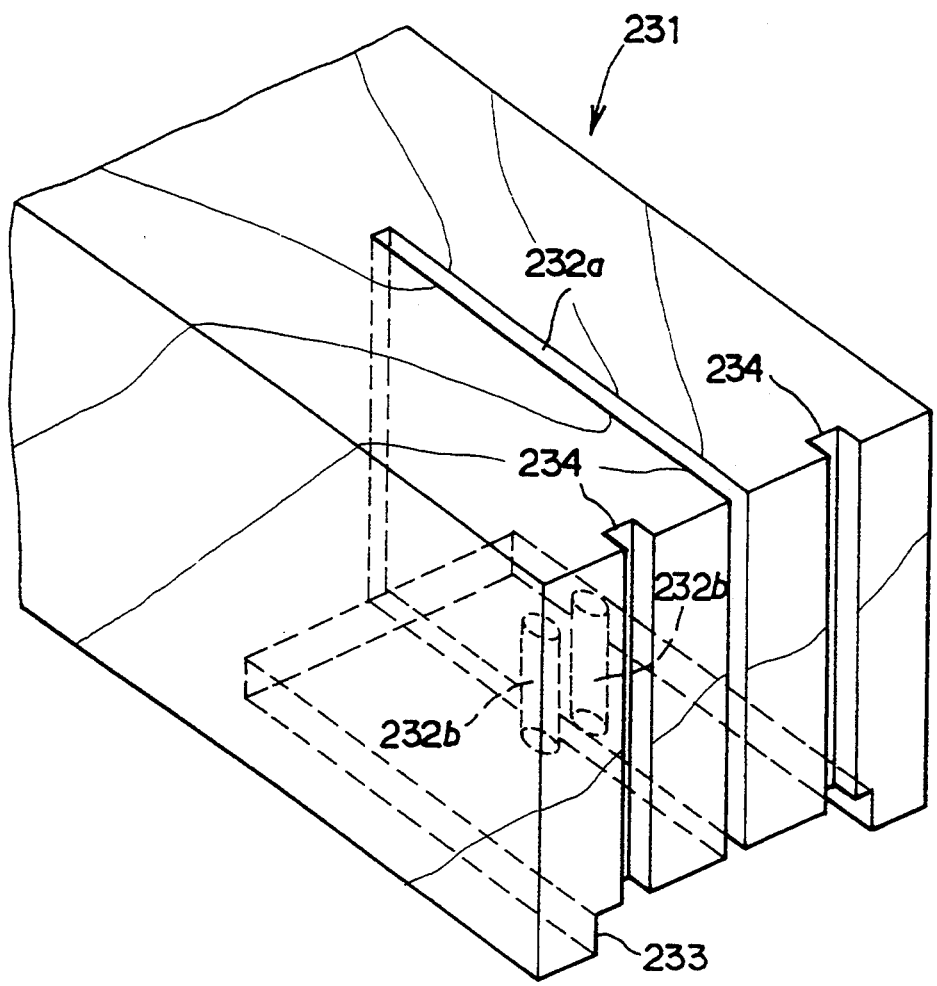
FIG. 42 is an isometric view showing another connecting portion of the rafter.
Figure 43A:
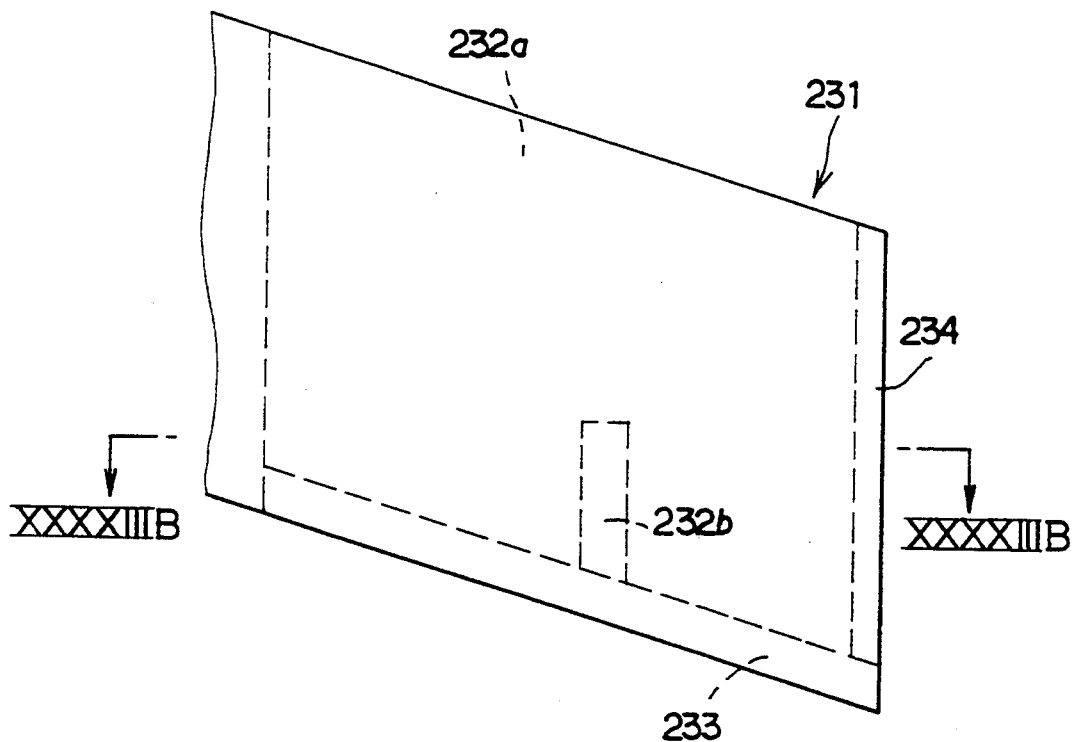
FIG. 43A is an elevation of the connecting portion shown in FIG. 42
Figure 43B:
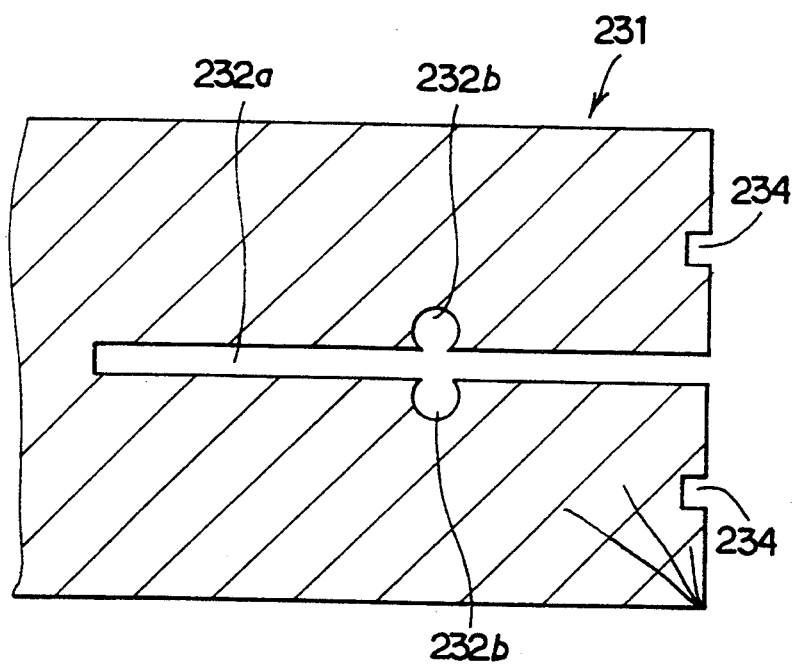
FIG. 43B is a section taken along a XXXXIIIB—XXXXIIIB line.

The rafter 231, as shown in FIGS. 42, 43A and 43B, has the cut portion 232a, in a second connecting portion for connecting the rafter 231 to the connector 221b.

The rafter 231 also includes the holes 232b.

The rafter 231 further comprises two slots 234 for running a head or a nut of bolt penetrating through the hole 228 of the connector 221b.

The slots 234 are provided in the end surface of the rafter 231 and are substantially parallel to the holes 232b.

The rafter 231 further comprises the recess 233.

Figure 44:
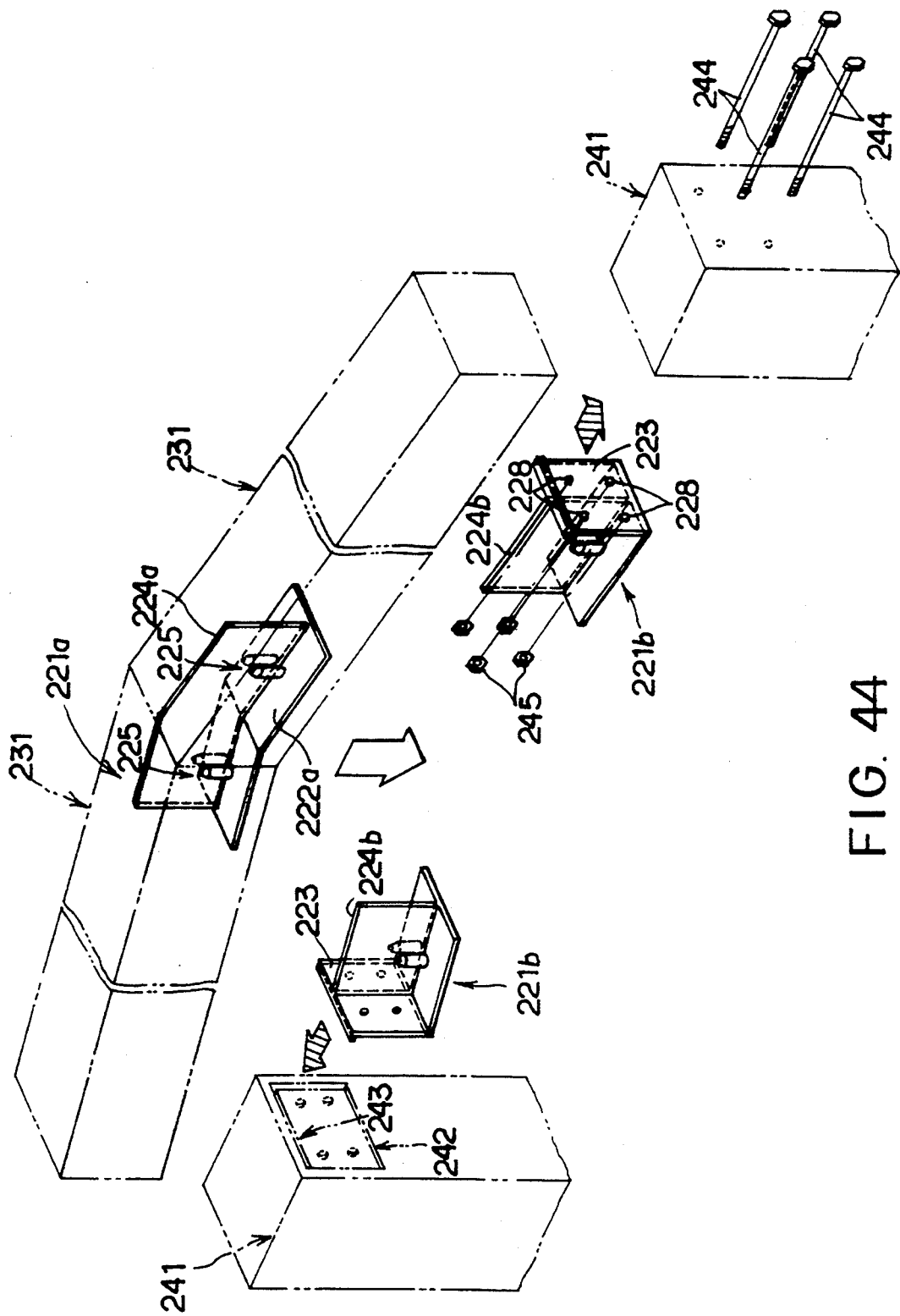
FIG. 44 is an isometric view showing a connecting operation of the rafters and the columns.

FIG. 44 shows a connecting operation of the two rafters and the two columns 241 by the connectors 221b, 221b and 221a.

The two rafters 231 are preferably assembled in one member by the connector 221a on the ground.

The connecting operation of the assembled member and the columns 241 is substantially identical to the operation shown in FIG. 5 and so a detailed explanation is omitted.

Figure 45:
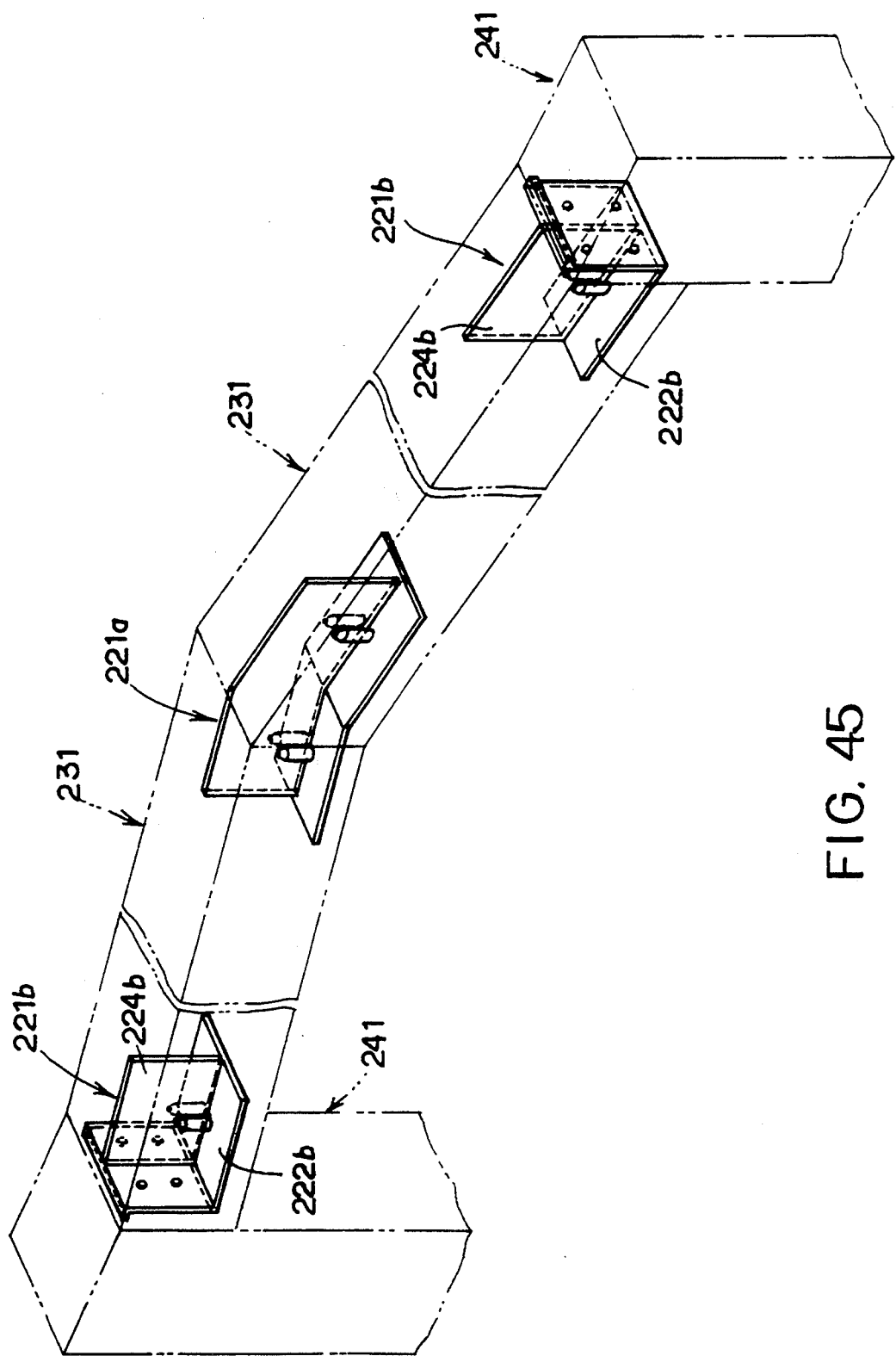
FIG. 45 is an isometric view showing a connecting structure of the rafters and the columns.

FIG. 45 is an isometric view showing the rafters 231 and the columns 241 which are connected with each other.

Now, the connection of the rafters 231 and the columns 241 is completed and a predetermined connecting strength can be acquired by the close fit of the hole 232b and the rod 226.

However, there is a clearance between the rafter 231 and the second plate 224a for application convenience.

Similarly, there is a clearance between the rafter 231 and the second plate 224b.

Therefore, in some cases, the above strength may be not enough for a predetermined design strength.

Furthermore, in some cases, the rafter may be uplifted from the connector, especially because of an upward wind acting on a roofboard provided on the rafter, which flows along the outer wall from the footing to a projected portion of the roofboard, that comprises the eaves.

In these case, an adhesive can fill the clearance.

Figure 46:
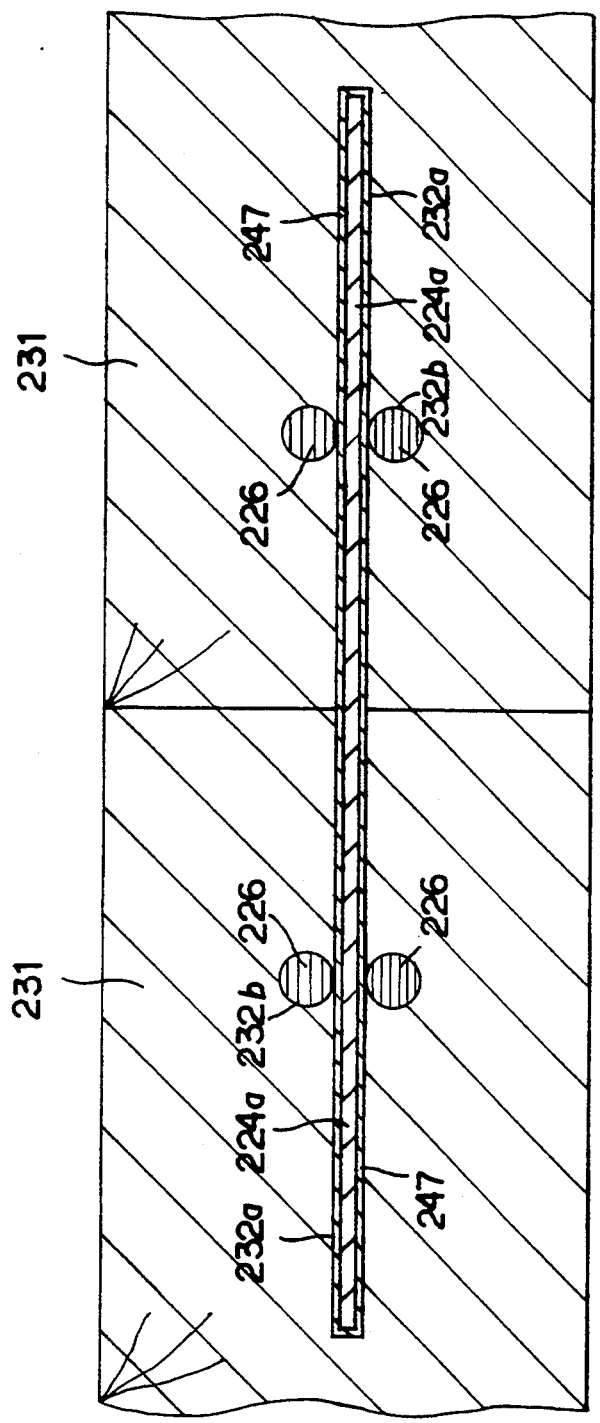
FIG. 46 is a horizontal section of a connecting structure using an adhesive.
Figure 47:
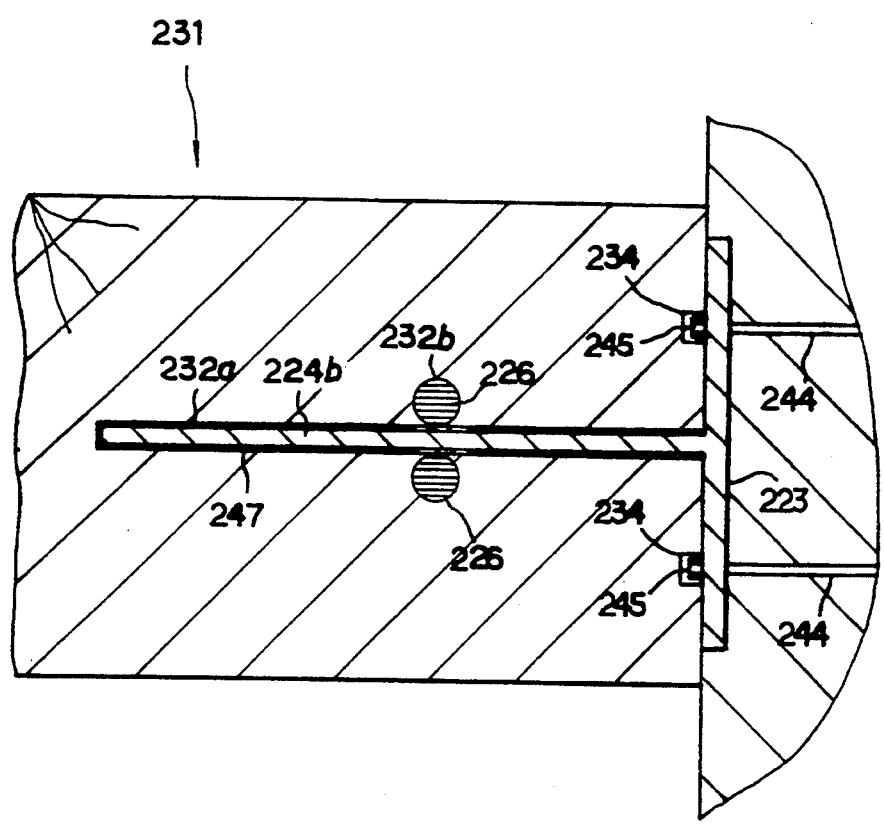
FIG. 47 is a horizontal section of a connecting structure using an adhesive.

FIG. 46 is a section of a connecting structure of the two rafters 231 and FIG. 47 is a section of a connecting structure of the rafter 231 and the column 241.

As shown in FIGS. 46 and 47, the adhesive 247 fill the clearance between the second plate 224a and 224b and the rafter 231.

The adhesive 247 is substantially identical to the adhesive 47 and a detailed explanation is omitted.

The above embodiments provide the following merits.

(1) The connection of the rafter and the connector or the column and the connector, are carried out by the close fit of the rods into the holes without bolts, nails and wedge, so that the rafters can be positioned precisely in a short time.

Thus, the connecting operation can be carried out easily and efficiently.

(2) A portion of the connector is not projected beyond a top surface of the rafters so that a finishing material, for example, a roofboard can be applied on the top surface directly.

The roofboard is directly applied to the rafter so that the roofboard and the rafter are integral, thus increasing a stiffness in a predetermined plane and a structural strength against an earthquake can be hence increased and in some cases a brace in the plane may be omitted.

(3) Because of no wedge, in the connection of the rafter to the column, the rafter can be lowered without a slight inclination of the column.

Therefore, the column can be fixed before the connection and thus a multi-layer building can be constructed easily and efficiently.

(4) Similarly to the connection of the beam and the column, the hole of the beam can be worked easily because of a round shape.

(5) Also similarly, the connecting strength can be increased, thus the strength against an upward wind force can be increased.

Furthermore, the rods and the beam are integral so that a stress concentration may be hard to occur.

(6) The connector is not exposed in the rafter except for an under surface of the first plate provided in the connector.

Therefore, if a facing material, which area is substantially identical to that of the under surface and which is similar in appearance to the rafter, is applied on the under surface, the connector can be perfectly covered.

(7) Two rafters are assembled to one member on the ground so that a scaffold for connecting two rafters, can be omitted and positioning operation for positioning two rafters with respect to each other, can be omitted.

(8) The connecting operation of the two rafters and the mounting operation of the connector to the column are independent of each other so that the two operation can be executed simultaneouly.

Thus, the term required for the work can be shortened.

In the above embodiment, the rods are provided in the connector as a protruded portion, but the protruded portion not be necessarily be a rod, for example, a plate can be as a protruded portion.

For example, the cut and the second plate can be made so that the second plate can be fitted into the cut with a close fit, that is, the second plate can be provided as a protruded portion.

In the above embodiment, the second plate of the connector and the connecting portion of the beam are secured not only by the close fit between the rods and the holes but also by the adhesive.

However, alternatively to the adhesive, the second plate and the connecting portion may be secured by a screw.

Figure 48:
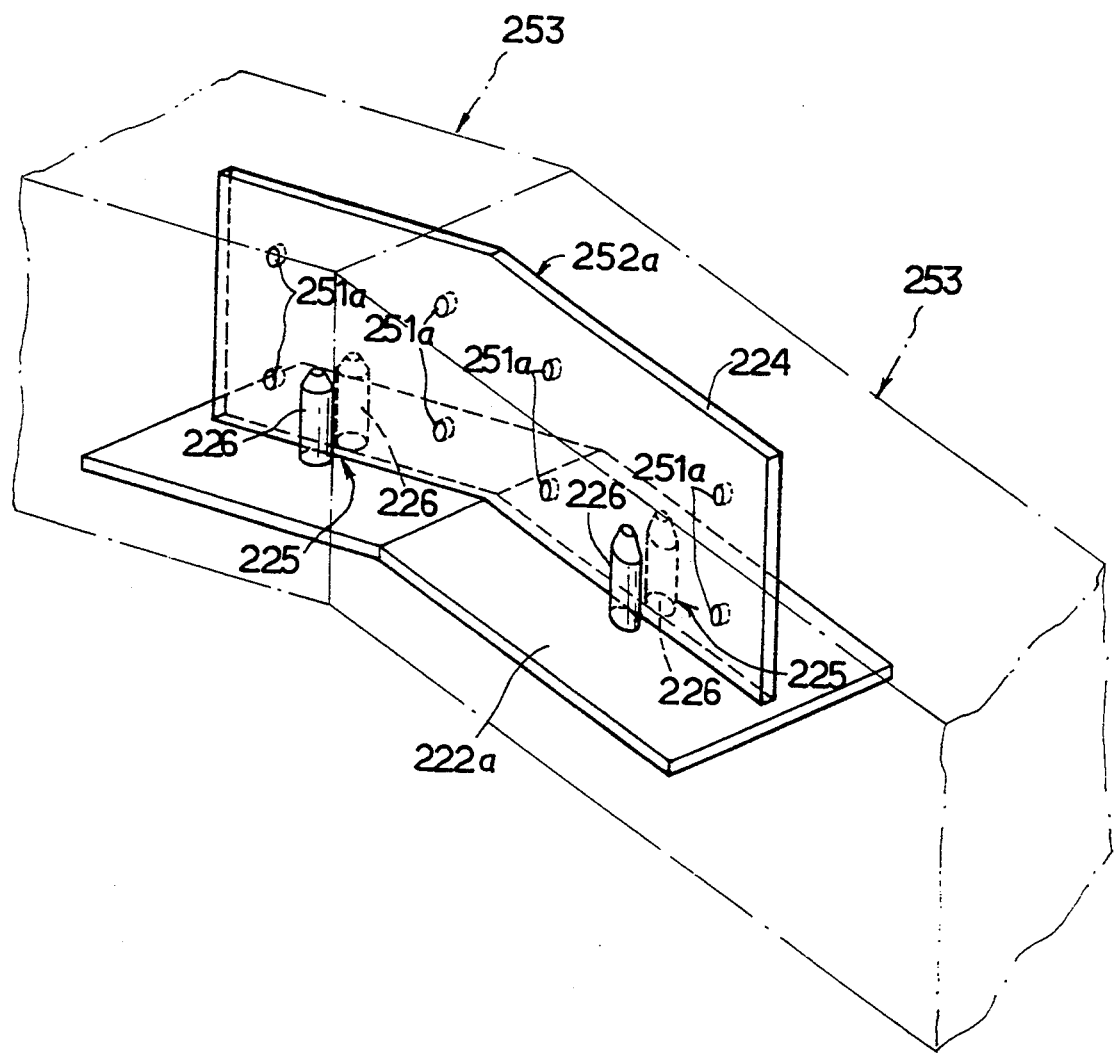
FIG. 48 is an isometric view showing a modified connector for connecting rafters.
Figure 49A:
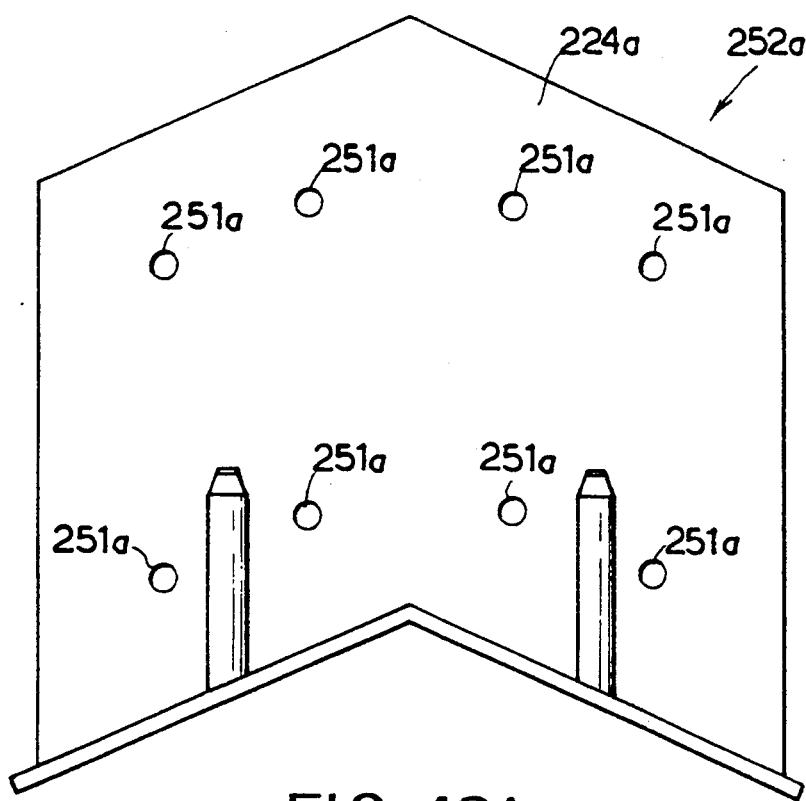
FIG. 49A is an elevation of the connector shown in FIG. 48
Figure 49B:
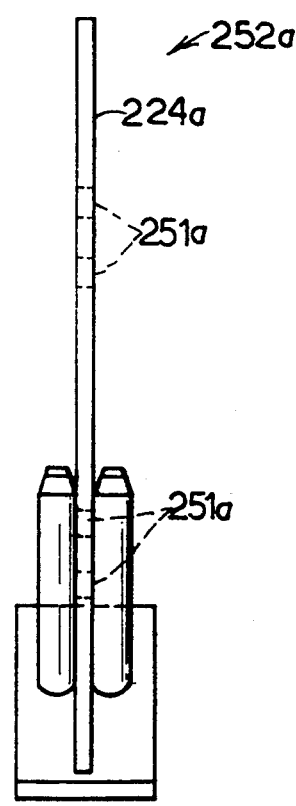
FIG. 49B is an another elevation of the connector.

FIGS. 48, 49A and 49B show a connector 252a provided with a screw hole 251a in a second plate 224a, for penetrating screws which secure the second plate 224a to a connecting portion of a rafters 253.

Figure 50:
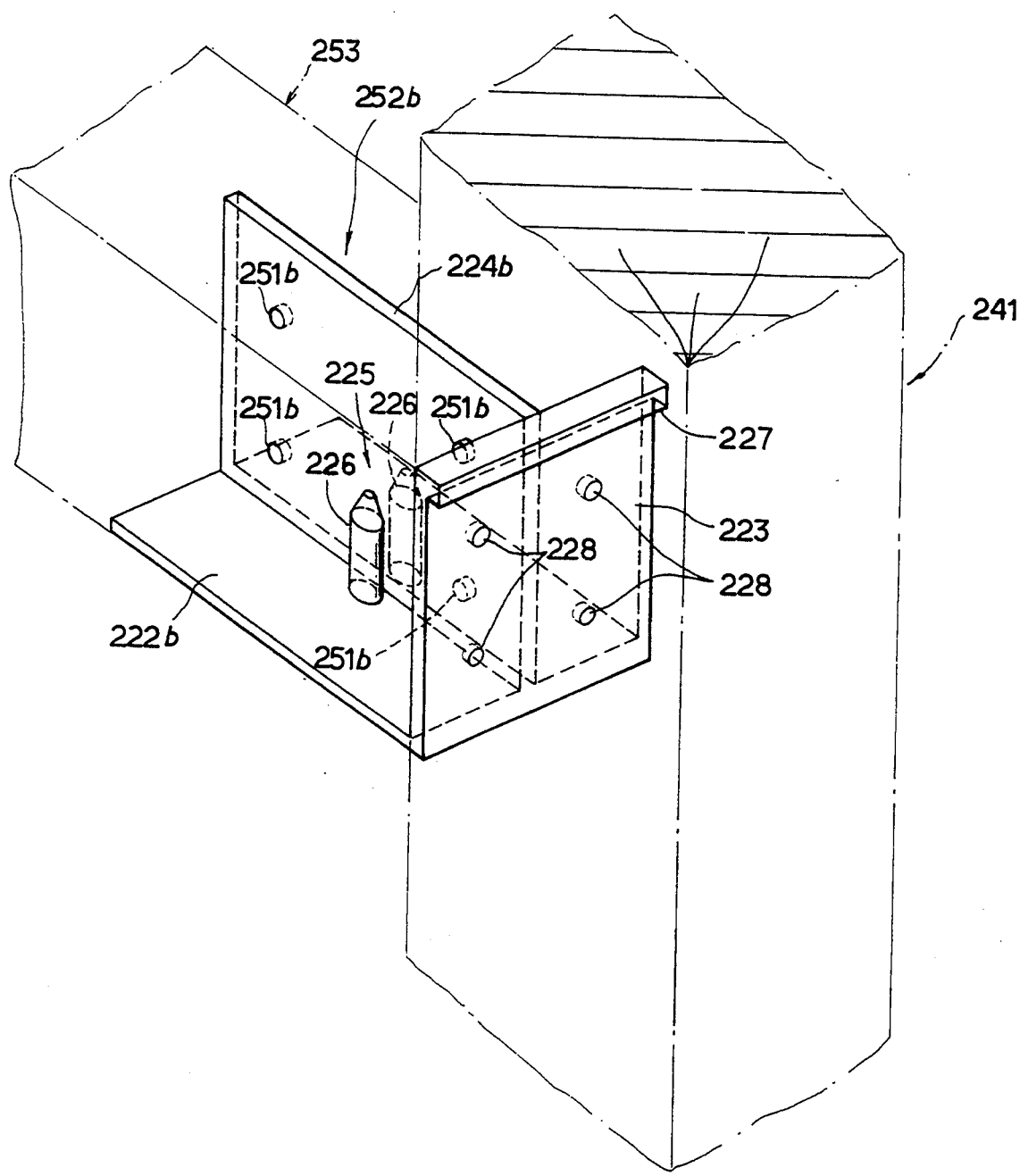
FIG. 50 is an isometric view showing a modified connector for connecting a rafter and a column.
Figure 51A:
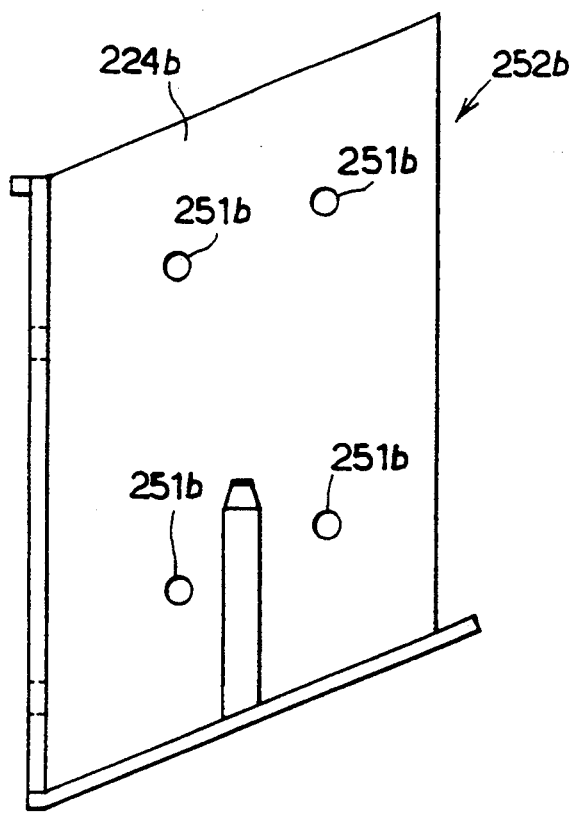
FIG. 51A is an elevation of the connector shown in FIG. 50
Figure 51B:
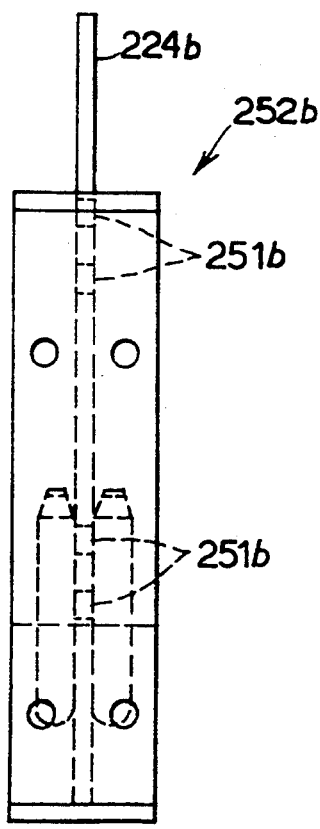
FIG. 51B is an another elevation of the connector.

FIGS. 50, 51A and 51B show a connector 252b provided with a screw hole 251b in a second plate 224b, for penetrating screws which secure the second plate 224b to a connecting portion of a rafters 253.

Figure 52:
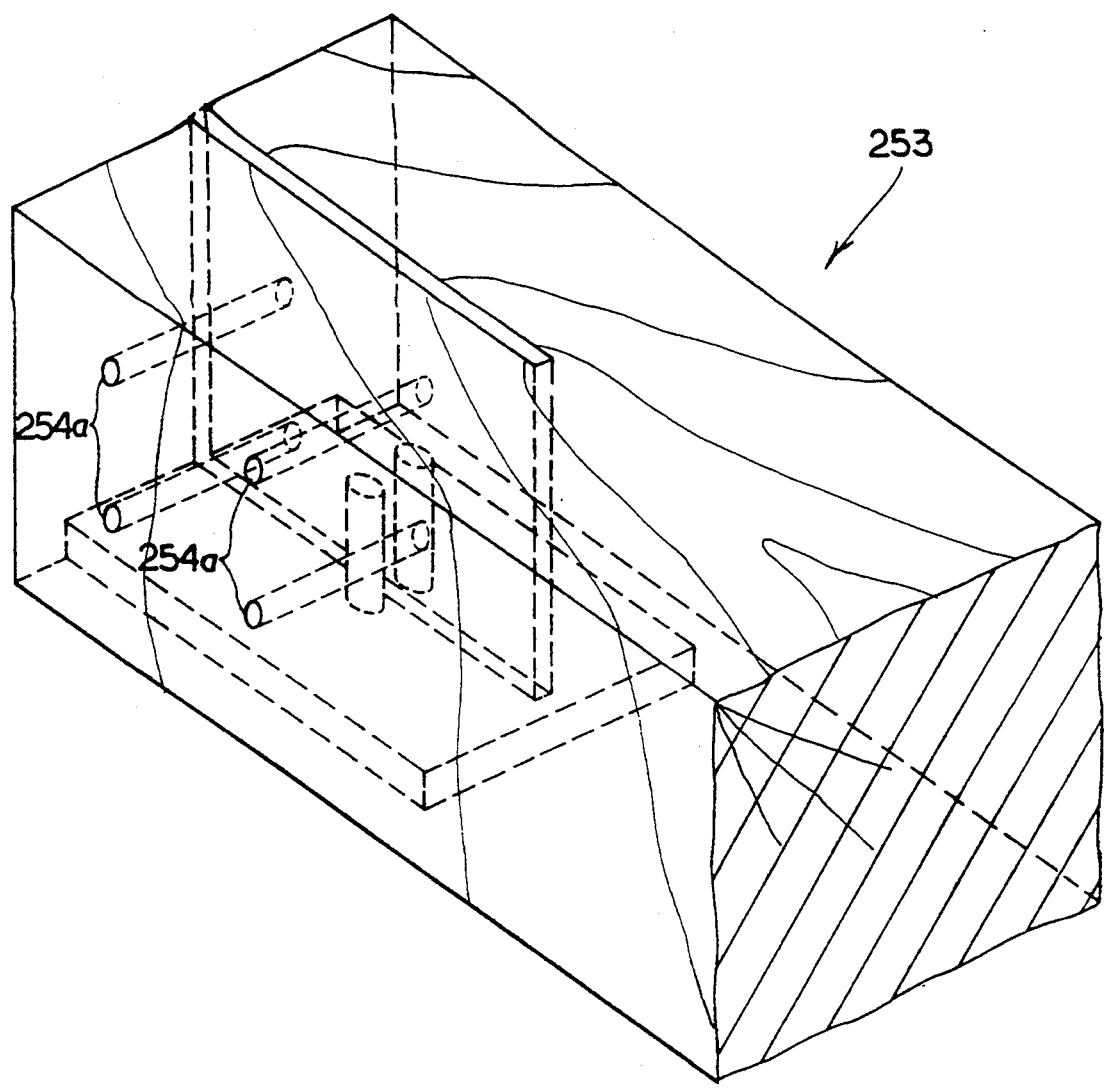
FIG. 52 is an isometric view showing a connecting portion of the rafter and FIG. 53 is an isometric view showing an another portion of the rafter.

FIG. 52 is a isometric view showing the first connecting portion of the rafter 253, provided with a screw hole 254a for penetrating the screws.

Figure 53:
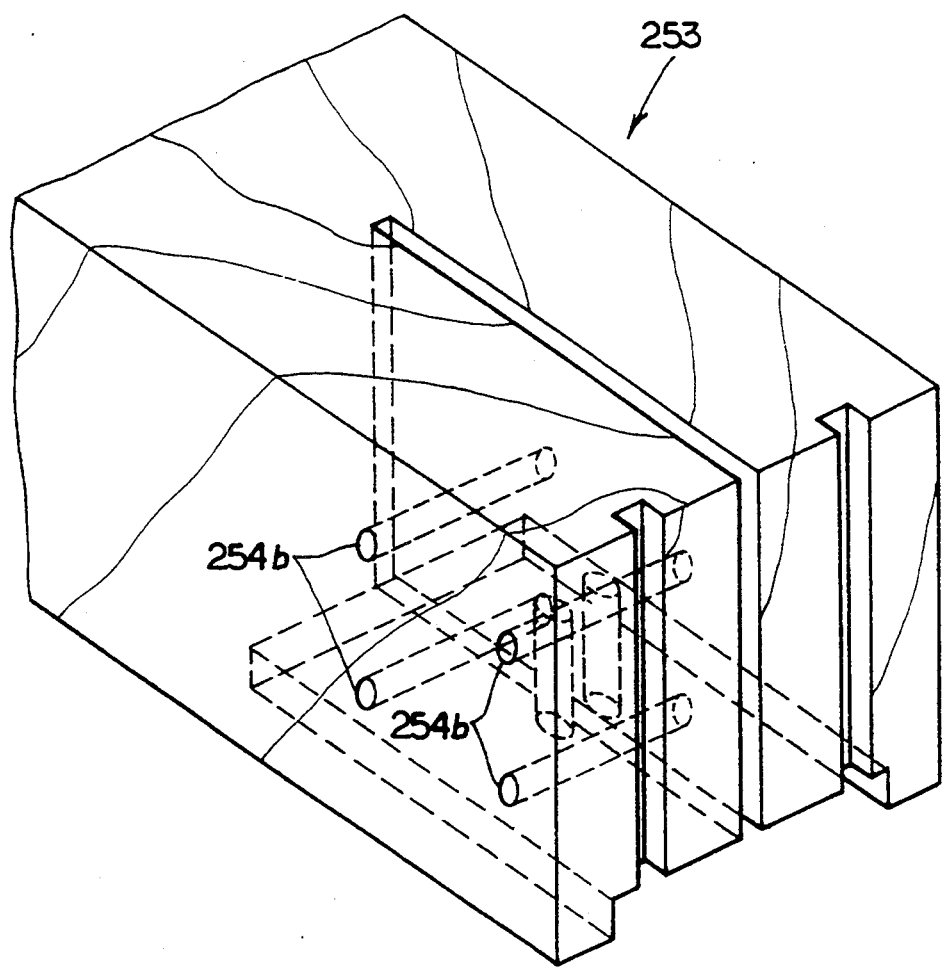

FIG. 53 is a isometric view showing the second connecting portion of the rafter 253, provided with a screw hole 254b for penetrating the screws.

Connecting operation by the connector 252a and 252b is similar to the connection operation by the connector 221a and 221b of FIG. 44 but in the connecting operation by the connector 252a and 252b, screws 55a or 55b shown in FIGS. 16 or 17 are inserted in the screw holes 254a and screwed into the screw holes 251a and the connecting portion of the rafters 253 across the second plate 224a, thus the two rafters are assembled.

Then, after the assembled rafters 253 are lowered down until a recess provided in an under surface of the rafter 253 is fitted into a first plate of the connector 252b, the screws are inserted in the screw holes 254b and screwed into the screw holes 251b and the connecting portion of the rafter 253 across the second plate 224b.

Alternatively to the adhesive or the screw, the second plate and the connecting portion can be secured by the rod member 60 shown in FIGS. 18A, 18B and 18C.

The adhesive, the screw and the rod member can be combined arbitrarily and the number of the screw or the rod member can be adjusted corresponding to the necessary connecting strength.

For smaller connecting strength requirement, rods 226 can be fixed only to the first plate 222a or 222b, similarly to FIG. 19 and the adhesive, the screw and the rod member can be omitted arbitrarily.

Figure 54:
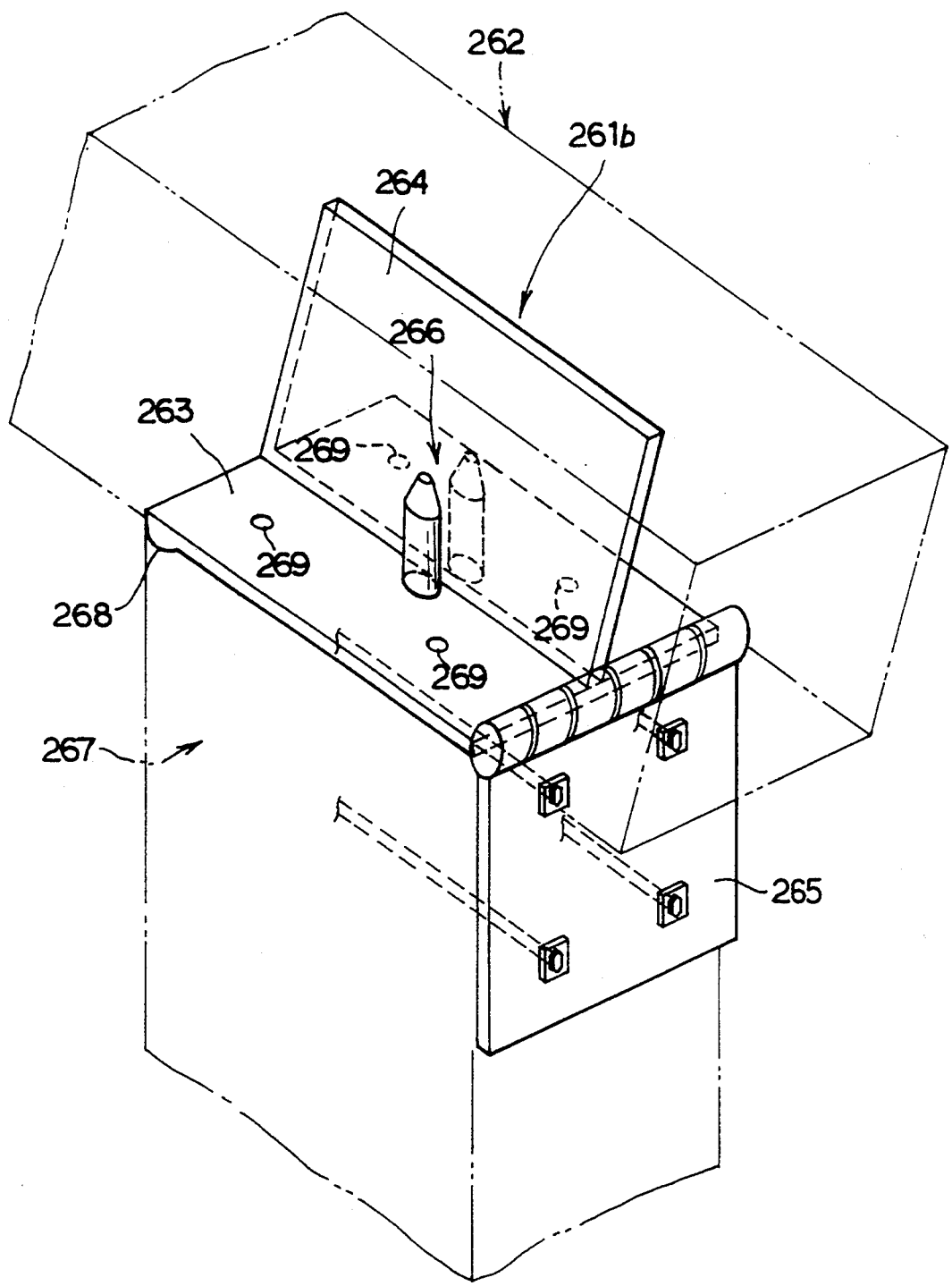
FIG. 54 is an isometric view showing a modificated connector.

FIG. 54 is a variation of above third embodiment, which shows a connector 261b comprising a first plate 263, a second plate 264 substantially perpendicular to the first plate 263 and a third plate 265 hinged to the first plate 263.

The connector 261b further comprises a protruded portion 266 as a securing means for securing a rafter 262 to the connector 261b and a raised portion 268 as a positioning means for positioning the connector 261b to the column 267.

The first plate comprises a screw holes 269 for penetrating screws which can mount the connector 261b to the column 267.

For a larger force due to an upward wind gust, the second plate 264 and the connecting portion of the rafter 262 can be secured by the adhesive, the screws or the rod member.

Figure 55:
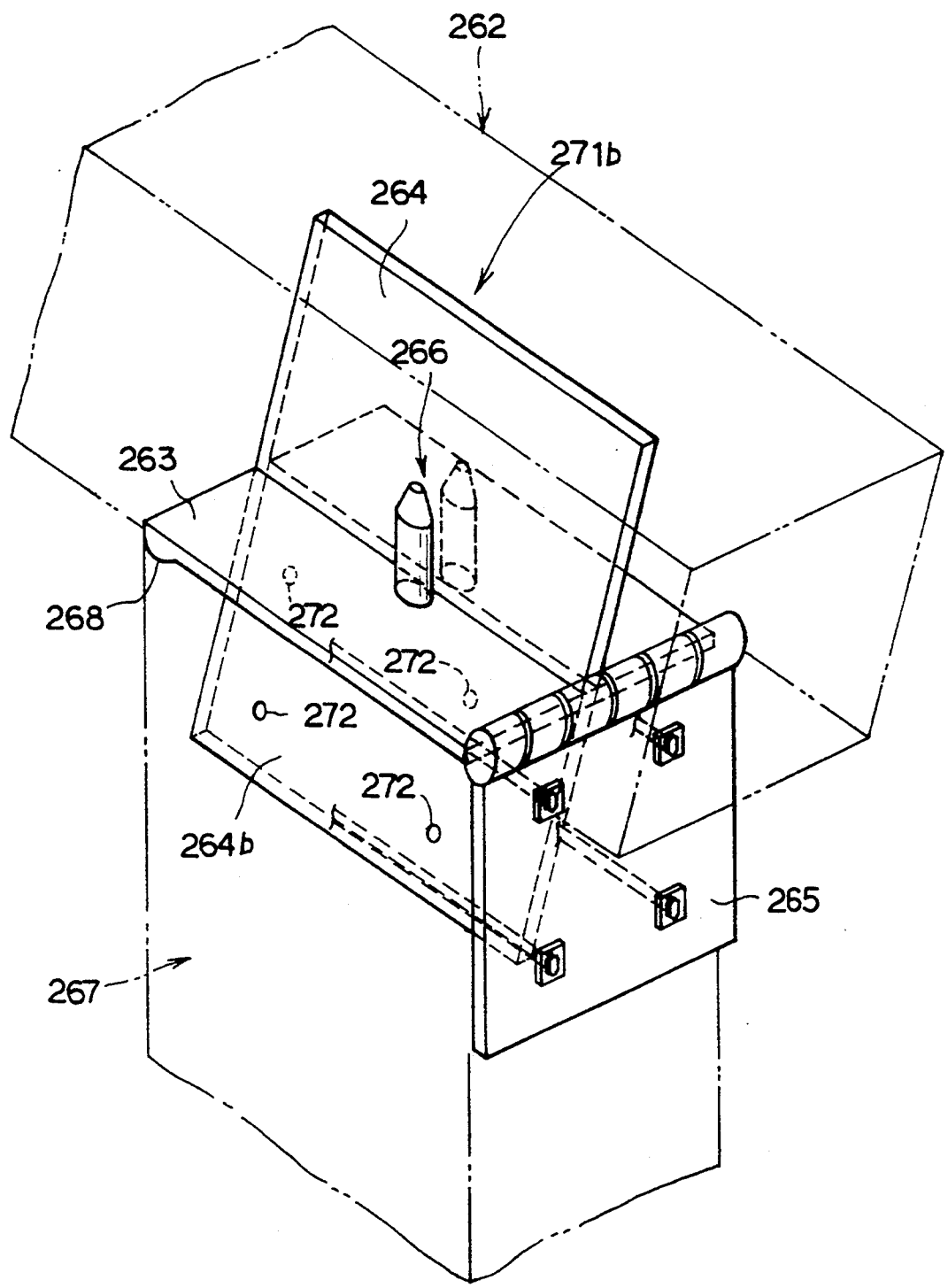
FIG. 55 is an isometric view showing another modified connector.

Alternatively of the screw holes 269, as shown in FIG. 55, screw holes 272 can be provided in an extended portion 264b of the second plate 264.

The connector 261b can be adapted to an connecting structure in which a rafter and a column are at an arbitrary angle.

Figure 56:
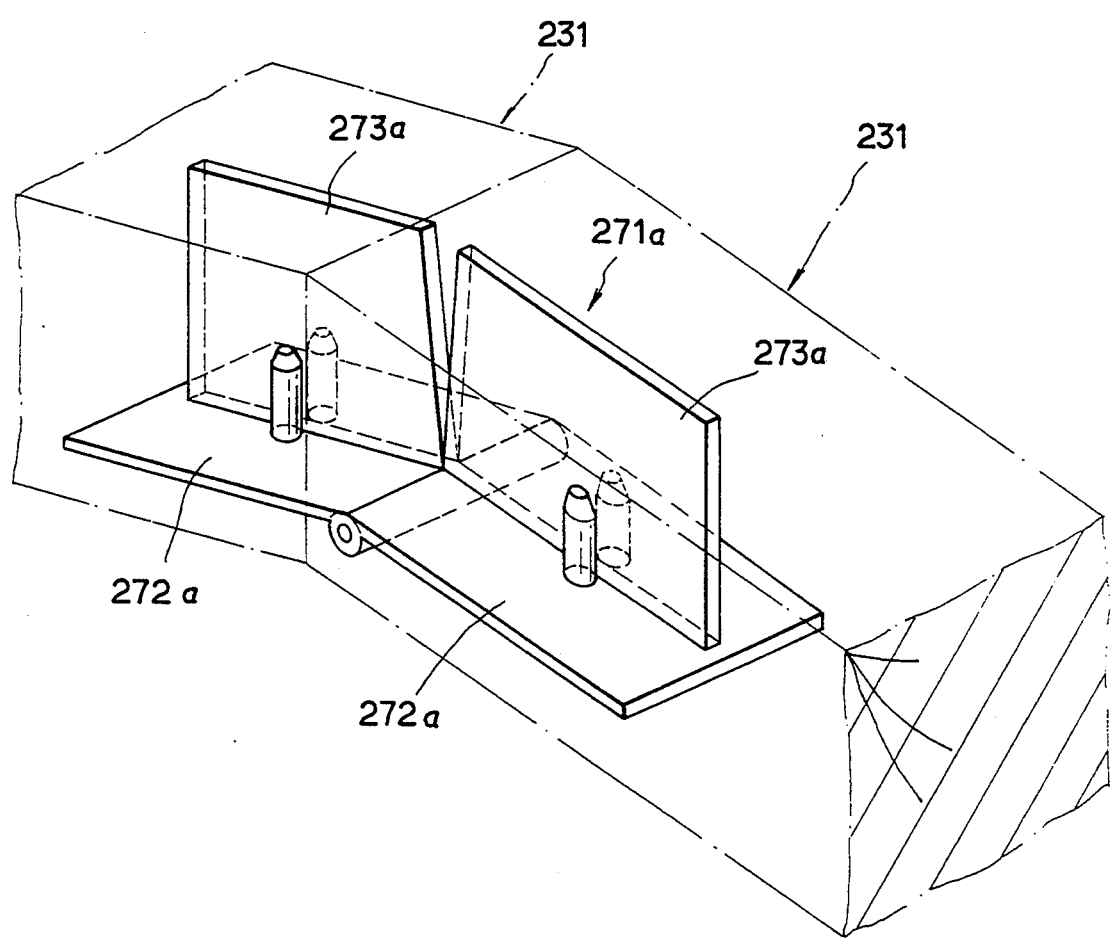
FIG. 56 is an isometric view showing a further modified connector.

FIG. 56 is an another variation of above third embodiment, which shows a connector 271a comprising two first plates 272a hinged with each other and two second plates 273a substantially perpentdicular to the first plate 272a respectively.

The connector 271a can be adapted to an connecting structure in which two rafters are at an arbitrary angle.

In the drawings, structural members are designated as a wood member and connectors are designated as a metal member but a material of the structural members and a material of the connector are not limited to these materials.

While the present invention, as to its objects and advantages, has been described herein as carried out in specific embodiments thereof, it is not desired to be limited threby but it is intended to cover the invention broadly within the spirit and scope of the appended claims.

What is claimed is:

1. A connector for connecting together a first structural member having a predetermined cut portion provided therein and a second structural member, comprising:
    a first plate;
    a second plate attached substantially perpendicularly to the first plate, said second plate being fitted into said predetermined cut portion of the first structural member;
    a third plate connected to the second structural member and attached to one end of the first plate at a predetermined angle; and
    a securing mechanism for securing the first structural member to the connector, said securing mechanism comprising at least one round rod member disposed on opposite sides of the second plate, each said round rod member being mounted at one end thereof to the first plate and standing substantially perpendicularly therefrom and having a height less than a height of the second plate, wherein said round rod members are respectively closely fitted into recesses formed in the first structural member.

2. A connector according to claim 1 wherein each said rod member is pin-shaped.

3. A connector according to claim 2 wherein each said rod member is tapered at one end.

4. A connector according to claim 1 wherein each said rod member is fixed to both said first plate and said second plate.

5. A connector according to claim 1 wherein said securing mechanism comprises a screw for securing said first structural member and said second plate.

6. A connector according to claim 5 wherein said second plate has a screw hole therein for penetration by said screw.

7. A connector according to claim 6 wherein said screw has a close fit in said hole.

8. A connector according to claim 1 wherein said securing mechanism comprises an adhesive for securing said first structural member and said second plate.

9. A connector according to claim 1, further comprising a positioning mechanism for positioning said connector in said second structural member.

10. A connector according to claim 9 wherein said positioning mechanism comprises a raised portion in said third plate, which is fitted into a depressed portion provided in said second structural member.

11. A connector according to claim 1, further comprising a brace fitting mechanism for fitting a brace.

12. A connector according to claim 11 wherein said brace fitting mechanism is provided in at least one of said first plate, said second plate and said third plate.

13. A connector according to claim 1 wherein said third plate is attached to said second plate.

14. A connector according to claim 13 wherein said first member comprises a rafter.

15. A connector according to claim 13 wherein said third plate is attached to said second plate substantially perpendicularly.

16. A connector according to claim 15 wherein said first structural member comprises one of a beam and a column.

17. A connector according to claim 1 wherein said third plate is rotatably attached to said first plate.

18. A connector according to claim 17 wherein said first member comprises a rafter.

19. A structural member having a connecting portion for connecting said structural member to a connector, wherein said connecting portion comprises a cut portion and the connection has a plate fitted into said cut portion said cut portion being substantially parallel to a longitudinal axis of said structural member and said structural member includes recesses into which a securing mechanism is fitted wherein said securing mechanism comprises at least one round rod member located on opposite sides of said connector, each of said round rod members being mounted on one end thereof to the connector and standing substantially perpendicularly therefrom and being a height less than the height of said connector and wherein said rod members are respectively closely fitted into said recesses of said structural member.

20. A structural member according to claim 19, wherein said recesses each rod comprise a hole, each said hole being substantially parallel to an end surface of said structural member and to said cut portion and wherein said plate is loosely fitted into said cut portion.

21. A structural member according to claim 20 wherein said hole are provided on both sides of said cut portion.

22. A structural member according to claim 20 wherein said end surface is substantially perpendicular to a longitudinal axis of said structural member.

23. A structural member according to claim 22 wherein said structural member comprises one of a beam and a column.

24. A structural member according to claim 19 wherein said connecting portion comprises a screw hole and a screw for penetrating said screw hole for securing said structural member to said connector, said screw hole being substantially perpendicular to said portion.

25. A structural member according to claim 19 wherein said connecting portion comprises a slot for housing a predetermined protrusion provided in said connector, said slot being provided in said end surface of said connecting portion.

26. A structural member according to claim 19 wherein said structural member comprises a rafter.

27. A connector for connecting together a first structural member and a second structural member, comprising:

a first plate assembly having two plates having ends symmetrically attached to each other at a predetermined angle for a predetermined axis;

a second plate attached substantially perpendicularly to said plates, which is fitted into a predetermined cut portion provided in said first and second structural members; and a securing mechanism for securing the first structural member to the connector, said securing mechanism comprising:

at least one round rod member disposed on opposite sides of the second plate, each said rod member being mounted at one end thereof to the first plate assembly and standing substantially perpendicularly therefrom and having a height less than the height of the second plate wherein said round rod members are closely fitted into recesses formed in the first structural member.

28. A connector according to claim 27 wherein said second plate is loosely fitted into said cut portion.

29. A connector according to claim 28 wherein said rod is pin-shaped.

30. A connector according to claim 27 wherein said securing mechanism comprises a screw for securing said first and second structural member to said second plate.

31. A connector according to claim 27 wherein said securing means comprises an adhesive for securing said first and second structural members to said second plate.

32. A connector according to claim 27, further comprising a brace fitting mechanism for fitting a brace to said second plate.

33. A connector according to claim 27 wherein said first and second structural members comprises rafters which are connected at a predetermined angle.

34. A connector according to claim 27 wherein said two plates of said first plate assembly are aligned in a plane.

35. A connector according to claim 34 wherein said first and second structural member comprises beams which are aligned.

36. A connector according to claim 34 wherein said first and second structural member comprises columns which are aligned.

37. A connector according to claim 34 wherein said first and second structural member comprises rafters which are aligned.

38. A connector according to claim 27 wherein said two plates of said first plate assembly are rotatably attached to each other.

39. A connector according to claim 38 wherein said structural member comprises rafter.

40. A connecting structure for connecting a first structural member and a second structural member by a connector, said connector comprising:
a first plate;
a second plate attached substantially perpendicularly to said first plate;
a third plate connected to said second structural member, said third plate being attached to one end of said first plate at a predetermined angle; and
a securing mechanism for securing said first structural member to said connector, said securing mechanism comprising at least one round rod member disposed on opposite sides of the second plate, each round rod member being mounted at one end thereof to the first plate, standing substantially perpendicular therefrom and having a height less than a height of the second plate wherein said round rod members are closely fitted into recesses formed in the first structural member,
said first structural member comprising:
a connecting portion for connecting said first structural member to said connector,
wherein said connecting portion comprises a cut portion into which said second plate is fitted, said cut portion being substantially parallel to a longitudinal axis of said first structural member.

41. A connecting structure according to claim 40 wherein said round rod member is located substantially parallel to said third plate and said second plate is loosely fitted into said cut portion.

42. A connecting structure according to claim 40 wherein said securing mechanism comprises a screw for securing said first structural member to said second plate, said second plate comprises a first screw hole penetrated by said screw and said connecting portion comprises a second screw hole penetrated by said screw, said second screw hole being substantially perpendicular to said cut portion.

43. A connecting structure according to claim 40 wherein said securing mechanism comprises an adhesive for securing said first structural member to said second plate, said adhesive filling a clearance formed between said second plate and said connection portion.

44. A connecting structure according to claim 40, which comprises a positioning mechanism for positioning said connector in said second structural member.

45. A connecting structure according to claim 40, which comprises a brace fitting mechanism on said second plate for fitting said brace onto said second plate.

46. A connecting structure according to claim 40 wherein said third plate is attached to said second plate.

47. A connecting structure according to claim 46 wherein said first structural member comprises a rafter.

48. A connecting structure according to claim 46 wherein said third plate is attached to said second plate substantially perpendicularly.

49. A connecting structure according to claim 48 wherein said first structural member comprises one of a beam and a column.

50. A connecting structure according to claim 40 wherein said third plate is rotatably attached to said first plate.

51. A connecting structure according to claim 50 wherein said first structural member comprises a rafter.

52. A connecting structure according to claim 40, which comprises a finishing material directly applied on a surface of said connecting portion.

53. A connecting structure according to claim 40 wherein said securing mechanism comprises a rod member for securing said structural member and said second plate and said second plate comprises a hole which is penetrated by said rod member.

54. A connecting structure for connecting a first structural member and a second structural member by a connector, said connector comprising:
a first plate assembly having two plates with ends attached to each other at a predetermined angle in symmetry along a predetermined axis;
a second plate attached substantially perpendicularly to said plates; and
securing mechanism for securing said first and second structural members to said connector, said securing mechanism comprising at least one round rod member disposed on opposite sides of the second plate, each round rod member being mounted at one end thereof to the first plate, standing substantially perpendicular therefrom and having a height less than a height of the second plate wherein said round rod members are closely fitted into recesses formed in the first structural member,
said first and second structural members comprising:
a connecting portion for connecting said first and second structural member to said connector,
wherein said connecting portion comprises a cut portion into which said second plate is fitted, said cut portion being substantially parallel to a longitudinal axis of said first structural member.

55. A connecting structure according to claim 54 wherein said securing mechanism comprises a screw for securing said first and second structural member to said second plate, said second plate comprises a first screw hole which is penetrated by said screw and said connecting portion comprises a second screw hole penetrated by said screw, said screw hole being substantially perpendicular to said cut portion.

56. A connecting structure according to claim 54 wherein said securing mechanism comprises an adhesive for securing said first and second structural members to said second plate, said adhesive being filled in a clearance formed between said second plate and said connection portion.

57. A connecting structure according to claim 54, further comprising a brace and a brace fitting member for fitting said brace to said second plate.

58. A connecting structure according to claim 54 wherein said first and second structural members comprise rafters which are connected together at a predetermined angle.

59. A connecting structure according to claim 54 wherein said two plates of said first plate assembly are aligned in a plane.

60. A connecting structure according to claim 59 wherein said first and second structural member comprise aligned beams.

61. A connecting structure according to claim 59 wherein said first and second structural member comprise aligned columns.

62. A connecting structure according to claim 59 wherein said first and second structural member comprises aligned rafters.

63. A connecting structure according to claim 54 wherein said two plates of said first plate assembly are rotatably attached to each other.

64. A connecting structure according to claim 63 wherein said first and second structural members comprise rafters.

65. A connecting structure according to claim 54, further comprising a finishing material directly applied on a surface of said connecting portion.

* * * * *